US012638850B2

(12) United States Patent
Chowdhary et al.

(10) Patent No.: US 12,638,850 B2
(45) Date of Patent: *May 26, 2026

(54) APPARATUS AND METHOD FOR AGRICULTURAL DATA COLLECTION AND AGRICULTURAL OPERATIONS

(71) Applicant: THE BOARD OF TRUSTEES OF THE UNIVERSITY OF ILLINOIS, Urbana, IL (US)

(72) Inventors: Girish Chowdhary, Champaign, IL (US); Chinmay P. Soman, Urbana, IL (US); Erkan Kayacan, Champaign, IL (US); Benjamin C. Thompson, Chicago, IL (US); Zhongzhong Zhang, Urbana, IL (US); Anwesa Choudhuri, West Bengal (IN)

(73) Assignee: The Board of Trustees of the University of Illinois, Urbana, IL (US)

( * ) Notice: Subject to any disclaimer, the term of this patent is extended or adjusted under 35 U.S.C. 154(b) by 406 days.

This patent is subject to a terminal disclaimer.

(21) Appl. No.: 18/486,909

(22) Filed: Oct. 13, 2023

(65) Prior Publication Data

US 2024/0061440 A1     Feb. 22, 2024

Related U.S. Application Data

(62) Division of application No. 16/641,618, filed as application No. PCT/US2018/047947 on Aug. 24, 2018, now Pat. No. 11,789,453.

(Continued)

(51) Int. Cl.
*G06N 20/10*     (2019.01)
*G05D 1/00*     (2006.01)
(Continued)

(52) U.S. Cl.
CPC ....... *G05D 1/0246* (2013.01); *G06F 18/2155* (2023.01); *G06N 20/10* (2019.01);
(Continued)

(58) Field of Classification Search
CPC .... G05D 1/0246; G05D 1/027; G05D 1/0272; G05D 1/0278; G06F 18/2155;
(Continued)

(56) References Cited

U.S. PATENT DOCUMENTS 9,392,743 B2     7/2016   Camacho-Cook et al.
9,489,576 B2     11/2016  Johnson et al.
(Continued)

FOREIGN PATENT DOCUMENTS

CN     101990796 B     7/2012
CN     102696294 B     9/2014
JP     2000222580 A     8/2000

OTHER PUBLICATIONS

"AU 2018320964 Office Action Mailed Sep. 8, 2022", Sep. 8, 2022, 3 pgs.
(Continued)

*Primary Examiner* — Christopher M Brandt
(74) *Attorney, Agent, or Firm* — Guntin & Gust, PLC; Kenneth S. Kwan

(57)     ABSTRACT

Aspects of the subject disclosure may include, for example, obtaining video data from a single monocular camera, wherein the video data comprises a plurality of frames, wherein the camera is attached to a mobile robot that is travelling along a lane defined by a row of crops, wherein the row of crops comprises a first plant stem, and wherein the plurality of frames include a depiction of the first plant stem; obtaining robot velocity data from encoder(s), wherein the encoder(s) are attached to the robot; performing foreground extraction on each of the plurality of frames of the video (Continued)

data, wherein the foreground extraction results in a plurality of foreground images; and determining, based upon the plurality of foreground images and based upon the robot velocity data, an estimated width of the first plant stem. Additional embodiments are disclosed.

20 Claims, 63 Drawing Sheets

Related U.S. Application Data

(60) Provisional application No. 62/688,885, filed on Jun. 22, 2018, provisional application No. 62/596,506, filed on Dec. 8, 2017, provisional application No. 62/550,271, filed on Aug. 25, 2017.

(51) Int. Cl.

| | |
|---|---|
| *G06F 18/214* | (2023.01) |
| *G06V 20/10* | (2022.01) |
| *G06V 20/40* | (2022.01) |
| *H04W 4/40* | (2018.01) |

(52) U.S. Cl.
CPC ............ *G06V 20/188* (2022.01); *G06V 20/41* (2022.01); *H04W 4/40* (2018.02)

(58) Field of Classification Search
CPC ...... G06N 20/10; G06V 20/188; G06V 20/41; H04W 4/40; A01B 69/001; G06T 7/12; G06T 7/155; G06T 7/194; G06T 7/62; G06T 2207/10016; G06T 2207/10028
See application file for complete search history.

(56) References Cited

U.S. PATENT DOCUMENTS

| | | | |
|---|---|---|---|
| 9,658,201 B2 | 5/2017 | Redden et al. | |
| 10,339,389 B2 * | 7/2019 | Xu | G06T 7/73 |
| 2008/0269988 A1 * | 10/2008 | Feller | G05D 1/0278 |
| | | | 701/41 |
| 2010/0246893 A1 * | 9/2010 | Dani | G06T 7/579 |
| | | | 382/106 |
| 2010/0332430 A1 | 12/2010 | Caraviello et al. | |
| 2013/0259375 A1 * | 10/2013 | Dunlop | G06V 20/38 |
| | | | 382/173 |
| 2014/0285673 A1 * | 9/2014 | Hundley | H04N 23/11 |
| | | | 382/103 |
| 2015/0201607 A1 | 7/2015 | Henderson | |
| 2015/0278640 A1 * | 10/2015 | Johnson | G06V 20/188 |
| | | | 382/110 |
| 2016/0050840 A1 * | 2/2016 | Sauder | A01B 79/005 |
| | | | 701/3 |
| 2017/0084039 A1 * | 3/2017 | Ritter | G06V 20/188 |
| 2017/0148181 A1 * | 5/2017 | Lin | G06T 7/0004 |
| 2017/0169314 A1 | 6/2017 | Dijkman et al. | |
| 2017/0316282 A1 * | 11/2017 | Ritter | G06V 10/143 |
| 2018/0157911 A1 * | 6/2018 | Lo | G06T 7/73 |
| 2018/0232900 A1 * | 8/2018 | Kraft | G06V 10/255 |
| 2021/0158041 A1 | 5/2021 | Chowdhary et al. | |

OTHER PUBLICATIONS

"Extended European Search Report, 18848126.1, Mailed Apr. 14, 2021", Apr. 14, 2021, 9 pgs.
"IN App. No. 202047012422 Office Action Mailed Mar. 28, 2022", Mar. 28, 2022, 9 pgs.
"International Preliminary Report on Patentability", PCT/US2018/047947, Mar. 5, 2020, 12.
"International Search Report and Written Opinion", PCT/US2018/047947, Feb. 22, 2019, 18 pages.
Abhisesh, Silwal , "Machine Vision System for Robotic Apple Harvesting in Fruiting Wall Orchards", Ph.D. dissertation, Washington State University, 2016, Dec. 2016, 152 pgs.
Baharav, Tavor , et al., "In Situ Height and Width Estimation of Sorghum Plants from 2.5d Infrared Images", Electronic Imaging, vol. 2017, Issue 17, ISSN 2470-1173,, Jan. 29, 2017, 14 pages.
Baharav , et al., "In Situ Height and Width Estimation of Sorghum Plants from 2.5d Infrared Images", Electronic Imaging, vol. 2017, No. 17, Jan. 29, 2017 (Jan. 29, 2017), XP055590796, ISSN: 2470-1173, DOI: 10.2352 / ISSN.2470-1173.2017.17.COIMG-435, Jan. 29, 2017, 14 pgs.
Biber , et al., "Navigation System of the Autonomous Agricultural Robot "BoniRob"", Navigation System of the Autonomous Agricultural Robot "BoniRob"* Peter Biber, Ulrich Weiss, Michael Dorna, Amos Albert, 2012, 7.
Campos , et al., "Spatio-temporal analysis for obstacle detection in agricultural videos", Applied Soft Computing vol. 45, Aug. 2016, pp. 86-97, Apr. 29, 2016, 12 pgs.
Jin , et al., "Point Cloud Based Approach to Stem Width Extraction of Sorghum", Electronic Imaging, Journal vol. 2017; Journal Issue: 17; Journal Id: Issn 2470-1173 University of Illinois at Urbana-Champaign, IL (United States), Jan. 29, 2017, 8 pgs.
Leitang , et al., "Automatic morphological trait characterization for corn plants via 3D holographic reconstruction", Computers and Electronics in Agriculture, vol. 109, pp. 109-123, (https://www.sciencedirect.com/science/article/pii/S0168169914002191), Nov. 2014, 15 pages.
Luck , et al., "Sensor ranging technique for determining corn plant population", 2008 Providence, Rhode Island, Jun. 29-Jul. 2, 2008. American Society of Agricultural and Biological Engineers, 2008, p. 1., 2008, 11 pgs.
Nakarmi , et al., "Automatic inter-plant spacing sensing at early growth stages using a 3d vision sensor", Comput. Electron. Agric., vol. 82, pp. 23-31, 2013, 2013, 140pgs.
Navarro , "robot-that-kills-120-weeds-per-minute", http://www.techtimes.com/articles/109226/20151122/robot-that-kills-120-weeds-per-minute-could-end-use-of-herbicide-in-farms.htm, Nov. 22, 2015, 4pgs.
Rahnemoonfar , et al., "Deep Count: Fruit Counting Based on Deep Simulated Learning", Sensors (Basel). Apr. 2017; 17(4): 905. Published online Apr. 20, 2017. doi: 10.3390/s17040905, Apr. 20, 2017, 12 pgs.
Rascon Acuna , "Corn Sensor Development for By-Plant Management", Ph.D. dissertation, Oklahoma State University, 2012, 2012, 58pgs.
Shi , et al., "Automatic corn plant location and spacing measurement using laser line-scan technique", Precis. Agric., vol. 14, No. 5, pp. 478-494, 2013, Apr. 9, 2013, 17pgs.
Shi , et al., "Improvement of a ground-lidar-based corn plant population and spacing measurement system.", Comput. Electron. Agric., vol. 112, pp. 92-101, Dec. 26, 2014, Precision Agriculture. [Online]. Available: http://www.sciencedirect.com/science/article/pii/S0168169914003093, Dec. 26, 2014, 11 pgs.
Shrestha , et al., "Automatic Corn Plant Population Measurement Using Machine Vision", Transactions of the ASAE. vol. 46(2): 559-565, 2003 (doi: 10.13031/2013.12945), 2003, 10pgs.
Sylvain, Jay , et al., "In-field crop row phenotyping from 3D modeling performed using Structure from Motion", Computers and Electronics in Agriculture, vol. 110, pp. 70-77, (https://www.researchgate.net/publication/267512694_In-field_crop_row_phenotyping_from_3D_modeling_performed_using_Structure_from_Motion), Jan. 31, 2015, 29.
Thorp, K. , et al., "Using aerial hyperspectral remote sensing imagery to estimate corn plant stand density", Trans. ASABE, vol. 51, No. 1, pp. 311-320, 2008, 2008, 10pgs.
Zingg , et al., "MAV Navigation through Indoor Corridors Using Optical Flow", 2010 IEEE International Conference on Robotics and Automation : ICRA 2010 ; Anchorage, Alaska, USA, May 3-8, 2010, May 10, 2010.

* cited by examiner

101

111

201

320

501

601

702

701

801

803

805

807

809

811

901

903

905

907

1001

1003

1005

1007

1102

1101

1402

1401

1502

1501

1503

1505

1602

1601

1603

1605

1701

1703

1705

Figure 18:
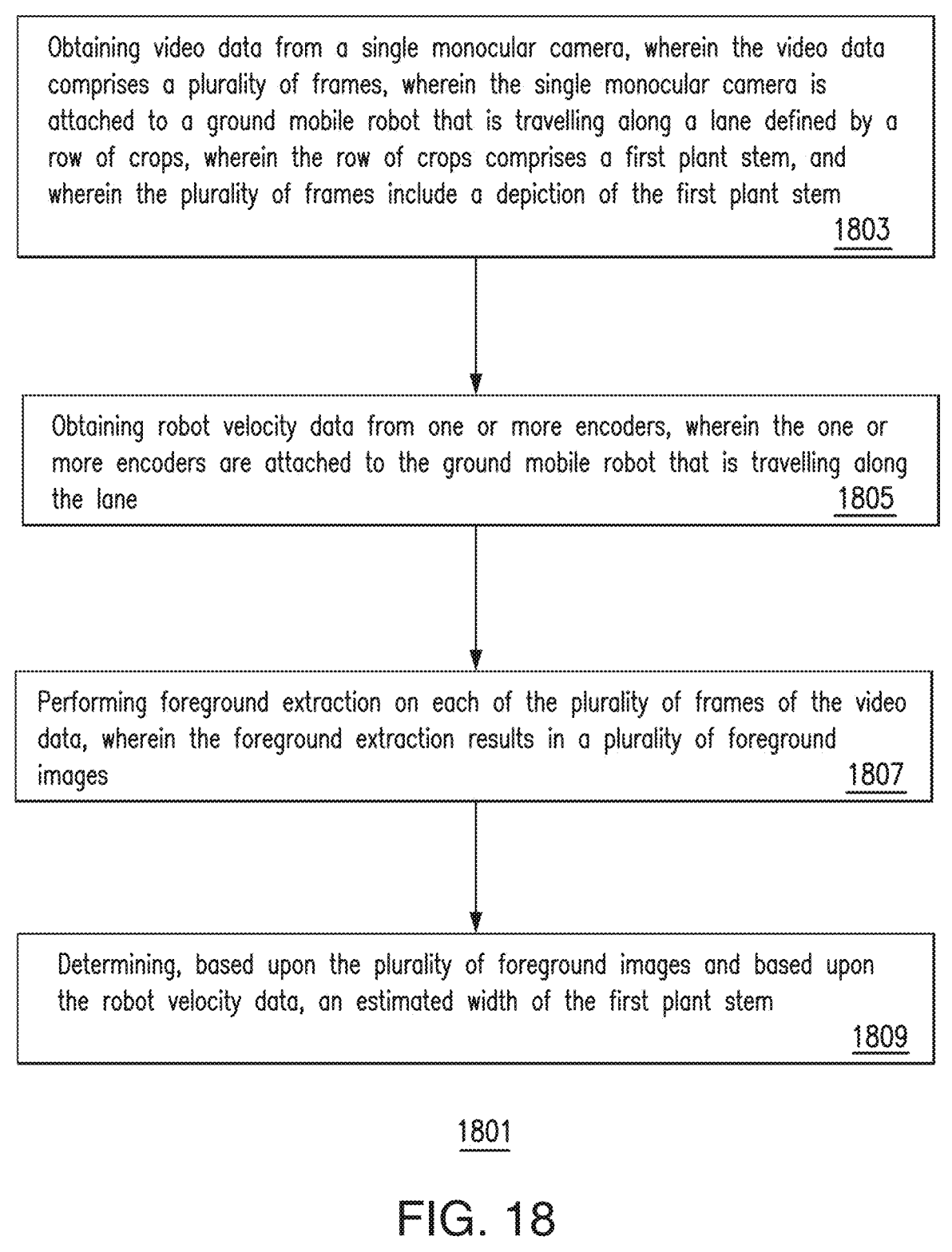

Obtaining video data from a single monocular camera, wherein the video data comprises a plurality of frames, wherein the single monocular camera is attached to a ground mobile robot that is travelling along a lane defined by a row of crops, wherein the row of crops comprises a first plant stem, and wherein the plurality of frames include a depiction of the first plant stem

1803

Obtaining robot velocity data from one or more encoders, wherein the one or more encoders are attached to the ground mobile robot that is travelling along the lane                                                                                                                                1805

Performing foreground extraction on each of the plurality of frames of the video data, wherein the foreground extraction results in a plurality of foreground images                                                                                                                                1807

Determining, based upon the plurality of foreground images and based upon the robot velocity data, an estimated width of the first plant stem

Figure 19:
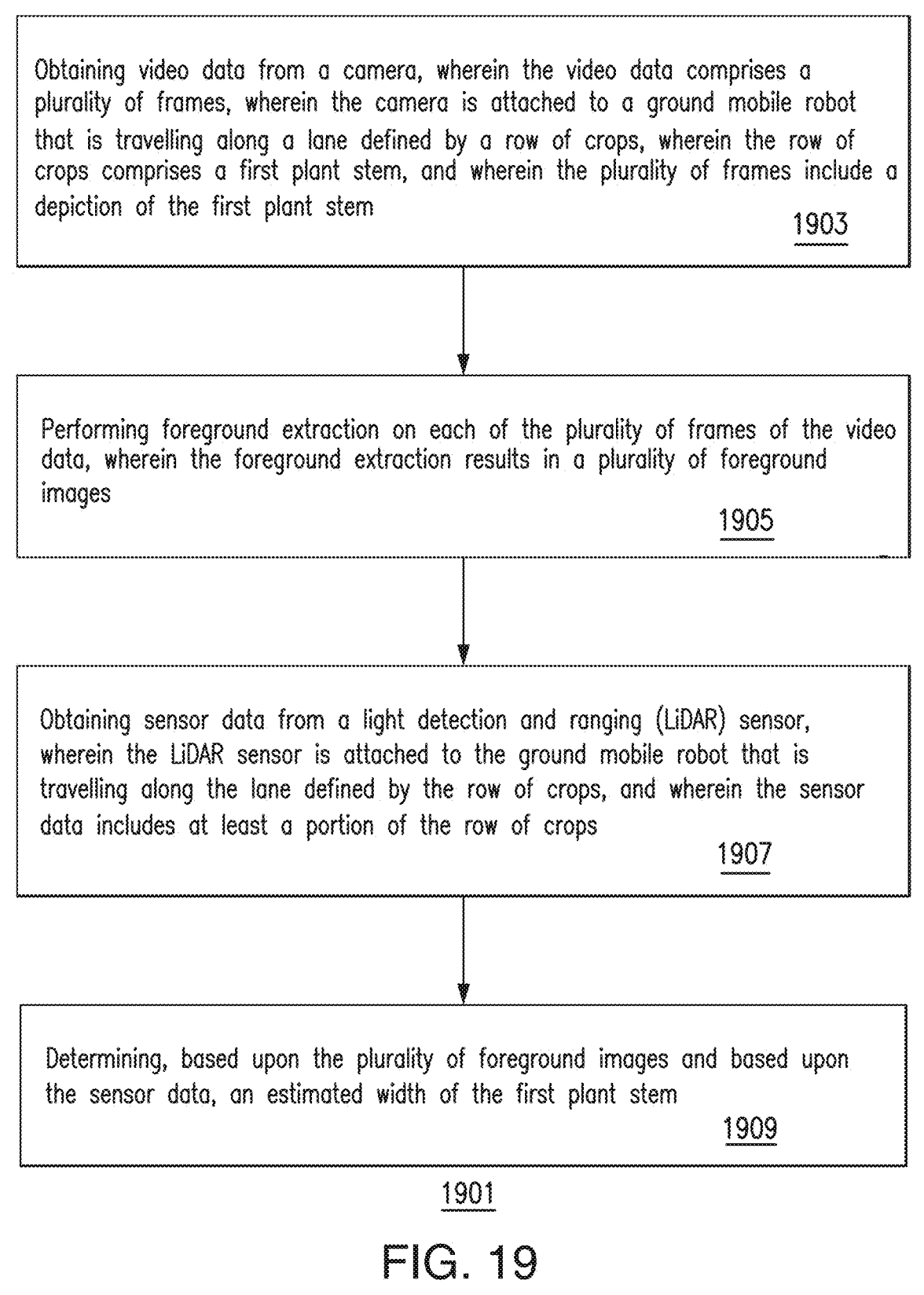

Obtaining video data from a camera, wherein the video data comprises a plurality of frames, wherein the camera is attached to a ground mobile robot that is travelling along a lane defined by a row of crops, wherein the row of crops comprises a first plant stem, and wherein the plurality of frames include a depiction of the first plant stem

1903

Performing foreground extraction on each of the plurality of frames of the video data, wherein the foreground extraction results in a plurality of foreground images

1905

Obtaining sensor data from a light detection and ranging (LiDAR) sensor, wherein the LiDAR sensor is attached to the ground mobile robot that is travelling along the lane defined by the row of crops, and wherein the sensor data includes at least a portion of the row of crops

1907

Determining, based upon the plurality of foreground images and based upon the sensor data, an estimated width of the first plant stem

Figure 20:
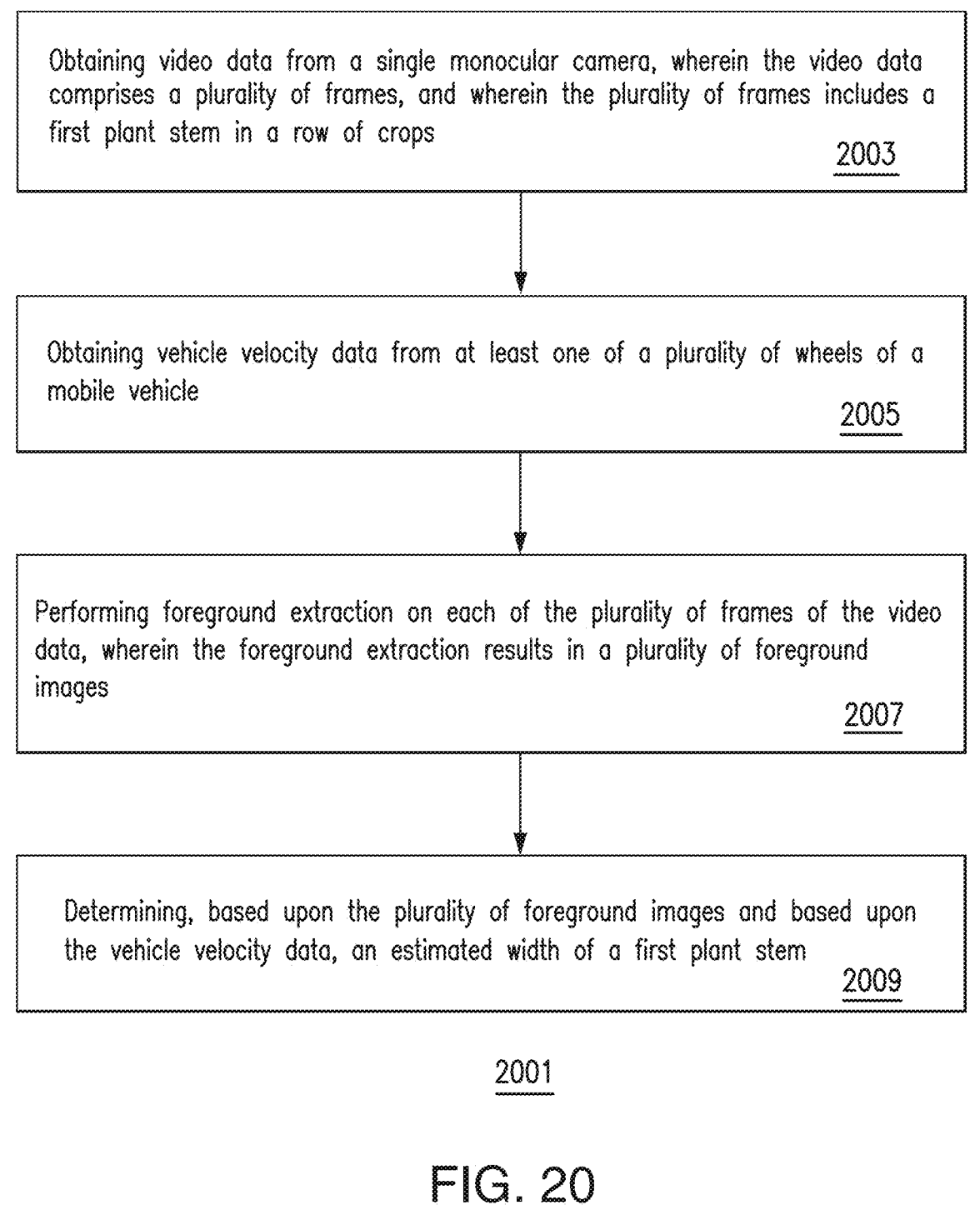

Obtaining video data from a single monocular camera, wherein the video data comprises a plurality of frames, and wherein the plurality of frames includes a first plant stem in a row of crops <u>2003</u>

Obtaining vehicle velocity data from at least one of a plurality of wheels of a mobile vehicle <u>2005</u>

Performing foreground extraction on each of the plurality of frames of the video data, wherein the foreground extraction results in a plurality of foreground images <u>2007</u>

Determining, based upon the plurality of foreground images and based upon the vehicle velocity data, an estimated width of a first plant stem <u>2009</u>

(a) Single corn appears in the ROI at a time ($w<d$)

(b) Two corn plants appear in the ROI at the same time ($w{\geq}d$)

| Capturing images associated with a field of plants with a camera. | 3005 |

Applying a convolutional neural network to the group of images to extract feature vectors. — 3010

Applying a support vector machine to the feature vectors to classify the feature vectors. — 3015

Applying motion estimation to the classified features. — 3020

Determining a plant population. — 3025

3130

3140

3110

3120

3215

3225

3210

3220

1

APPARATUS AND METHOD FOR AGRICULTURAL DATA COLLECTION AND AGRICULTURAL OPERATIONS

CROSS-REFERENCE TO RELATED APPLICATION(S)

The present application is a divisional of U.S. patent application Ser. No. 16/641,618, filed on Feb. 24, 2020, which is a U.S. National Stage of International Application No. PCT/US2018/047947, having an International Filing Date of Aug. 24, 2018, which claims the benefit of priority to U.S. Provisional Patent Application No. 62/688,885, filed on Jun. 22, 2018. All sections of the aforementioned application(s) and/or patent(s) are incorporated herein by reference in their entirety.

International Application No. PCT/US2018/047947 also claims the benefit of priority to U.S. Provisional Patent Application No. 62/596,506, filed on Dec. 8, 2017. All sections of the aforementioned application(s) and/or patent (s) are incorporated herein by reference in their entirety.

International Application No. PCT/US2018/047947 also claims the benefit of priority to U.S. Provisional Patent Application No. 62/550,271, filed on Aug. 25, 2017. All sections of the aforementioned application(s) and/or patent (s) are incorporated herein by reference in their entirety.

STATEMENT AS TO FEDERALLY SPONSORED RESEARCH

This invention was made with government support under DE-AR0000598 awarded by the Department of Energy and 1720695 awarded by the National Science Foundation. The government has certain rights in the invention.

FIELD OF THE DISCLOSURE

The subject disclosure relates generally to an apparatus and a method for agricultural data collection and agricultural operations. More specifically, various embodiments of the subject disclosure relate to robot-based crop stem width estimation (e.g., in a highly cluttered field environment). Further, various embodiments of the subject disclosure relate to robot-based phenotyping using deep learning.

BACKGROUND

Plant phenotyping is the quantification of the effects of genotype differences (i.e., differences in the genetic makeup) and the environment on the exhibited phenotype (i.e., the plant appearance and behavior) [29A] (various references identified herein are sometimes referred to by a number followed by a letter, e.g., 1A, 2A, 1B, 2B, etc.). According to the Food and Agriculture Organization of the United Nations, large-scale experiments in plant phenotyping are a key factor in breeding better crops that are needed for feeding a growing population and providing biomass for energy, while using less water, land, and fertilizer. The need for large scale, more comprehensive, and efficient phenotyping has become ever more pressing recently due to a constantly evolving climate [22A] and changing demographic in rural areas. However, conventional phenotyping methods are mostly limited to manual measurements out in the field, which is labor intensive, time consuming, and lacks sufficiency and accuracy. This has created a so-called phenotyping bottleneck in agricultural productivity increase [13A], [2A].

Over the past few years, several attempts have been made to automate the process of plant phenotyping using a wide range of sensors involving multispectral and hyperspectral remote sensing, thermal infrared imaging, fluorescence imaging, 3D imaging, tomographic imaging and imaging in visible light [19A]. Visible imaging is a practical, energy efficient and cost effective way to measure several plant phenotypes. Certain recent approaches [10A], [17A], [23A], [15A], [28A], [6A], [32A], [8A] try to model plants using imaging techniques and 3D reconstruction. However, these approaches have typically been tested under simulated environment or under extensively monitored environments, such as a greenhouse. The aforementioned methods and algorithms have not typically been implemented in actual agricultural fields where the level of uncertainty is very high (e.g., due to changes in lighting conditions during different times of the day and during different seasons, variation of plant color and size across different growth stages, background clutter, and numerous other factors). Hoyos-Villegas et al. (see [16A] V. Hoyos-Villegas, J. H. Houx, S. K. Singh, and F. B. Fritschi. Ground-based digital imaging as a tool to assess soybean growth and yield. *Crop Science,* 54:1756-1768, 2014. doi: 10.2135/cropsci2013.08.0540) and Chen et al. (see [7A] Yuhao Chen, Javier Ribera, Christopher Boomsma, and Edward Delp. Locating crop plant centers from uavbased rgb imagery. In *The IEEE International Conference on Computer Vision* (ICCV), October 2017) try to do experiments in field conditions and use digital imaging to assess soyabean and sorghum respectively: Hoyos-Villegas et al. [16A] develop a hand-held digital imaging tool to assess soybean yield, while Chen et al. [7A] use Unmanned Aerial Systems (UAS) based RGB imagery to locate plant centers of sorghum in a field but achieves an accuracy of only 64% to 66%.

Although there is a huge potential of deep learning and computer vision in plant phenotyping, it has become clear that the challenges arising in plant phenotyping differ significantly from the usual tasks addressed by the computer vision community [29A]. In the context of robotic phenotyping, a challenge is the lack of available labeled and curated datasets for training deep networks in realistic field conditions.

Minervini et al. (see [24A] Massimo Minervini, Andreas Fischbach, Hanno Scharr, and Sotirios A. Tsaftaris. Finely-grained annotated datasets for image-based plant phenotyping. *Pattern Recognition Letters,* 81:80-89, 2016. ISSN 0167-8655. doi: https://doi.org/10.1016/j.patrec.2015.10.013. URL http://www.sciencedirect.com/science/article/pii/S0167865515003645) provide a dataset of potted rosette plants over multiple growth stages where each leaf segment of the plants are labeled with a different color (see [21A] M. Minervini, A. Fischbach, H. Scharr, and S. A. Tsaftaris. Plant phenotyping datasets, 2015. URL http://www.plant-phenotyping.org/datasets). Many recent works have used this dataset to achieve high accuracy in leaf counting and segmentation tasks [1A], [33A], [30A], [9A]. Giuffrida et al. (see [14A] Mario Valerio Giuffrida, Hanno Scharr, and Sotirios A. Tsaftaris. ARIGAN: synthetic *arabidopsis* plants using generative adversarial network. CoRR, abs/1709.00938, 2017. URL http://arxiv.org/abs/1709.00938) augment this dataset by generating realistic images of rosette plants using generative adversarial networks. Pound et al. (see [27A] Michael P Pound, Jonathan A Atkinson, Darren M Wells, Tony P Pridmore, and Andrew P French. Deep learning for multi-task plant phenotyping. *bioRxiv,* 2017. doi: 10.1101/204552. URL https://www.biorxiv.org/content/early/2017/10/17/204552) provide a new dataset for wheat spikes, analyze the spikes and count them. However, the conditions in this dataset differ significantly from those in the field, with field obtained data from a moving robot having a high level of clutter, object similarity, varying sunlight, motion blur, and occlusions.

With regard now in particular to stem width estimation, it is noted that stem width of fuel plants is an important phenotype that determines the plant's biomass content. Stem width is also important in identifying whether there are any growth-lagging plants in a particular field. In spite of its importance, it is believed that there are conventionally no efficient in-field practices for stem width measurement. The conventional practice typically involves trained agronomists manually going out into fields and measuring the stems using Vernier calipers (see e.g. FIG. 2). This technique is slow, inaccurate, hazard-prone, and highly labor intensive. Jin and Zakhor (see [18A] Jihui Jin and Avideh Zakhor. Point cloud based approach to stem width extraction of sorghum. 2017) propose an algorithm to estimate stem width from 3D point cloud data collected by a robot equipped with a depth sensor (ToF sensor). Baharav et al. (see [3A] Tavor Baharav, Mohini Bariya, and Avideh Zakhor. In situ height and width estimation of sorghum plants from 2.5d infrared images) use 2 infrared cameras mounted on a robot and applies image processing techniques to estimate height and width of plants. However, it is believed that none of these existing width estimation algorithms have yet been validated in field settings for accuracy and validity under high clutter and changing field conditions.

In addition, plant population plays a vital role in agricultural systems due to its strong influence on grain yield [1B]-[6B]. Several studies have concluded that grain yield per unit area follows a parabolic function of plant population [1B], [3B], [7B]. In other words, there exists an optimal plant population that maximizes grain yield, where the optimal value depends on a number of environmental factors such as nitrogen, soil, and precipitation [8B]-[10B]. Therefore, accurate measurement of plant population can provide valuable information for estimating grain yield.

The current industry prevalent technique for corn stand-count in early growth stages is manual-counting. This process is highly labor intensive and prone to errors. In the literature, various corn plant counting approaches have been proposed. Combine harvesters often employ a mechanical sensor that consists of a spring-loaded rod attached to a rotary potentiometer [11B]. However, the method is not applicable to early growth stages as it is destructive. Thorp et al. [12B] developed an algorithm for estimating corn plant stand density using aerial hyperspectral imagery, but this method cannot be used in later growth stages, that is, when the canopy "closes". In contrast to aerial methods, ground-based methods can be utilized throughout the growing season. In ground-based techniques, sensors investigated include lidar [13B], [14B], Time-of-Flight (ToF) camera [15B], and laser pointers [16B], [17B]. However, these sensors typically do not provide sufficient discrimination between corn and surrounding material, and hence are prone to large measurement errors. In particular, they cannot easily differentiate between corn leaves, debris, and weeds, which may trigger similar signal as corn stalks in the measurement. Hence the studies involving those sensors either were limited to weed free fields (which is impractical in production fields), or suffered major errors from weed interference. Monocular RGB cameras, on the other hand, have the potential to identify corn stalks against complex background. However, differentiating corn plants in cluttered agricultural environments in the presence of weeds, overlying leaves, and varying lighting conditions is a highly challenging machine vision problem. Shrestha and Steward calculated an ellipsoidal decision surface in RGB color space to segment vegetation from background in their attempt to count corn stands [18B]. Vegetations located farther than a threshold away from the mean location were considered weeds. This heuristic is highly simplified, and non-robust to real-world conditions, it has therefore (it is believed) only been demonstrated in low-weed conditions.

Conventional machine learning techniques require considerable domain specific expertise to carefully design a feature extractor to transform raw data (e.g., pixel values of an image) into appropriate feature space where classifiers can detect patterns in the input. In contrast, deep learning is a set of methods that allow end-to-end training and prediction. Deep learning models take raw data input and automatically learn the representations from the data's internal structure. Typically, a deep learning model consists of multiple modules each of which slightly increases the level of abstraction from the previous representation. When enough such modules are used, very intricate structures can be learned such that relevant patterns are recognized whereas irrelevant variations are suppressed. Deep learning has made tremendous progress in areas that have confounded traditional machine learning for many years including image recognition [20B], [22B].

Deep learning methods have been shown capable of recognizing complex structures and features in the presence of heavy noise. Today, deep neural networks are approaching human level at image recognition on Internet data [19B]-[22B]. However, it is believed that currently no machine-vision based (whether utilizing deep-learning or not) corn stand counting algorithm exists that is robust to real-world noise, varying lighting conditions, and implementable in real-time on an ultra-compact moving robot.

Convolutional neural networks (CNN or ConvNets) are a class of deep learning methods that process multidimensional array data. The structure of a typical ConvNet is comprised of multiple layers of neurons connected in a serial manner, and neurons in each layer are organized in feature maps. However, instead of dense connectivity in fully-connected neural networks, neurons in ConvNets are only connected to a local patch of their predecessors. These neurons perform a weighted sum (convolution) on the feature maps in the previous layer. The sum is then activated by a non-linear function before passing to the next layer. All neurons in a feature map share the same set of weights (filter), and different feature maps have different filters. The arrangement of local connectivity and weight sharing exploit characteristics of images that local groups of values are often highly correlated and local patterns are invariant to location. This architecture gives ConvNets distinct advantages in image recognition. For instance, AlexNet [20B], a 5-layer ConvNet, won the ImageNet Large Scale Visual Recognition Competition (ILSVRC) 2012 [25B] with significantly superior performance over other competing approaches. Since then, ConvNets have become ubiquitous in various applications related to computer vision [26B]-[30B]. Over the past years, various ConvNet architectures have been proposed [19B], [21B], [22B], [31B], [32B]. The best model records at 3.57% top-5 error rate in image classification [19B] with an average human being around 5%.

In addition, agricultural systems experience a variety of yield-reducing stressors through their lifecycle. These stressors include external agents such as diseases, insects, animals etc., stress from nutrient deficiency such as deficiency of Nitrogen, phosphorous etc., or stress from external factors, such as damage due to heavy field equipment or weather. It is important to quickly detect these stressors so that management tasks to counteract their effects can be informed.

If a vehicle/robot/organism drives/walks/operates over a crop, it is said to damage the crop if its activities leave a lasting permanent effect on the plant that affects its health, reduces its yield, or outright kills it. For example, FIG. 35 shows tire marks in a field that have led to permanent and direct damage due to heavy equipment passage. An equipment may also indirectly damage crop, for example, FIG. 36 shows soil compaction due to heavy equipment, which in this case has led to zero yield, but in others can significantly reduce yield.

Further, the lack of low-cost, high-throughput technologies for field phenotyping is one of the most important hurdles affecting crop breeding. As described herein, phenotyping is the measurement of plants including simple metrics such as emergence, stem-width, plant height; more sophisticated features such as total biomass, leaf angles, leaf area index; and complex properties such as hyper-spectral reflectance and fluorescence emission spectra. Phenotyping enables seed breeders and crop scientists to identify and select for genotypes that lead to desirable traits. The inability to collect phenotypic data in a low-cost and reliable manner can create a bottleneck in seed breeding progress. This critical gap can significantly hamper agricultural productivity by limiting the breeding of crops with greater yield potential, crops that can effectively resist abiotic stresses such as heat, drought, flooding etc., and precluding accurate yield prediction.

Furthermore, for growers, measurement of simple phenotypes such as crop stand count and biomass provides accurate estimation of yield, when combined with models of crop yield. Simple phenotypes, such as plant stand-count and biomass are early and accurate indicators of crop yield. The ability to reliably predict crop yield early in the growing season can have a significant impact on the financial profit that a grower can expect. The most significant factor affecting the predictive capability of both statistical and biophysical crop yield models has been the lack of high resolution agronomic datasets. Collecting these data manually is labor-intensive and expensive. Skilled and willing agricultural labor is on a decline.

Laboratory Phenotyping for cells and other small organisms has been done, as has phenotyping using conveyer belts or other mechanisms in a greenhouse setting. However, these methods have proven difficult to move into fields for high throughput phenotyping. The lightbox method of phenotyping consists of moving a box with active radiation over a plant to obtain phenotypic information with sensors. However, this method is difficult to move into field settings. Furthermore, it requires its own light source, as opposed to various embodiments disclosed herein, which work with ambient light sources. Large scale beam mounted phenotyping platforms are available, however, these systems are very expensive and require quite heavy and elaborate infrastructure. This makes it impractical for a wide variety of breeders and growers to use these systems. Large tractor-mounted equipment or equipment that is mounted on large robots can damage the plant permanently, even killing it, if the tractor/robot/equipment runs over the plant. Furthermore, phenotyping typically requires repeated travel through the field multiple times a season; the heavy equipment (e.g., tractor-mounted equipment) can compact the soil, which is undesirable for yield. Several software and algorithms are available for analyzing phenotypic images from different sensors or through remote sensing. However, remote sensing data typically cannot penetrate the canopy with sufficiently high resolution.

Management of crop-systems includes activities such as pruning, culling, weeding, sampling, harvesting, spraying, seeding, thinning, and tilling. Traditionally, these activities are either conducted manually which is labor intensive, or through devices that are pulled by tractors. Smart devices pulled by tractors that can identify and selectively spray chemicals onto undesirable plants in the agricultural systems are available. However, tractor pulled systems are impractical when crop canopy grows. Furthermore, these heavy systems cause soil compaction which is undesirable for yield. In addition, these systems can damage plants when they drive over them or brush against them. The ROWBOT system provides a robotic mechanism for applying Nitrogen. However, systems like the ROWBOT system can damage plants if they drive over them. Koselka et al. teach a robotic system for scouting and management in grapevine. However, the robot does not ensure that crop plants are not damaged during operation or if it drives over them.

Agricultural crop products are heavily commoditized. In the absence of any major differentiators, farmers are hard pressed to compete on the prices of their products. Increasing agricultural productivity has created abundant supply of agricultural produce in certain geographies. Grains can be stored for long duration in grain silos. Vegetables and fruit can be rapidly transported from their place of production to a place of consumption at reasonable cost in many geographies. As a result, growers are under increasing price pressure. The profit margin of the grower is the net profit they can expect to earn after paying for seed, inputs (such as fertilizers, pesticides, insecticides, and other chemicals) and management costs, which includes cost of labor and equipment financing. The increasing cost pressure makes it important for growers to have access to low-cost scouting mechanisms that can inform decisions on whether or not to apply input. The cost of a ground-based scouting mechanism includes its manufacturing cost, distribution cost, and operational cost. The manufacturing cost depends, among other things, on the material it is constructed with, the propulsion mechanism if it is self-propelled, the complexity of actuation mechanism for its turning and traversing the field, and the electronic components it may use. Heavier robots will typically be more expensive to maneuver, so will be complex robots requiring rack-and-pinion and other mechanisms to turn. Heavier robots are also typically difficult to transport, requiring higher transportation and distribution costs. Heavier robots are also typically expensive to operate, since they can easily damage plants if they run over them, they can also damage property or people if they collide with them, and they require more power to pull their weight, which leads to increased fuel/electricity costs. Heavier robots also typically compact soil and damage plants, which will lead to cost due to reduction in yield.

A different class of scouting mechanism from ground robots is aerial robots. There has been work in aerial scouting of agricultural fields for phenotyping and other agronomic functions to inform field management. Aerial scouting can be performed using unmanned aerial vehicles (e.g., drones), manned aircraft, or satellites. Each platform has unique advantages and disadvantages compared to each other. However, aerial scouting only reveals the stress symptoms that are visible from the top of the canopy. These may include change in color of leaves, overtly damaged plants, or areas of low growth. Aerial scouting may be conducted using RGB (visual) spectrum images, or images with multiple spectra that are not visible to the naked eye. Aerial scouting typically does not reveal under canopy characteristics, nor does it typically reveal minor defects and early indicators of stress on plants, especially when the plants are just emerging and not easily visible in aerial images. Furthermore, the state of the art aerial drones typically have very limited endurance, especially the multi-rotor type drones (which typically only have an endurance of 10-30 minutes), making it harder for them to cover in detail larger areas. Furthermore, these robots can be expensive to operate due to regulation, limited endurance, higher cost of manufacturing, and safety.

Emerging aerial sensing methods include active radiation based sensors, including radars, lidars, and sonar sensors. However, in addition to typically prohibitive costs, these aerial sensors typically do not have sufficient resolution to reveal early indicators of stress. These aerial sensors typically have limited range, and as such can only be used on low-flying manned or unmanned aircraft, where weight, power, and sensor update-rate typically make it infeasible to use these sensors.

Many plant diseases, insect infestations, and nutrient stresses manifest at the interface between soil and the plant and are not typically visible through aerial scouting based techniques. Indicators of some stressors are also visible closer to the stem. These early indicators are also not typically detectable through aerial scouting. Therefore, close to ground or under canopy scouting is essential in early detection of agricultural stressors.

As a result of the deficiencies of aerial scouting, and the lack of satisfactory scouting ground robots that have low cost and do not damage plants, the prevalent method for agricultural scouting is manual or "on foot" scouting, where a trained agronomist walks through the field. The agronomist may visually inspect plants, or take samples of plants or soil. Agronomists typically have at least a BS degree and many have higher degrees. This method is colloquially termed as boots-on-ground scouting. However, this method of scouting is labor intensive, and can be expensive due to the high costs associated with hiring and supporting agronomists. Furthermore, wet, muddy fields are infeasible for an agronomist to traverse, and large fields take a lot of time to traverse. In addition, there is no data from field scouting activity other than the qualitative reports provided by the agronomist. There has been an increasing interest in collecting under canopy data and close-to-ground data that can be used in data-driven pipelines to inform better agricultural decisions.

This has led to an increasing interest in utilization of robotic platforms for agricultural scouting. However, there are significant unsolved challenges in robotic season-long agricultural scouting without risking damage to the plants in plurality of crops, geographies, and environments. Common practice for agriculture is to grow crops in rows. But the row size is variable. Crops also have multiple stages of growth. When they are very young, they are small and in the seedling stage, as they start to grow crops grow differently. Some crops, such as grass based cereals, have been bred to grow in a vertical manner; but others, such as soybeans and other vine based crops, tend to grow more in a horizontal manner. The row spacing in modern agriculture is also highly variable. For corn in the United States, it can range from 28 inches to 32 inches, for soybean in the United States it ranges from under 15 inches to 30 inches. The row spacing in different countries and geographies is also different, for example, in Southeast Asia, a soybean rowspacing of 6 inches or less can be found.

Furthermore, emerging agricultural practices such as polycultures or cover-crop lead to agricultural fields that have ill-defined or non-existent rows. Some farms may not have well defined row spacing if they do not use GPS guided tractors. The Robotanist is an agricultural phenotyping robot developed by researchers at CMU in 2016. The robotanist is built over a metal frame and carries a number of sensors required for highly precise phenotyping. However, this robot weighs around 300 lbs. and can significantly damage crop-plants when it drives over them.

U.S. Pat. No. 8,381,501 issued Feb. 26, 2013 describes an agricultural scouting robot for operation in grapevines. It appears that this robot does not ensure that crop plants are not damaged during operation or if it drives over them. Furthermore, it appears that the robot does not necessarily have the capability to turn around 180° in a row. In fact, it appears that no upper limits on size or weight specifications are provided.

There are commercially available rovers that can fit within some crop rows (28-32 inches wide), however, these rovers are not typically designed specifically for agricultural data collection and phenotyping. Clear Path robotics has developed multiple rovers for outdoor applications. The Clear Path Jackal series start close to $10K for the bare platform with some computational ability. Further sensors can be added at extra cost. The rover does not typically come with the capability to process the data from the sensors to provide the required phenotypic measurement. However, the Jackal only has about 2.5 inches of ground clearance, this combined with its relatively high platform cost does not make it an acceptable candidate for agricultural scouting. Husky, is a larger rover from Clear Path, but with a width of 26.4 inches, it is difficult for it to travel comfortably in typical Maize (Corn) crop, and it cannot travel in typical Soybean rows. Furthermore, the Clear Path rovers do not typically come integrated with sensors and systems required for agricultural scouting tasks, such as automated stand-counting, stalk angle determination, stalk width estimation, or biomass estimation.

Robotic rovers are available from Robotnik, Omron Adept technologies, and ROWBOT. More traditional low-clearance track based robots are also available from QinetiQ, Naio, Fendth, and iRobot. While many off-the-shelf options are available, these devices typically lack an integration of a suite of sensors, autonomy technologies, software, data recording capability, and sensor integration modularity for plant phenotyping, specifically plant phenotyping under the canopy.

The ROWBOT system is designed to be insertable in rows of agricultural crops for applying fertilizer. However, the ROWBOT is heavy, driven by diesel engines, and can permanently damage crops if it drives over them. It appears that the system barely fits in rows of corn. Corn rows spacing can vary between 28-32 inches, and as mentioned previously, crop row-spacing can be much smaller, or non-existent in prevalent agricultural practices. The system also carries heavy fertilizer tanks. As such, it is not feasible to scout agricultural fields with this system without risking damage to plants. Furthermore, it is believed that the ROWBOT cannot turn around 180° in a row. The system utilizes contact sensors to find crop row edges and stay in the middle of rows. However, these types of sensors will not work when the crop-plants are very small.

BRIEF DESCRIPTION OF THE DRAWINGS

Reference will now be made to the accompanying drawings, which are not necessarily drawn to scale, and wherein:

FIG. 8A—Unprocessed window f& with high clutter; FIG. 8B—Edges of the image of FIG. 8A after Canny edge detection; FIG. 8C—Dilation of the image of FIG. 8B; FIG. 8D—Erosion of the image of FIG. 8C; FIG. 8E—Inversion of the image of FIG. 8D; FIG. 8F—Foreground extraction and smoothing by removing unwanted components from the image of FIG. 8E after CCL (connected component labeling) and convex hull approximation respectively.

FIGS. 9A and 9C depict (for a first image and a second image, respectively) a rough foreground after CCL; FIG. 9B (corresponding to the first image of FIG. 9A) depicts a smooth foreground after approximating convex hull around the object of interest; FIG. 9D (corresponding to the second image of FIG. 9C) depicts a smooth foreground after approximating convex hull around the object of interest.

FIG. 14A—A typical video frame 1401 for plot 17MW0159 with window 1402 marked. $W_{Si}$ (dark) and $W_{Li}$ (light) are noted inside window 1402. $W_S$ (dark) and $W_L$ (light) are placed at the bottom left corner. V: Instantaneous robot velocity, D: Robot to plant distance measured by LIDAR); FIG. 14B—Distribution of Width from SfM Across all frames in the video; FIG. 14C—Distribution of width from LIDAR across all frames in the video; FIG. 14D—Distribution of hand measured width for all plants in the plot.

FIG. 15A—A typical video frame 1501 with window 1502 marked. $W_{Si}$ (dark) and $W_{Li}$ (light) are noted inside window 1502. $W_S$ (dark) and $W_L$ (light) are placed at the bottom left corner. V: Instantaneous robot velocity, D: Robot to plant distance measured by LIDAR); FIG. 15B—Distribution of Width from SfM Across all frames in the video; FIG. 15C—Distribution of width from LIDAR across all frames in the video. x-axis: Width in inches, y-axis: Normalized Frequency.

FIG. 16A—A typical video frame 1601 with window 1602 marked. $W_{Si}$ (dark) and $W_{Li}$ (light) are noted inside window 1602. $W_S$ (dark) and $W_L$ (light) are placed at the bottom left corner. V: Instantaneous robot velocity, D: Robot to plant distance measured by LIDAR); FIG. 16B—Distribution of Width from SfM Across all frames in the video; FIG. 16C—Distribution of width from LIDAR across all frames in the video. x-axis: Width in inches, y-axis: Normalized Frequency.

FIG. 17A depicts a leaf that looks like a stem (similar size, shape, eccentricity and orientation), causing a false detection. FIG. 17B depicts a stem almost completely occluded by a leaf, a situation where detection fails. FIG. 17C depicts uneven sunlight, which is likely to output inconsistent width.

FIG. 18 depicts an illustrative method 1801 according to an embodiment (this method can operate, for example, in the system of FIG. 21).

FIG. 19 depicts an illustrative method 1901 according to an embodiment (this method can operate, for example, in the system of FIG. 21).

FIG. 20 depicts an illustrative method 2001 according to an embodiment (this method can operate, for example, in the system of FIG. 21).

FIG. 22A shows a CAD drawing of the robot (of this embodiment) with the side facing camera. FIG. 22B shows the robot (of this embodiment) in a corn field between two rows. FIG. 22C shows a superior view of the robot (of this embodiment). FIG. 22D shows a posterior view (of the robot of this embodiment).

FIG. 35 shows soil compaction due to heavy agricultural equipment, the compacted soil yields less).

DETAILED DESCRIPTION

Figure 1A:
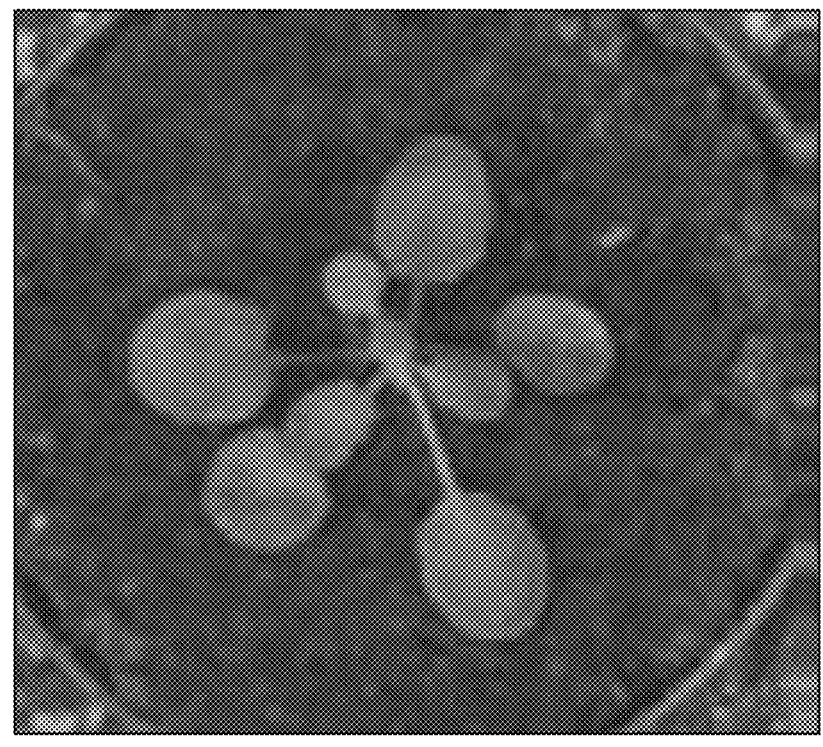
FIG. 1A depicts an image 101 of a rosette plant from the dataset given by Minervini et al. (see [24A] Massimo Minervini, Andreas Fischbach, Hanno Scharr, and Sotirios A. Tsaftaris. Finely-grained annotated datasets for image-based plant phenotyping. *Pattern Recognition Letters*, 81:80-89, 2016. ISSN 0167-8655. doi: https://doi.org/10.1016/j.patrec.2015.10 013. URL http://www.sciencedirect.com/science/article/pii/S0167865515003645).
Figure 1B:
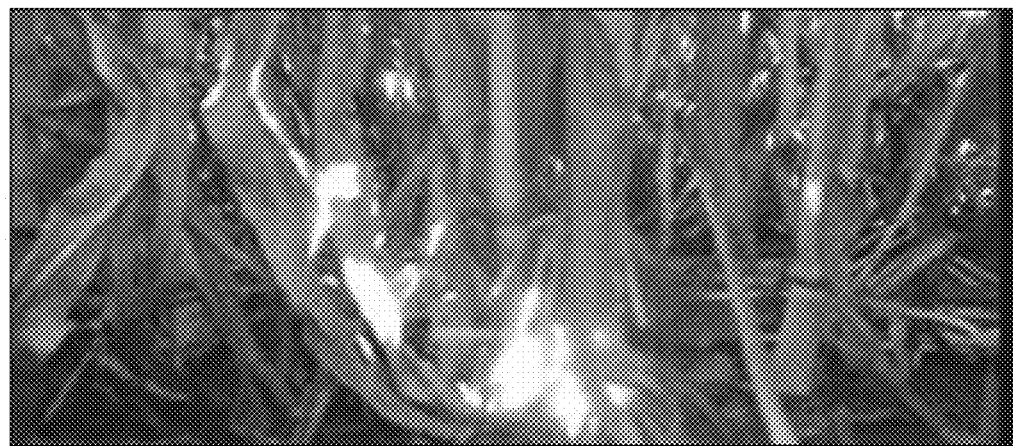
FIG. 1B depicts an image 111 acquired from a robot (according to an embodiment) in actual field condition with a high level of clutter, varying sunlight, motion blur, and occlusion (as seen by comparison to FIG. 1A, images obtained by robots are very different from the datasets available).
Figure 2:
FIG. 2 depicts an image 201 of an example of a conventional practice of manual stem width measurement using vernier calipers (this manual practice is typically cumbersome, inefficient, and inaccurate).

As described herein are new algorithms for crop stem width estimation (e.g., under high clutter in an agricultural field using a small mobile robot). The sensors used according to an example are low-cost, consisting of a side-facing monocular RGB camera (ELPUSBFHD01M,USA), a 2D LIDAR (2-D Hokuyo UTM-30LX), and wheel encoders for estimating robot velocity. The sensors are mounted on a small (e.g., <15 lb) phenotyping robot (sometimes referred to herein as TerraSentia) that can traverse through crop rows in an agricultural field using the LIDAR.

Provided herein according to an embodiment is an image processing algorithm designed to extract the foreground in the presence of significant leaf and stem clutter, view of other rows, and varying lighting. The extraction can be based upon data from a side-facing USB camera on a moving robot. Using the extracted foreground, an algorithm provided herein uses the ratio between estimated robot velocity from wheel encoders and pixel velocity from dense optical flow to estimate depth using a structure from motion (SfM) approach (with respect to the wheel encoders, it is noted that GPS does not work well under crop canopy due to multi-path and attenuation errors, hence, encoder velocity is an acceptable estimate of robot speed, especially at slow speeds when the wheels do not slip excessively). The SfM is adapted as described herein for phenotyping in cluttered and unstructured field conditions.

As described herein is a validation of various techniques in biomass sorghum fields. Algorithms according to various embodiments have been compared against available manually measured plots in an 80 Acre best-practices field trial at a leading University. A trained agronomist used industry-standard practices to measure the average stem-width of 18 plots. Various algorithms provided herein match the agronomist measurements within the allowable range of error set by an oversight agency (8%). The width estimation match was found to be 92.5% (using only vision) and 98.2% (using vision and LIDAR), where the total processing time for running both algorithms is 0.04 secs per video frame.

It is believed that measurements using various embodiments described herein could potentially be more accurate than those of the human agronomist, especially given that the agronomist can typically only measure limited plants and only in a few places, whereas the algorithms provided herein can be more exhaustive.

Various algorithms presented herein are quite general in nature due to their utilization of fundamental principles of machine vision. As such, the algorithms presented herein can be utilized with little modification on other plants, as demonstrated by experiments described below in corn (*Zea mays*) and hemp (*Cannibis*) fields. Therefore, results presented herein establish the feasibility of using small autonomous robots for stem-width estimation in realistic field environments.

In other examples, the foreground extraction and robot-to-row depth techniques described herein can be utilized for automating other phenotypic measurements.

Figure 3A:
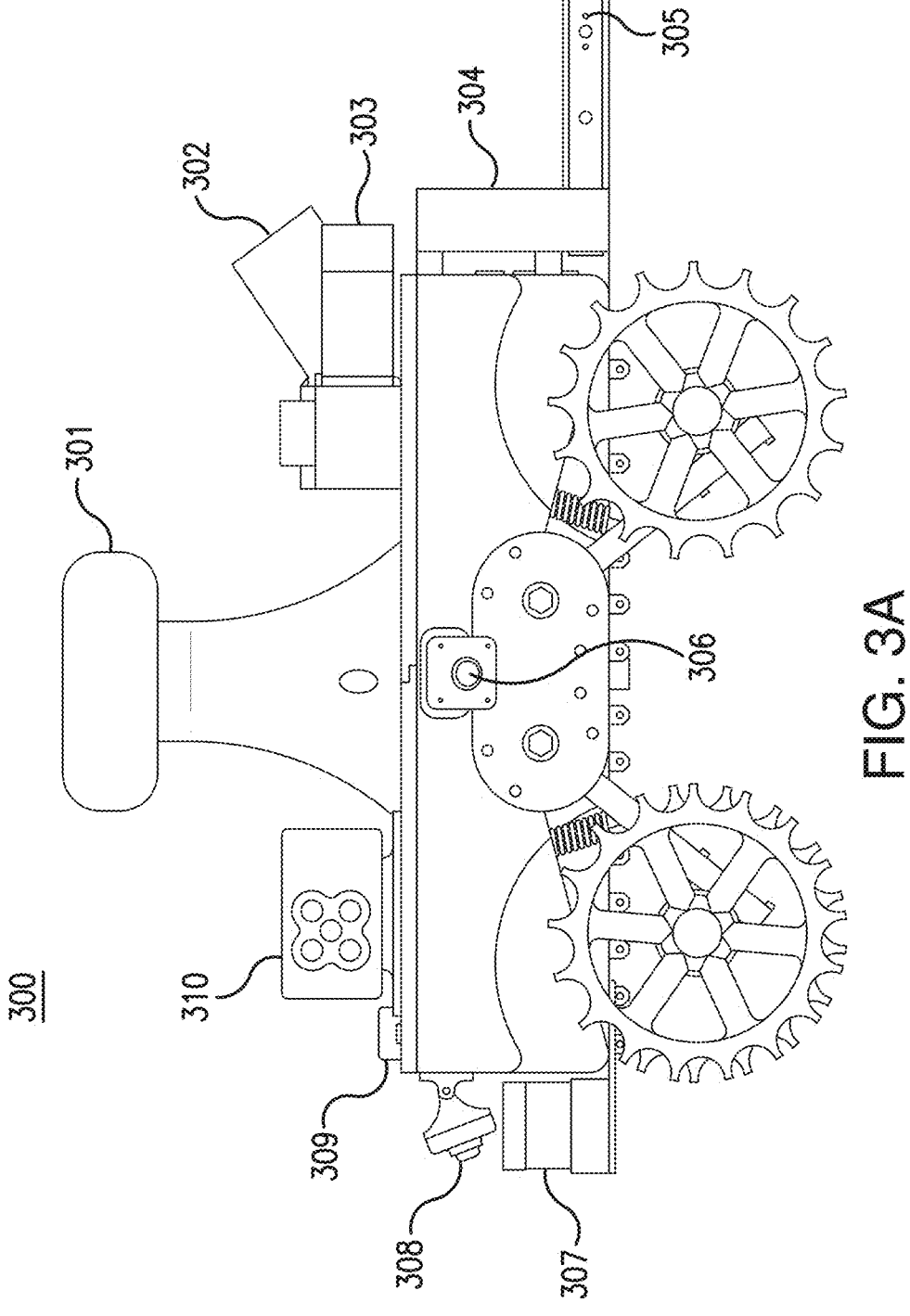
FIG. 3A depicts a CAD drawing of an embodiment of a phenotyping robot 300 (sometimes referred to herein as "TerraSentia"). This type of robot was used for certain data acquisition as described herein. As seen in this FIG., the robot includes the following: GPS antenna (call-out number 301); Bayspec hyperspectral sensor (call-out number 302; Bayspec hyperspectral sensor (sideward facing) (call-out number 303); Radiator for the liquid cooling system (call-out number 304); Mount for 3d Sensor Intel RealSense (call-out number 305); Embedded visual sensor (call-out number 306); LIDAR sensor (call-out number 307); Embedded visual sensor (call-out number 308); GPS mount for RedEdge multispectral sensor (call-out number 309); Red-Edge multispectral sensor (call-out number 310).
Figure 3B:
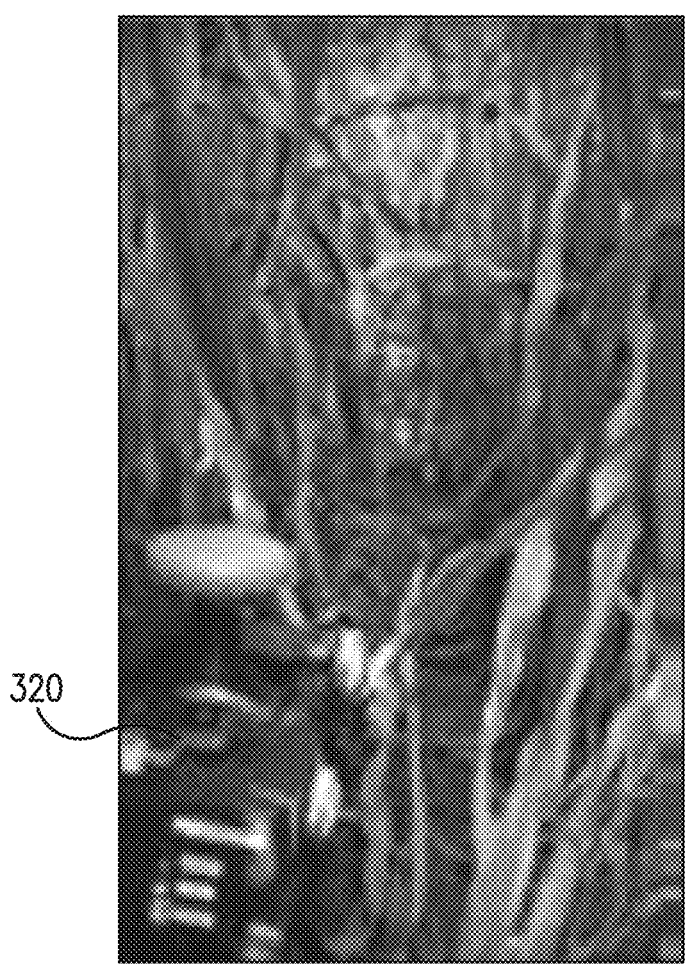
FIG. 3B depicts the TerraSentia robot 320 of an embodiment moving autonomously through a 30 inch wide, heavily cluttered sorghum row.

Reference will now be made to various aspects of an experimental set-up according to certain embodiments. More particularly, reference will first be made to a Robot Description according to an embodiment. In this embodiment (see, e.g., FIGS. 3A and 3B) a robot that is used for data acquisition is a lightweight (e.g., <15 lb), ultra-compact, 3D printed, autonomous field phenotyping robot (sometimes referred to herein as TerraSentia). The lightness and thoughtful construction of the wheels help prevent permanent damage to any plant parts, even if the robot runs over them accidentally. The compactness allows the robot to easily traverse between narrow crop rows, especially in corn, hemp, and sorghum, where 30" or greater row spacing is common. Each wheel of the robot is powered by a separate motor with encoders and averaged encoder values provide a reasonable estimate of the robot speed. The robot travelled in various examples at a speed of about 1.3 feet per second (0.4 m/s). At this speed, the robot covers a row of a single 3 m by 3 m plot of a crop variety in under 10 seconds, and can cover several plots in a reasonable amount of time. Furthermore, at this speed, motion blur was not found to be significant on the camera (ELPUSBFHD01M, USA) used on the robot. Higher frame rate cameras could enable increasing speed of the robot.

Figure 4:
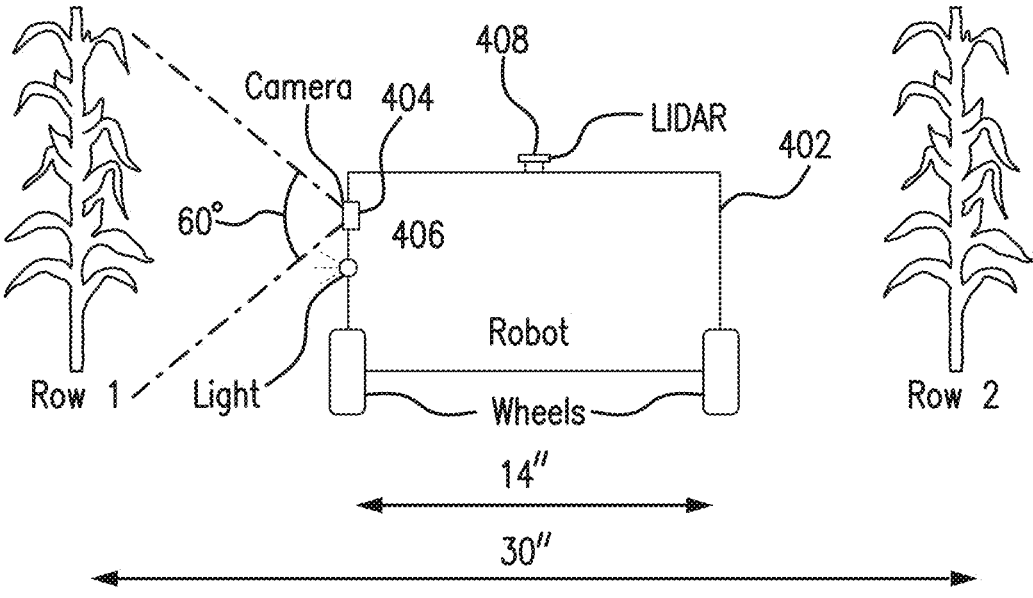
FIG. 4 depicts a front view of the TerraSentia robot 402 of an embodiment in a 30 inch lane between crop row 1 and crop row 2. This FIG. shows placement of the camera 404, the light 406 and LIDAR 408 (in this example, the field of view of the camera is 60° and the lateral spacing between wheels is 14 inches).

Still discussing aspects of the experimental set-up, reference will now be made to a Camera and Light Source according to an embodiment. In this embodiment, as the robot traverses through crop rows, video data is acquired at 90 frames per second with a frame resolution of 640×480 pixels by the robot's camera. The acquisition is performed, in this example, with a low-cost digital monocular RGB camera (ELPUSBFHD01M, USA) mounted on the side of the robot chassis. The camera, in this example, has a field view of 60°. A common inexpensive LED light source, having a 3000K color temperature and providing 60 lumens of light, is attached on the robot chassis near the camera position to ensure ample brightness under the dark sorghum canopy. This is done to prevent the camera firmware from increasing the exposure time which could cause excessive motion blur. In this embodiment of the robot, there was no control over the camera firmware. The placements of the camera and light are shown in FIG. 4.

Still discussing aspects of the experimental set-up, reference will now be made to Data Acquisition according to an embodiment. In this embodiment, video data, encoder readings (for instantaneous robot velocity estimation) and LIDAR point cloud data (for lateral distance estimation) are acquired at 90 fps, 5 fps and 20 fps respectively. GPS data is also logged, however, GPS accuracy varies widely under canopy, hence GPS data is not used. There was no inertial measurement unit on the robot of this embodiment. All results discussed herein are in an offline setting with data retrieved using WiFi, however, high speed and low computational requirements of the presented algorithms indicates that in another embodiment they could be utilized onboard the robot. In either case, there is little value lost by doing off-board estimation, since the data typically has to be retrieved for other purposes anyway. In this embodiment, Python 2.7.12 with OpenCV 2.4.9.1 have been used for development of all code.

Figure 5:
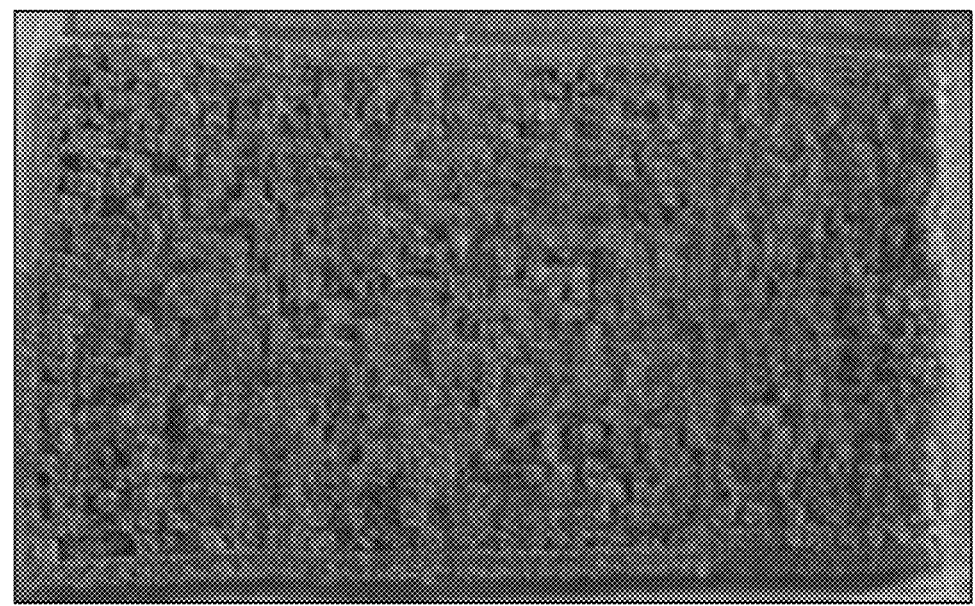
FIG. 5 depicts an image 501 of an aerial view of 80 acres sorghum field (Maxwell Field, Savoy, IL, USA), consisting of 960 sorghum plots of different genotypes of Sorghum.

Still discussing aspects of the experimental set-up, reference will now be made to a description of the Sorghum Fields which were used. FIG. 5 shows an aerial view of 80 acres sorghum field (Maxwell Field, Savoy, IL, USA), consisting of 960 sorghum plots of different genotypes of Sorghum. All experiments on sorghum discussed herein have been performed on the 80 Acre Maxwells Field, Savoy, Illinois, during August to November, 2017. The field consists of 960 Sorghum plots of size 3 m×3 m and 30 inch row spacing. The aerial image of FIG. 5 shows the marked height difference due to the different genotypes in each plot.

Figure 6:
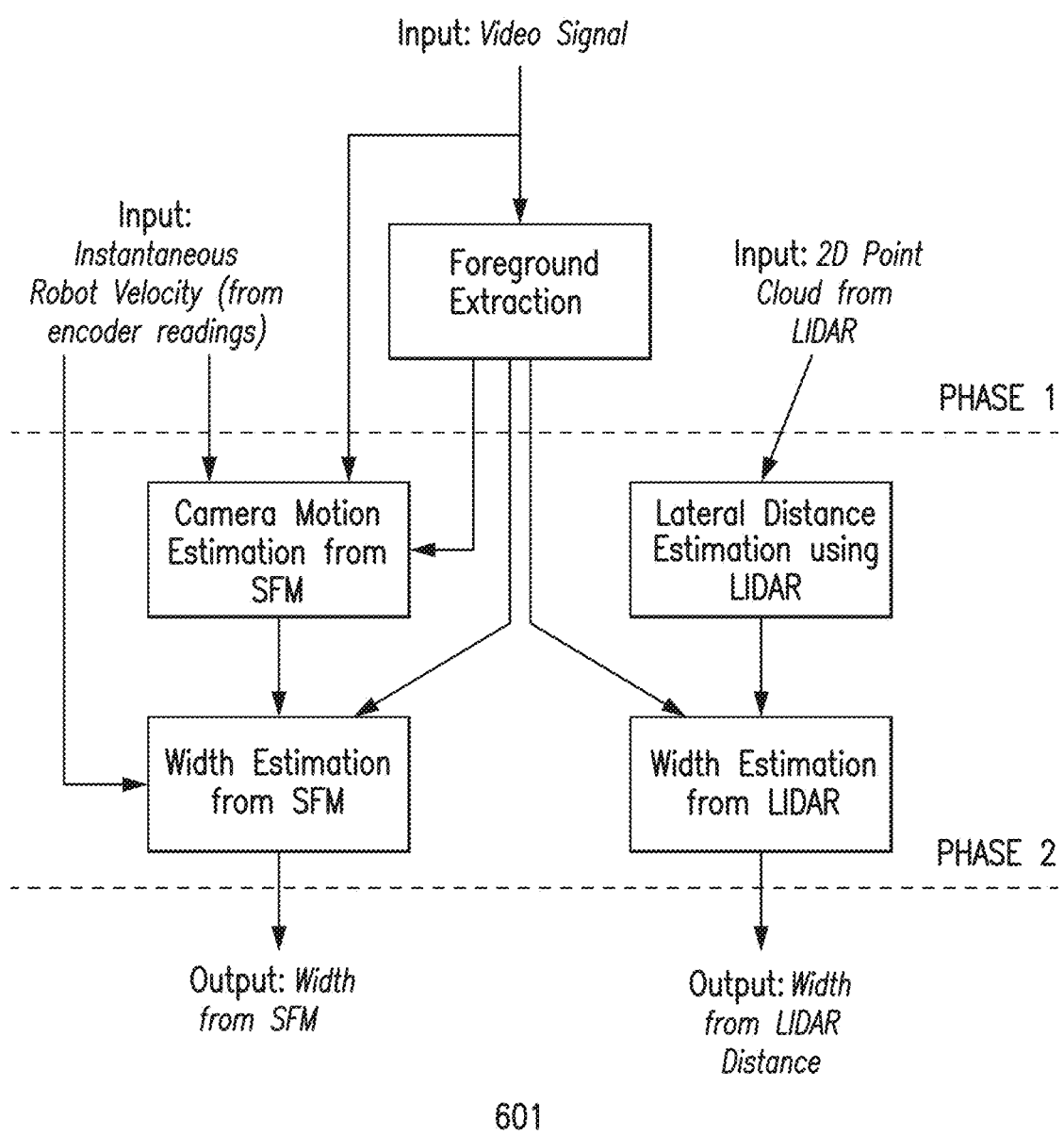
FIG. 6 shows an algorithmic framework 601 according to an embodiment. This algorithmic framework according to an embodiment includes: (1) Foreground Extraction (see Algorithm 1A (shown as pseudo-code) provided below); (2) Camera Motion Estimation from SFM (see Algorithm 2A (shown as pseudo-code) provided below); (3) Lateral Distance Estimation Using LIDAR or other range sensors; (4) Width Estimation using LIDAR and SFM (see Algorithm 3A (shown as pseudo-code) provided below).

Reference will now be made to an Algorithmic Framework according to various embodiments. Presented are two algorithmic approaches for robust estimation of crop stem width under highly uncertain field conditions. The algorithms have been divided into phases. Phase 1 (see those elements above the line marked "Phase 1" in FIG. 6) is the same for both algorithms, and involves a common image processing algorithm for foreground extraction (see the pseudo-code of Algorithm 1A provided below). Phase 2 (see those elements below the line marked "Phase 1" and above the line marked "Phase 2" in FIG. 6) consists of depth estimation using structure from motion and LIDAR point clouds for each approach, respectively (the final outputs from "Phase 2" are not separately identified as a "Phase"). The framework has been summarized in FIG. 6 and described in detail below.

Figure 7:
FIG. 7 depicts a video frame 701 according to an embodiment. As seen in this FIG., window 702 (rectangular marker) is placed at the left side of the video frame. The center of the frame appears blurred, but no blurring is visible inside the window at the left.

Referring now in particular to Phase 1: Foreground Extraction it is noted that a fixed sized window is defined at the side (in this example, at the left side) of each video frame and only that region is processed to extract a stem boundary if present. The size of the window used in this example was as follows: Width=frame_width/4; Height=10*frame_height/11 (since the algorithm used in this embodiment is robust to slight variation in the window size, other dimensions can be used). The choice of this size is based on two assumptions valid for most crop fields: (1) The stem width does not exceed 4 inches; (2) Stems never come closer than 3 inches to the camera lens without blur. This window size has worked for validation tests, and hence it is possible to avoid using a variable-sized window—this avoids unnecessary and redundant calculations (in another example, a variable-sized window could be used; in another example, the window can extend the full height of the frame). Placement of the window is on a side (in this example) instead of the center because video frames sometimes blur towards the center (e.g., due to small row spacing), in spite of the high frame rate (e.g., 90 fps) and additional lights (see, e.g., the light on the robot of FIG. 4). As mentioned, in this example, the window has been placed at the left side, but choosing the right side is also acceptable. The placement of the window 702 of this embodiment is shown in FIG. 7. The window 702, placed in each frame of the raw video, is processed to find out if an un-occluded part of the stem is visible. The rest of the video frame does not need to be utilized, and this is done (in this example) to reduce computational overhead. In this embodiment, discarding the rest of the frame does not cause any valuable information loss since the robot traverses through the entire row visiting each plant one by one, so all parts of the frame pass through the chosen window at some point in time. In this embodiment, an approach of multiple windows is avoided to reduce the chance of double counting of the same plant multiple times (which would distort the estimated width distribution across the plot).

Figure 8A:
FIGS. 8A-8F depict sequential steps of an embodiment for foreground extraction from a cropped window of a current video frame (see pseudo-code of Algorithm 1A provided below). As seen in these FIGS. (showing images 801, 803, 805, 807, 809 and 811), these sequential steps include.
Figure 8B:
Figure 8C:
Figure 8D:
Figure 8E:

Referring now to FIGS. 8A-8F, these depict sequential steps of an embodiment for foreground extraction from a cropped window of a current video frame (see pseudo-code of Algorithm 1A provided below). As seen, in this embodiment, these sequential steps include: FIG. 8A—Unprocessed window $f_n$ with high clutter; FIG. 8B—Edges of the image of FIG. 8A after Canny edge detection; FIG. 8C—Dilation of the image of FIG. 8B; FIG. 8D—Erosion of the image of FIG. 8C; FIG. 8E—Inversion of the image of FIG.

Figure 8F:
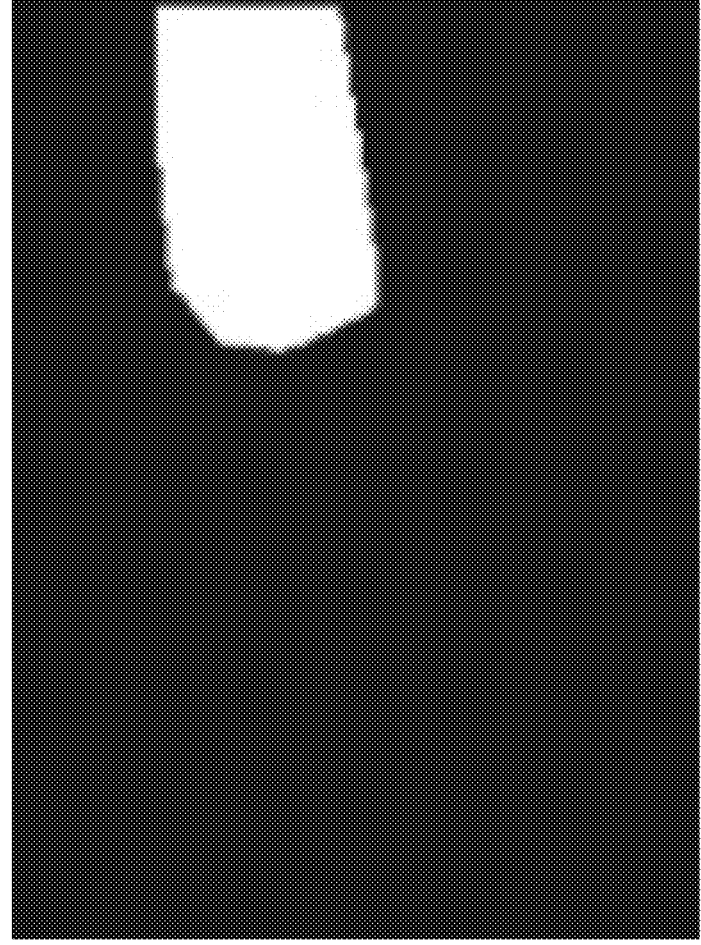

8D; FIG. 8F—Foreground extraction and smoothing by removing unwanted components from the image of FIG. 8E after CCL (connected component labeling) and convex hull approximation respectively.

In general, the pseudo-code of Algorithm 1A can provide for foreground extraction of cropped video frame from cluttered background as follows:

1: procedure EDGES(fn). Function to return edges (fe) from cropped video frame fn 2: procedure MORPH(fe).fe$_2$: Function to perform dilation, erosion inversion on the edges(fe) and return cluttered foreground (fe$_2$)

3: procedure FOREGROUND(fe$_2$). Function to perform connected component labeling on fe$_2$ to remove clutter, and to smoothen foreground mask. Returns clean and smooth foreground fullMask The details of the pseudo-code of Algorithm 1A (Foreground Extraction of cropped video frame from cluttered background) are as follows:

---

Algorithm 1A Foreground Extraction of cropped video frame from cluttered background.

```
 1:  procedure EDGES(f_n)
 2:                  ▷ f_n : cropped window from n^th video frame
 3:      f_h ← equalizeHist(f_n)
 4:      f_g ← GaussianBlur(f_h)
 5:      f_e ← Canny(f_g)
 6:      return f_e              ▷ f_e : the edges of f_n
 7:  procedure MORPH(f_e)
 8:      ker1 ← kernel(25 × 3)
 9:      ker2 ← kernel(15 × 15)
10:      f_ed ← dilate(f_e, ket1)
11:      f_ee ← erode(f_ed,ker2)
12:      f_e2 ← 255 − f_ee
13:      return f_e2 ▷ _fe2 : After dilation, erosion, inversion
14:  procedure FOREGROUND(f_e2)
15:      labels ← CCL(f_e2)
16:      props ← regionProperties(labels)
17:      lbMask ← zeros(size(labels))
18:                       ▷ To contain individual components
19:      fullMask ← zeros(size(labels))
20:      ▷ if lbMask passes tests, it gets added to fullMask
         later
21:      while lb = unique(labels) do
22:              ▷ Loop through each labeled component
23:          cond1 ← props(lb).size > 500
24:                          ▷ Condition 1: size>500 pixels
25:          cond2 ← props(lb).eccentricity > 0.9
26:          cond3 ← (props(lb).orientation > −0.3) and
         (props(lb).orientation < 0.3)
27:          If cond1 and cond2 and cond3 then
28:              lbMask ← convexHull(lbMask)
29:          fullMask ← fullMask + lbMask
30:          lbMask ← zeros(size(labels))
31:      return fullMask          ▷ Returns the foreground
```

---

Still referring to FIGS. 8A-8F (and Algorithm 1A):

A. Canny Edge Detection: In this embodiment a Canny edge detection technique (see, e.g., [5A] J. Canny. A computational approach to edge detection. *IEEE Transactions on Pattern Analysis and Machine Intelligence*, PAMI-8(6):679-698, November 1986. ISSN 0162-8828. doi: 10.1109/ TPAMI.1986.4767851) is used to find out the edges as a first step (see, e.g., FIG. 8B). This technique has been adopted here because of its easy availability, and robustness over other available edge detection techniques (like Sobel, Laplacian (see, e.g., [4A] Gary Bradski and Adrian Kaehler. *Learning OpenCV: Computer Vision in C++ with the OpenCV Library*. O'Reilly Media, Inc., 2nd edition, 2013. ISBN 1449314651, 9781449314651.).

B. Morphological Operations: Owing to noise and variable lighting conditions, the edges obtained in the previous step are often broken. The edges are closed by using morphological dilation followed by erosion (see, e.g., [4A] Gary Bradski and Adrian Kaehler. *Learning OpenCV: Computer Vision in C++ with the OpenCV Library*. O'Reilly Media, Inc., 2nd edition, 2013. ISBN 1449314651, 9781449314651) and inverting the image (see, e.g., FIGS. 8C, 8D and 8E). In this example, a rectangular kernel of size 25×3 is used for dilation followed by a kernel size of 15×15 for erosion. Using a long rectangular kernel helps restore the horizontal width information; the vertical gradients become distorted, which are not of significance in this embodiment.

C. Components Removal: Connected component labeling (CCL) is performed for the extraction of stem from a cluttered image like shown in FIG. 8E. This can be performed, for example, using the skimage library in python (see, e.g., [12A] Christophe Fiorio and Jens Gustedt. Two linear time union-find strategies for image processing. *Theoretical Computer Science*, 154(2):165-181, 1996. ISSN 0304-3975. doi: https://doi.org/10.1016/0304-3975(94) 00262-2. URL http://www.sciencedirect.com/science/article/pii/0304397594002622 and Kesheng Wu, Ekow Otoo, and [34A] Kenji Suzuki. Optimizing two-pass connected-component labeling algorithms. *Pattern Anal. Appl.*, 12(2): 117-135, February 2009. ISSN 1433-7541. doi: 10.1007/s10044-008-0109-y. URL http://dx.doi.org/10.1007/s10044-008-0109-y). A labeled image is obtained in which each white component of FIG. 8E is indexed differently. Using skimage the essential characteristics of each labeled component are measured and the objects that do not have the desired characteristics of a stem are removed. For example, a stem must have larger size than background clutter, higher eccentricity than undesired leaf and more erect orientation than the diverging branches. In one example, required are only the stem components which are cylindrical, and which are projected as long rectangles on the video frames. If an ellipse is approximated around them, the eccentricity of such ellipses are high(>0.8). In one example, the constraint of orientation of $40^0$ is provided on the left and right. These three constraints (size, eccentricity and orientation) remove most of the background clutter and non-stem components like leaves or other objects like sign boards or shoes of a person walking. FIG. 8F shows the cleaned up image after this step.

Figure 9A:
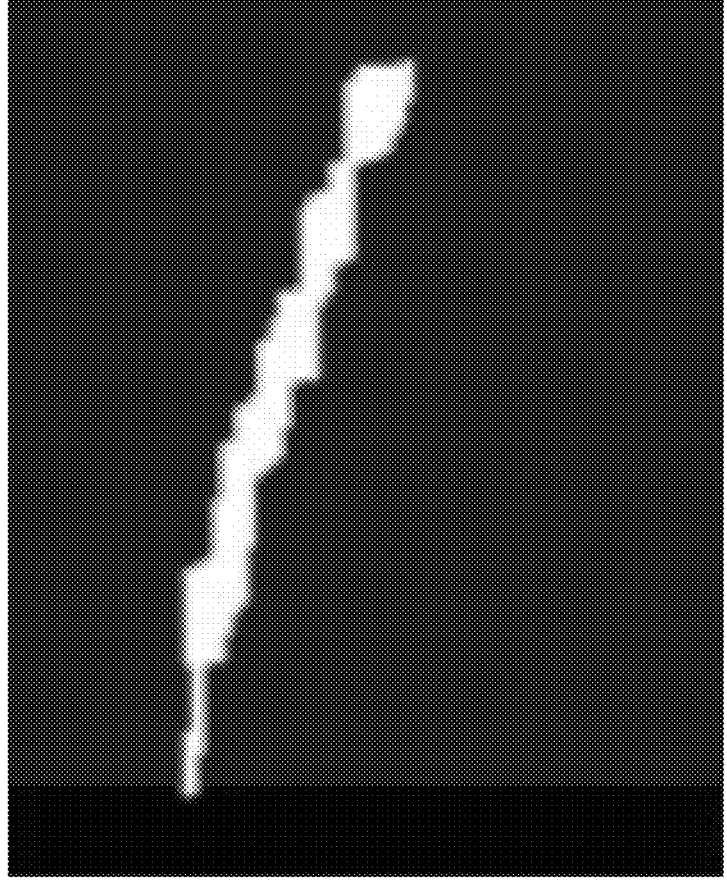
FIGS. 9A-9D (showing images 901, 903, 905 and 907) depict foreground smoothing of an embodiment.
Figure 9B:
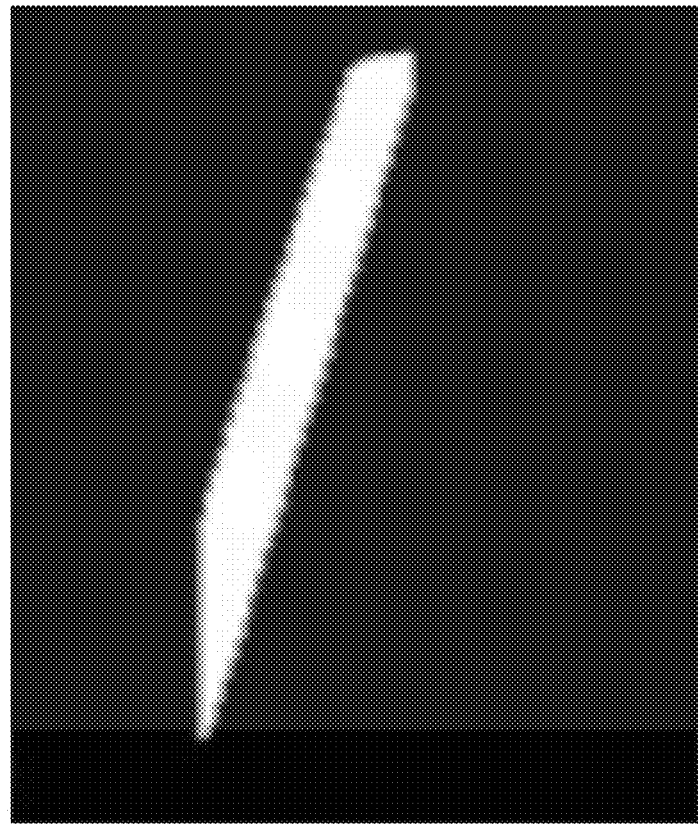
Figure 9C:
Figure 9D:
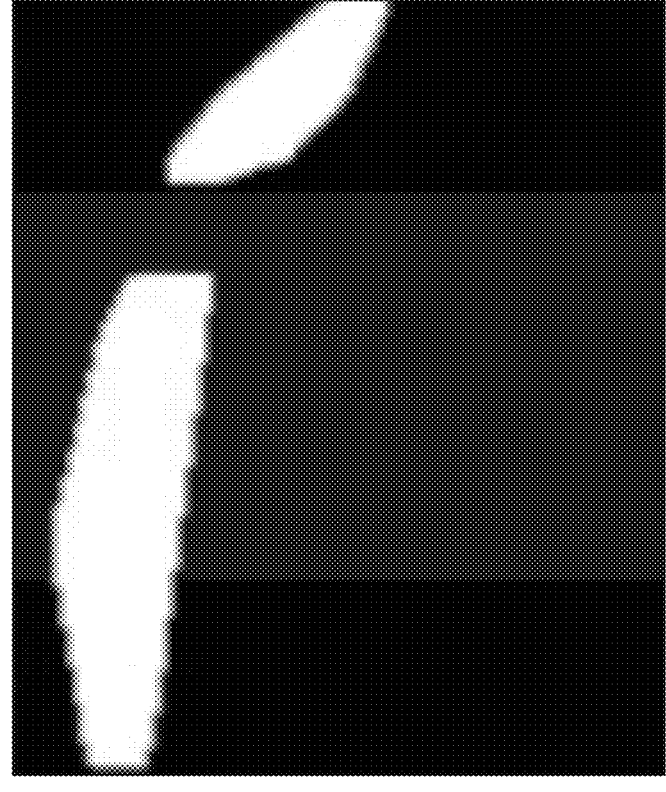
Figure 10A:
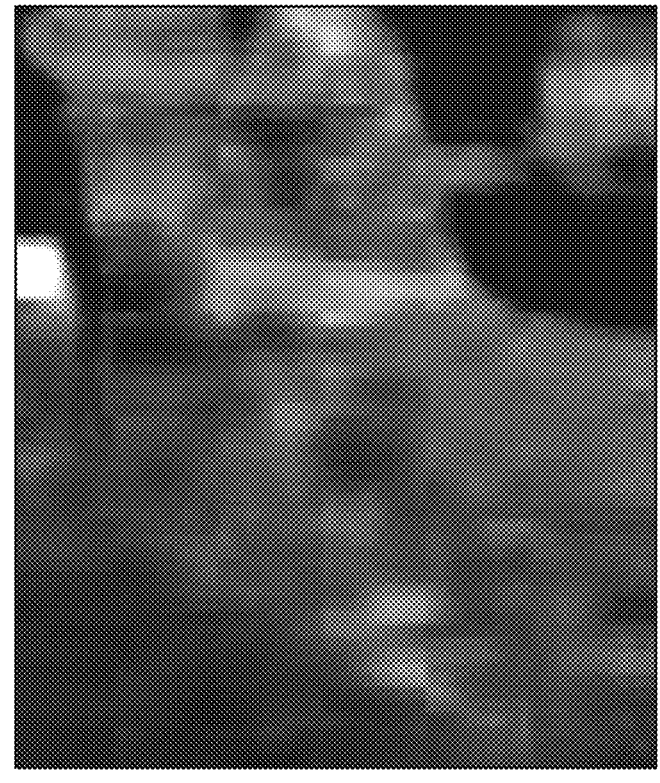
FIGS. 10A-10D (showing images 1001, 1003, 1005 and 1007) depict gray-scale visualization of dense optical flow using Farnebäck ([11A] Gunnar Farneback. Two-frame motion estimation based on polynomial expansion. In *Proceedings of the 13th Scandinavian Conference on Image Analysis*, SCIA'03, pages 363-370, Berlin, Heidelberg, 2003. Springer-Verlag. ISBN 3-540-40601-8. URL http://dl.acm.org/citation.cfm?id=1763974.1764031) algorithm in the direction of robot movement (according to an embodiment) for 5 consecutive windows. Lighter color means higher velocity (see Algorithm 2A (shown as pseudo-code) provided below).
Figure 10B:
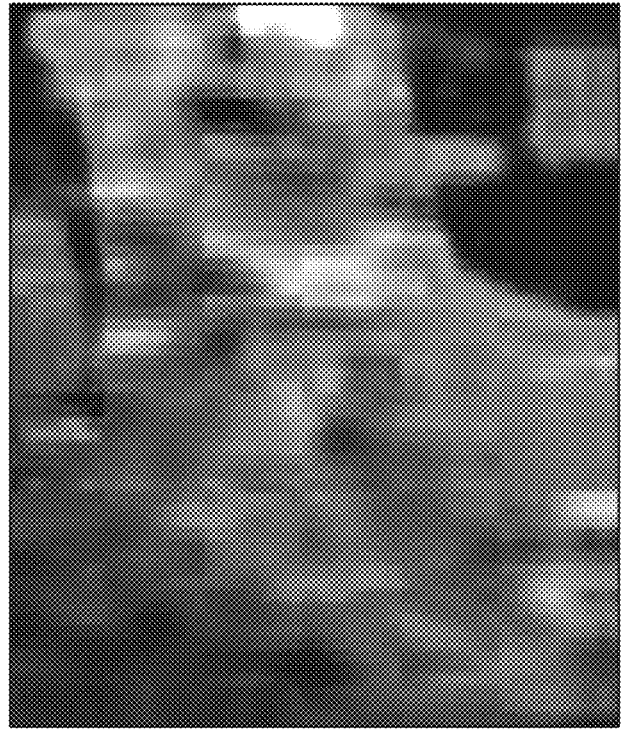
Figure 10C:
Figure 10D:

D. Polygon Approximation: A rough mask of the plant stem is obtained after the above process that is clean and devoid of unnecessary components. To smoothen the mask, a convex hull is found of these 2D point sets using Sklanskys algorithm (see, e.g., [31A] Jack Sklansky. Finding the convex hull of a simple polygon. *Pattern Recogn. Lett.*, 1(2): 79-83, December 1982. ISSN 0167-8655. doi: 10.1016/0167-8655(82)90016-2. URL http://dx.doi.org/10.1016/0167-8655(82)90016-2). This is shown in FIGS. 9A-9D: FIGS. 9A and 9C depict (for a first image and a second image, respectively) a rough foreground after CCL; FIG. 9B (corresponding to the first image of FIG. 9A) depicts a smooth foreground after approximating convex hull around the object of interest; FIG. 9D (corresponding to the second image of FIG. 9C) depicts a smooth foreground after approximating convex hull around the object of interest.

Referring now in particular to Phase 2 (see, e.g., FIG. 6) a discussion will be directed to Camera motion estimation as follows: Structure from motion (SfM) is used in one embodiment to estimate the actual width of the stems from the width in pixels. The SfM problem in computer vision is the problem of recovering the three-dimensional structure of a stationary scene from a set of projective measurements, represented as a collection of two-dimensional images, via estimation of motion of the camera. In essence, SfM typically involves the three main steps of: (1) extraction of features in images and matching these features between images; (2) camera motion estimation (e.g., using relative pairwise camera positions estimated from the extracted features); and (3) recovery of the 3D structure using the estimated motion and features (e.g., by minimizing the so-called re-projection error) (see, e.g., [26A] Onur O" zyesil, Vladislav Voroninski, Ronen Basri, and Amit Singer. A survey on structure from motion. CoRR, abs/1701.08493, 2017. URL http://arxiv.org/abs/1701.08493). Steps (1) and (2) mentioned above are used in an embodiment to determine average pixel velocity of the clean foreground in each frame. Step (1) above is performed, for example, using Gunnar Farnebäck's algorithm (see, e.g., [11A] Gunnar Farnebäck. Two-frame motion estimation based on polynomial expansion. In *Proceedings of the 13$^{th}$ Scandinavian Conference on Image Analysis*, SCIA'03, pages 363-370, Berlin, Heidelberg, 2003. *Springer-Verlag. ISBN* 3-540-40601-8. URL http://dl.acm.org/citation-.cfm?id=1763974.1764031.). This algorithm (see the pseudo-code of Algorithm 2A below) computes the dense optical flow for all points in the window and gives a 2 channel array with optical flow vectors (Vx, Vy). FIGS. 10A-10D show the gray-scale visualization of dense optical flow using Farnebäck algorithm in the direction of robot movement (according to an embodiment) for 5 consecutive windows. Lighter color means higher velocity (see Algorithm 2A (shown as pseudo-code) provided below). An approach of dense optical is adopted instead of sparse optical flow, that involve tracking of feature points across video frames (like Lucas Kanade algorithm (see, e.g., [20A] Bruce D. Lucas and Takeo Kanade. An iterative image registration technique with an application to stereo vision. In *Proceedings of the 7th International Joint Conference on Artificial Intelligence-Volume* 2, IJCAI' 81, pages 674-679, San Francisco, CA, USA, 1981. Morgan Kaufmann Publishers Inc. URL http://dl.acm.org/citation-.cfm?id=1623264.1623280)), because of the lack of distinctively different points on the stems and leaves in a sorghum field.

---

Algorithm 2A Camera motion estimation using dense
optical flow (structure from motion).

---

```
1: procedure OPTFLOW(f_n, V_R)
2:    ▷ f_n: window for n^th video frame, V_R: instantaneous
      robot velocity
3:    (V_x,V_y) ← denseOpticalFlow(frame, 10)
4:                        ▷ For 10 consecutive frames
5:    R ← V_R/V_x    ▷ V_x: motion in horizontal direction
6:    return R    ▷ Ratio to be used for width calculation
```

---

Referring now again in particular to Phase 2 (see, e.g., FIG. 6) a discussion will be directed to Lateral Distance Estimation Using LIDAR or other range sensors. FIG. 4 shows the LIDAR sensor mounted on the robot in one possible location. The LIDAR is a type of active range sensor that uses a scanning mechanism to provide distance of objects in its range. The returns from the LIDAR are known as the point cloud. Although LIDAR sensor range can be in excess of 30 m, meaningful readings do not surpass a few meters, because row spacing is (in this example) below 1 m. Frequent occlusion by leaves and weeds interfere with measurements from ahead of the lane, hence, the points too close to the robot are discarded as clutter by leaves. The LIDAR point cloud can be used to estimate distance to the row using the points by a weighted mean of the point distances to the line of traversal of the robot.

Figure 11:
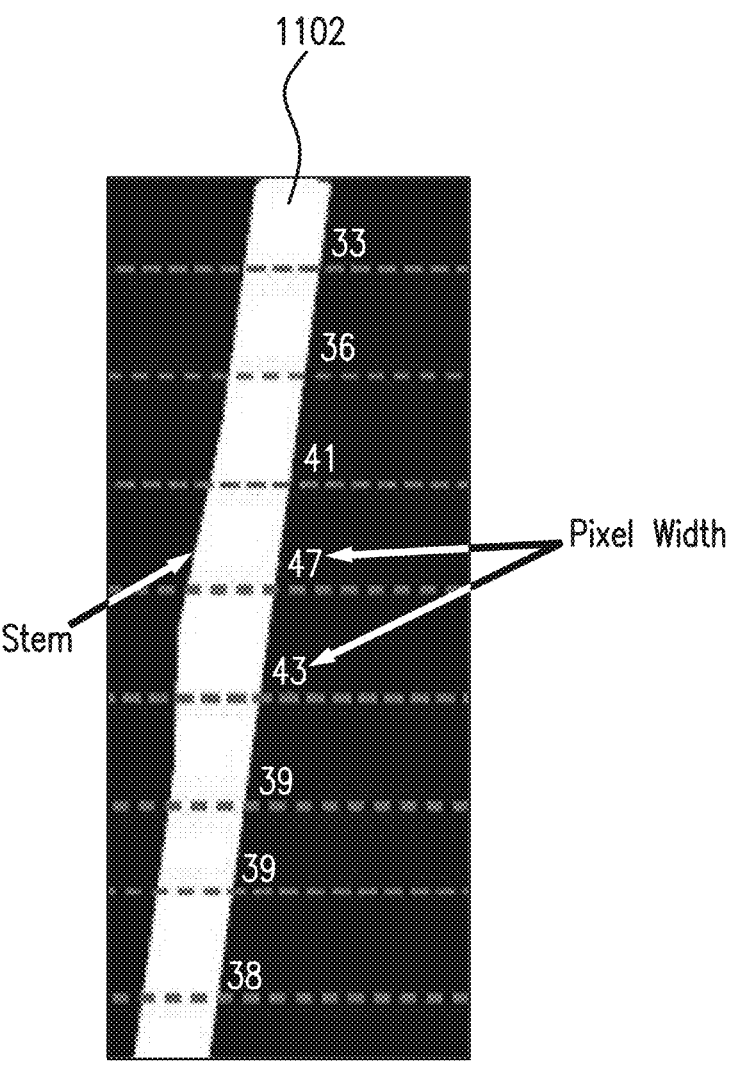
FIG. 11 depicts an image 1101 showing pixel width ($W_{P_i}$) according to an embodiment at N different places (N=8) of a sorghum stem 1102. In this example, the pixel widths (from top to bottom) are 33, 36, 41, 47, 43, 39, 39 and 38 (only two of these pixel widths are separately identified in the FIG.).

Referring now again in particular to Phase 2 (see, e.g., FIG. 6) a discussion will be directed to Width Estimation from SFM and LIDAR data as follows: A clean white foreground mask on black background, which has the same length and breadth as the fixed window, is obtained after Phase 1, which is the mask for the desired stem boundary. N imaginary horizontal lines are drawn on the mask image and for each line, the number of white pixels are recorded. This gives the width in pixels ($W_{Pi}$) at N different locations of the stem (as shown in FIG. 11). The actual width estimation process from pixel width is described in more detail as follows (see, also, the pseudo-code of Algorithm 3A below).

---

Algorithm 3A - Width Estimation

```
 1: procedure PIXELWIDTH(fullMask, N)
 2:              ▷ fullMask: Output from Algorithm 1
 3:     i ← N
 4:     while i>0 do
 5:         WPᵢ[i] ← CountWhitePixels(col[i])
 6:           ▷ col[i]:column numbers for width calculation
 7:         i ← i − 1
 8:     return W_Pᵢ
 9:
10: procedure SFMWIDTH(W_Pᵢ, R)
11:                   ▷ R: output from Algorithm 2
12:     W_Sᵢ ← W_Pᵢ × R
13:     W_S ← sum(W_Sᵢ)
14:     return W_S      ▷ W_S: average width from SFM
15:
16: procedure LIDARWIDTH(W_Pᵢ, D,F)
17:       ▷ D: output from Algorithm3, F: focal length of
             camera
18:     W_Lᵢ ← W_Pᵢ × D/F
19:     W_L ← sum(W_Lᵢ)
20:     return W_L      ▷ W_L: average width from LIDAR
```

---

Still referring to Phase 2, the Width Estimation from SFM approach can operate as follows: To obtain the actual stem width $W_{Si}$, each $W_{Pi}$ has to be multiplied with a certain ratio R. The ratio of the average horizontal foreground pixel velocity (Vx) calculated as described above (see Camera Motion Estimation), to the actual instantaneous velocity ($V_R$) of the robot gives R, which is the desired ratio ($V_R$ is obtained, for example, from the encoder readings). Equations 1A, 2A and 3A below show the steps for width calculation from SfM. The width ($W_S$) obtained for a particular window is the average of all the $W_{Si}$.

$$R = \frac{V_R}{V_X} \tag{1A}$$

$$W_{S_i} = W_P \times R \tag{2A}$$

$$W_S = \frac{1}{N}\sum_{i=1}^{N} W_{S_i} \tag{3A}$$

This approach of using SfM obviates the need to use complex sensors like the REALSENSE or stereo camera to estimate the depth information.

Still referring to Phase 2, the Width Estimation from LIDAR data approach can operate as follows: The instantaneous distance from the camera to the crop row under consideration (D) is obtained as described above (see, Lateral Distance Estimation Using LIDAR or other range sensors). The width from LIDAR $W_L$ is calculated according to Equations 4A and 5A.

$$W_{L_i} = W_P \times D \div F \tag{4A}$$

$$W_L = \frac{1}{N}\sum_{i=1}^{N} W_{L_i} \tag{5A}$$

As described above, $W_S$ and $W_L$ are the outputs from two algorithmic approaches presented. The results obtained after validating these estimations are discussed in detail below.

Reference will now be made to certain results associated with various embodiments described herein. A significant contribution of work associated with various embodiments described herein is in the validation of the presented algorithms in biomass sorghum (*Sorghum bicolor* (L.) Moench) in real fields (all experiments described herein have been performed near the last growth stage of sorghum, when the clutter and leaf occlusion is the highest among all growth stages).

Figure 12:
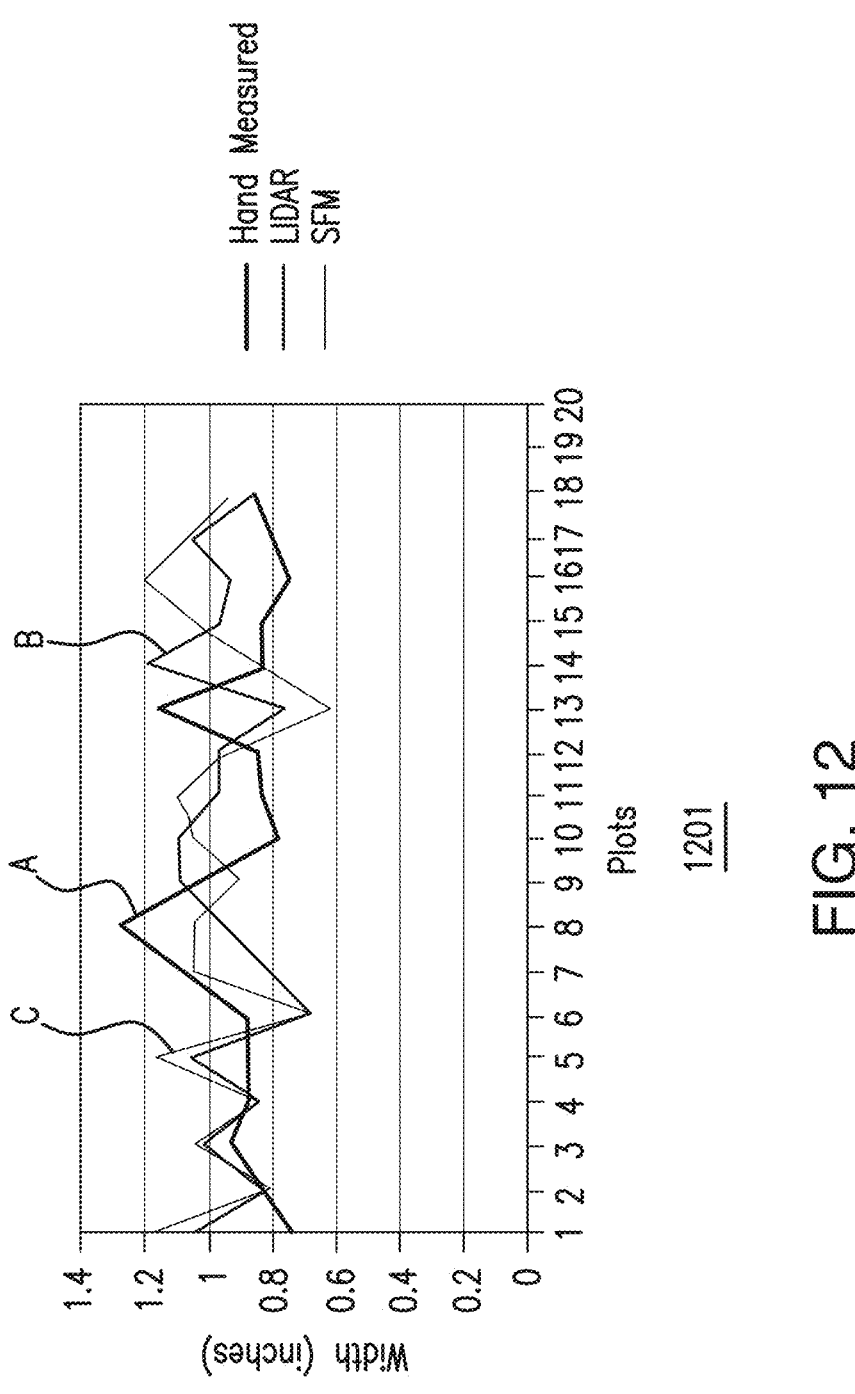
FIG. 12 depicts a graph 1201 showing distribution of manual measurements, LIDAR Width according to an embodiment and SFM Width according to an embodiment across 18 Plots of sorghum in Maxwell's field.
Figure 13:
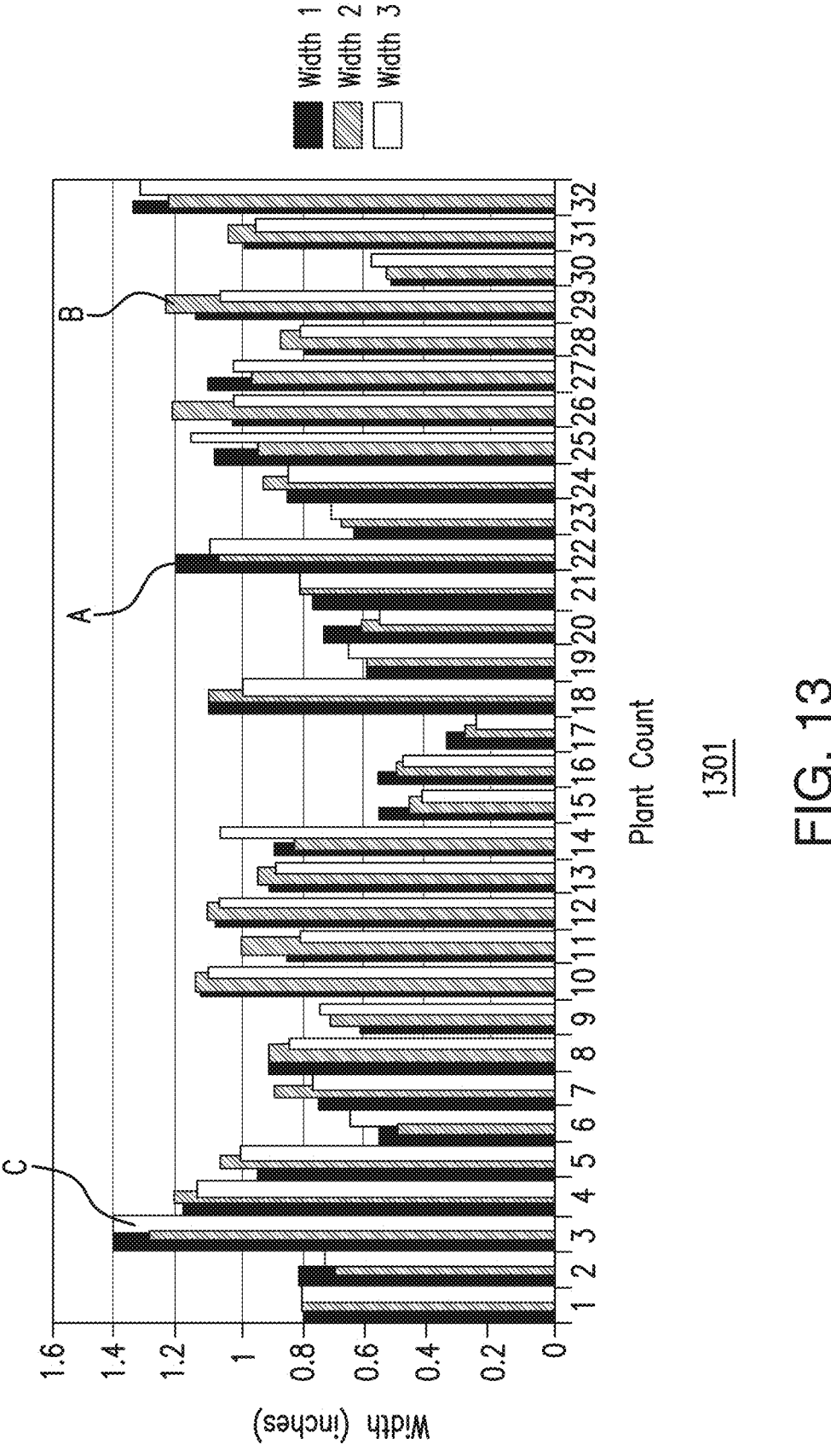
FIG. 13 depicts a graph 1301 showing variation of manual measurement per plant in plot 17MW0159. 3 measurements have been taken per plant for all plants in the plot. Standard Deviation: 0.256 inches.

Reference will now be made specifically to Experiment 1: Comparison with agronomists. Some of the algorithms presented herein have been compared against available manually measured plots in the 80 Acre sorghum experimental field (Maxwell fields at Savoy, Illinois). Each 3×3 meter plot consists of roughly 50 plants. A trained independent agronomist used industry-standard practices to measure the average stem-width of 20 plots dispersed across the field. The agronomist chose in each plot 3 representative plants, and made one manual measurement with vernier calipers from each of these 3 plants. This approach was designed to enable the agronomist to accumulate a reasonable amount of data from large fields within cost and time constraints. The industry practice is to use the average of these 3 readings to represent the average stem width for that plot. On the other hand, an embodiment of a robot such as described herein traversed through those 18 plots and attempted to measure stem width at multiple locations on every plant in the plot. The comparison is shown in FIG. 12 (in this FIG., the x-axis represents "Plots", the y-axis represents "Width (inches)", the trace labeled "A" corresponds to "Hand Measured", the trace labeled "B" corresponds to "LIDAR", and the trace labelled "C" corresponds to "SFM"). The percentage match of the algorithms presented herein with the hand measured width by the agronomists, considering all plots, is 78% using LIDAR and 76% from SFM. This disagreement is not surprising, since the sparse manual measurements of the agronomist are typically not reflective of the ground truth, nor do they typically represent the true nature of the width distribution of plants. Manual measurements are typically limited by cost and time considerations. They typically do not take into account the fact that the width of the plants varies along its length significantly, so a single measurement does not reflect the true plant width. Furthermore, the cross section of the stem is typically elliptical, not circular, therefore, the placement of vernier calipers affects the measurement. FIG. 13 (discussed in more detail below) depicts the amount of width variation in a single plot (this conventional lack of accuracy and rigor due to high cost of trained manual labor is a reason the industry is looking towards robotic high throughput phenotyping such as described herein with respect to various embodiments). Therefore, to evaluate the algorithms described herein against a true representation of the stem width, Experiment 2 was performed.

Figure 14A:
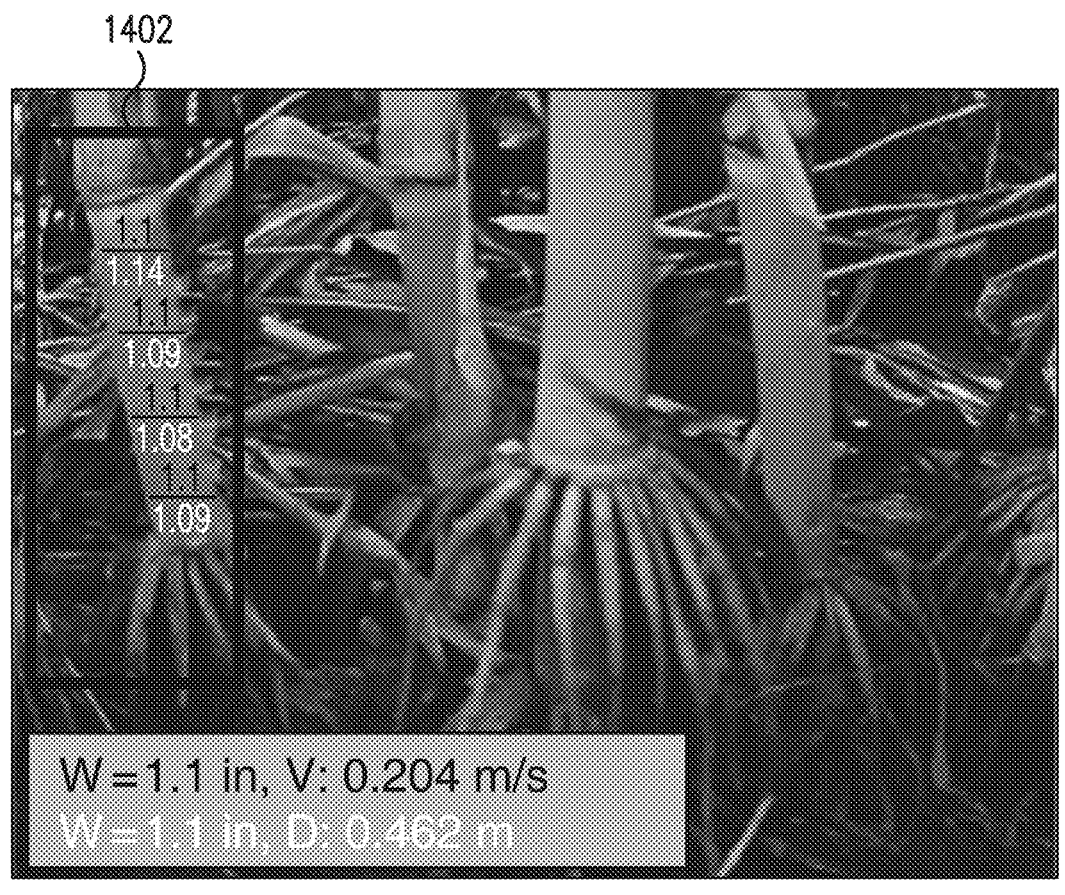
FIGS. 14A-14D depict, according to an embodiment, width estimation (in inches) for sorghum.
Figure 14B:
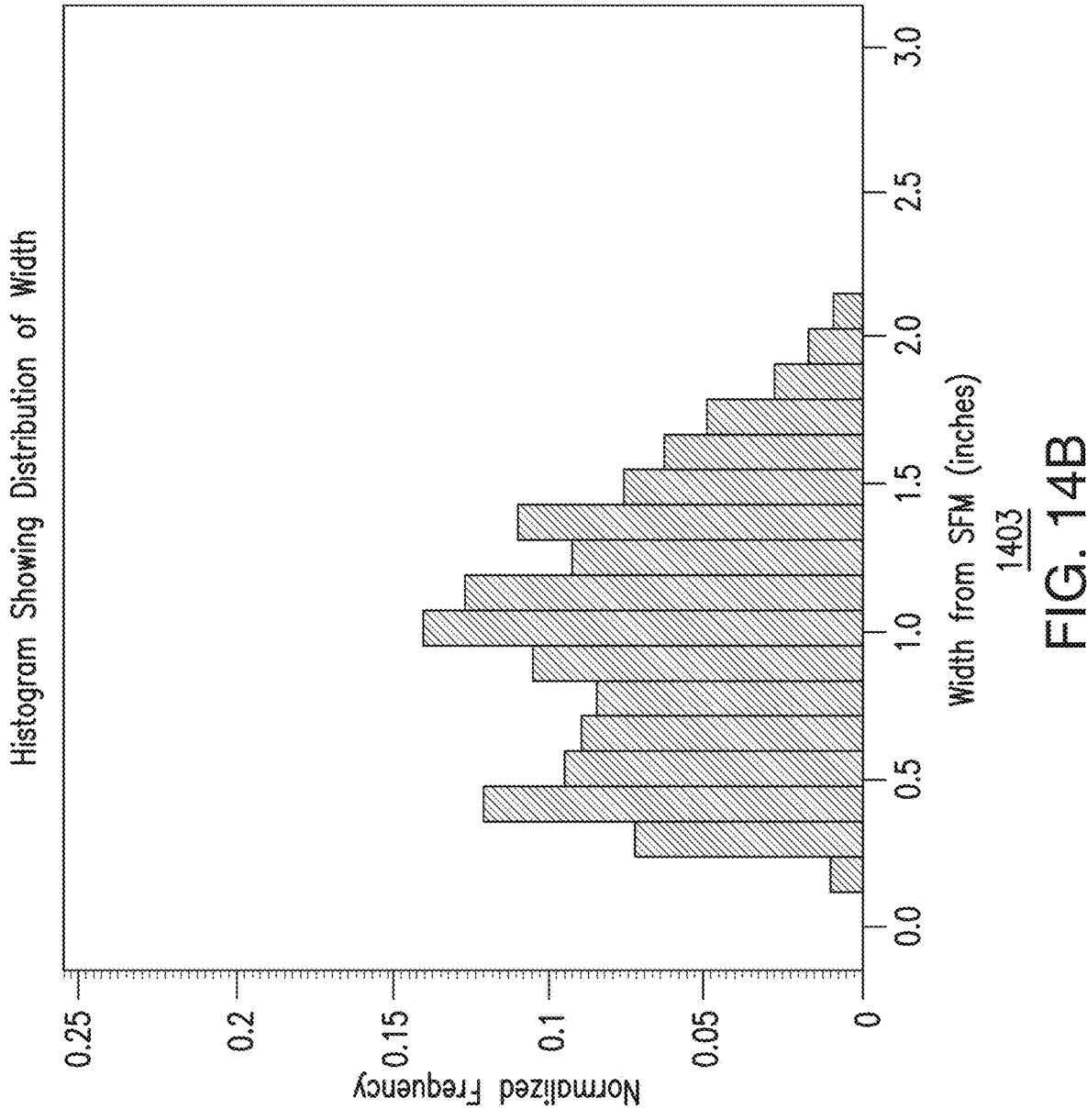
Figure 14C:
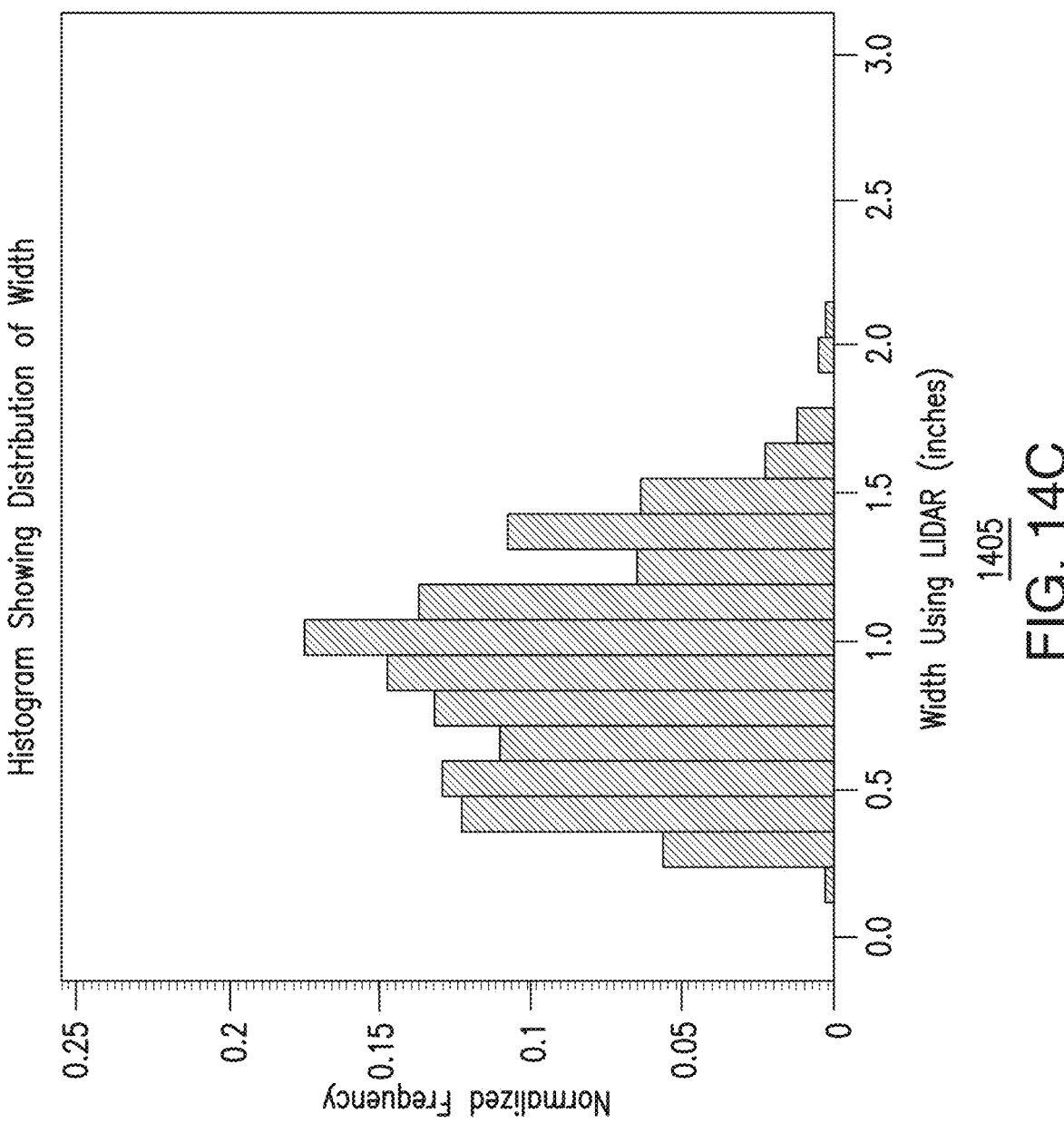
Figure 14D:
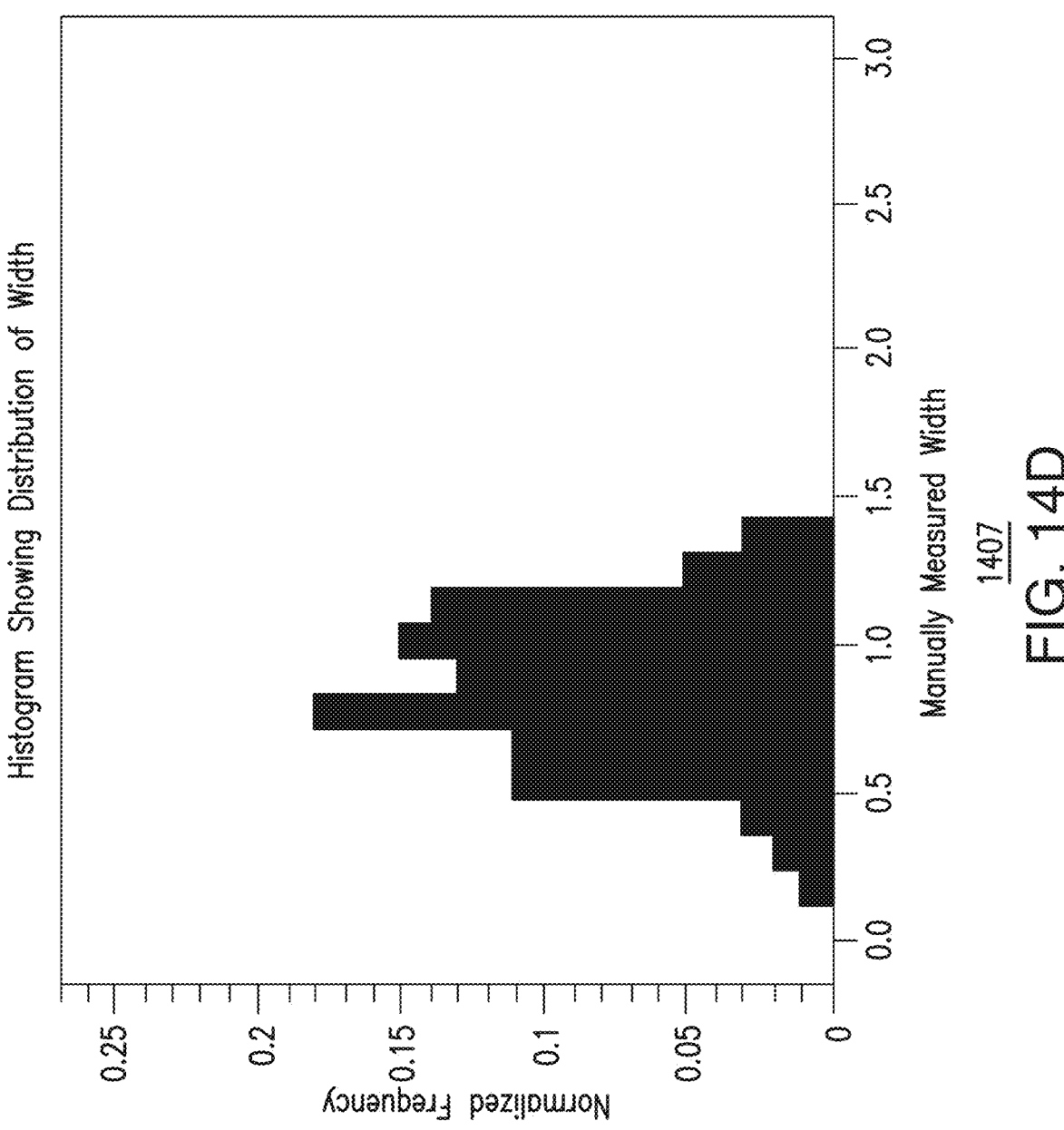

Reference will now be made more specifically to this Experiment 2: Comparison with extensive hand measurements. To address the limited agronomist obtained measurements mentioned above, extensive manual measurements were performed on a representative plot (17MW0159) in the sorghum field. 3 measurements were taken from different lengths of each plant from one row of the plot which consisted of 32 sorghum plants. FIG. 13 shows the variation in the 32×3 measurements (in this FIG., the x-axis represents "Plant Count", the y-axis represents "Width (inches)", the "A" bars (one of which is labeled) correspond to "Width 1", the "B" bars (one of which is labeled) correspond to "Width 2", and the "C" bars (one of which is labeled) correspond to "Width 3"). The standard deviation of such a distribution is 0.256 inches, clearly showing that averaging only 3 measurements per plot (such as discussed above, which is the conventional practice), is not very accurate. Even these latter measurements do not represent the "ground truth", however, they are the best available set of data against which a comparison could be made. Table II (below) shows that the robot based algorithms of various embodiments match with the exhaustive hand measurements at 91% when structure from motion is used, and 98% when vision and LIDAR are used (which is under the 8% tolerance set by a federal oversight agency). FIG. 14A shows a processed video frame for plot 17MW0159 as the robot according to an embodiment traversed through the plot. The processing window 1502 after cropping the video frame is marked indicated as the vertical rectangle on the left-hand side. The dark and light colors of various numbers indicate width using structure from motion and LIDAR data respectively. The values inside the window are the instantaneous width values (Dark: $W_{Si}$ and Light: $W_{Li}$) corresponding to different 'i's as described above, whereas the values at the bottom left corner are the average values for each method (Dark: $W_S$ and Light: $W_L$). All values in the figure are in inches. FIGS. 14B and 14C show the distribution of width for algorithms presented herein (using SFM and LIDAR, respectively) and FIG. 14D shows hand measured ground truth. Table I(A) (below) shows mean and variance of such measurements.

TABLE I(A)

Comparison of Mean and Variance of Width
Estimation from Algorithms of Various Embodiments and Hand Measured
Values for Plot 17MW0159

|  | LIDAR | SFM | Manual |
|---|---|---|---|
| Mean (inches) | 0.84528 | 0.93360 | 0.86014 |
| Variance (inches) | 0.13247 | 0.20301 | 0.06623 |

The results obtained after comparing the width estimation results with the average measurements from plot 17MW0159 are tabulated in Table II(A) (below). The processing time is 0.04 secs per video frame.

TABLE II(A)

Comparison of Manual Measurement with Results
Obtained from Algorithms of Various Embodiments for Plot 17MW0159

|  | Manual | LIDAR | SFM |
|---|---|---|---|
| Width (inches) | 0.86014 | 0.84528 | 0.93360 |
| % Match |  | 98.27 | 91.4587 |

Figure 15A:
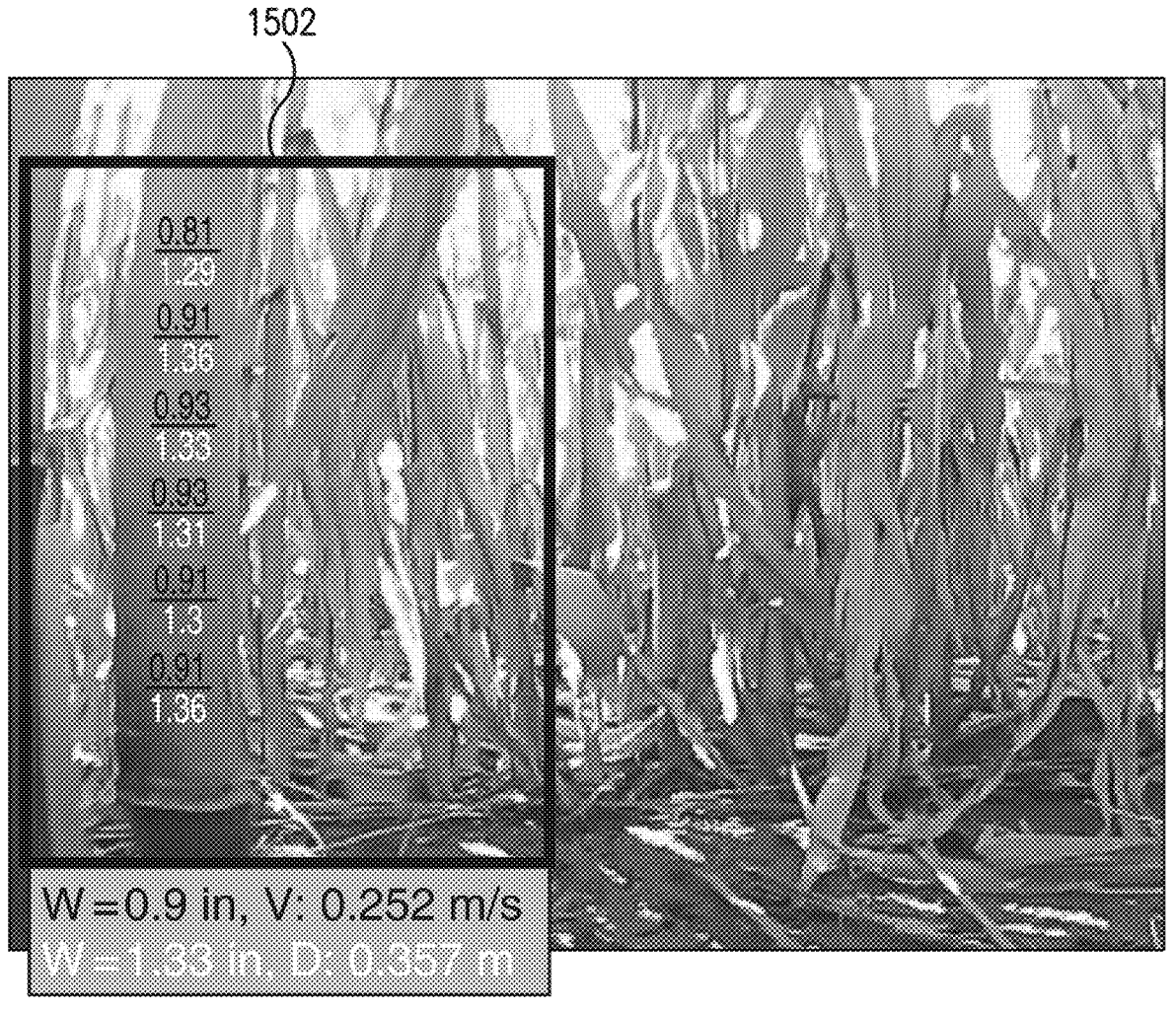
FIGS. 15A-15C depict, according to an embodiment, width estimation (in inches) for corn.
Figure 15B:
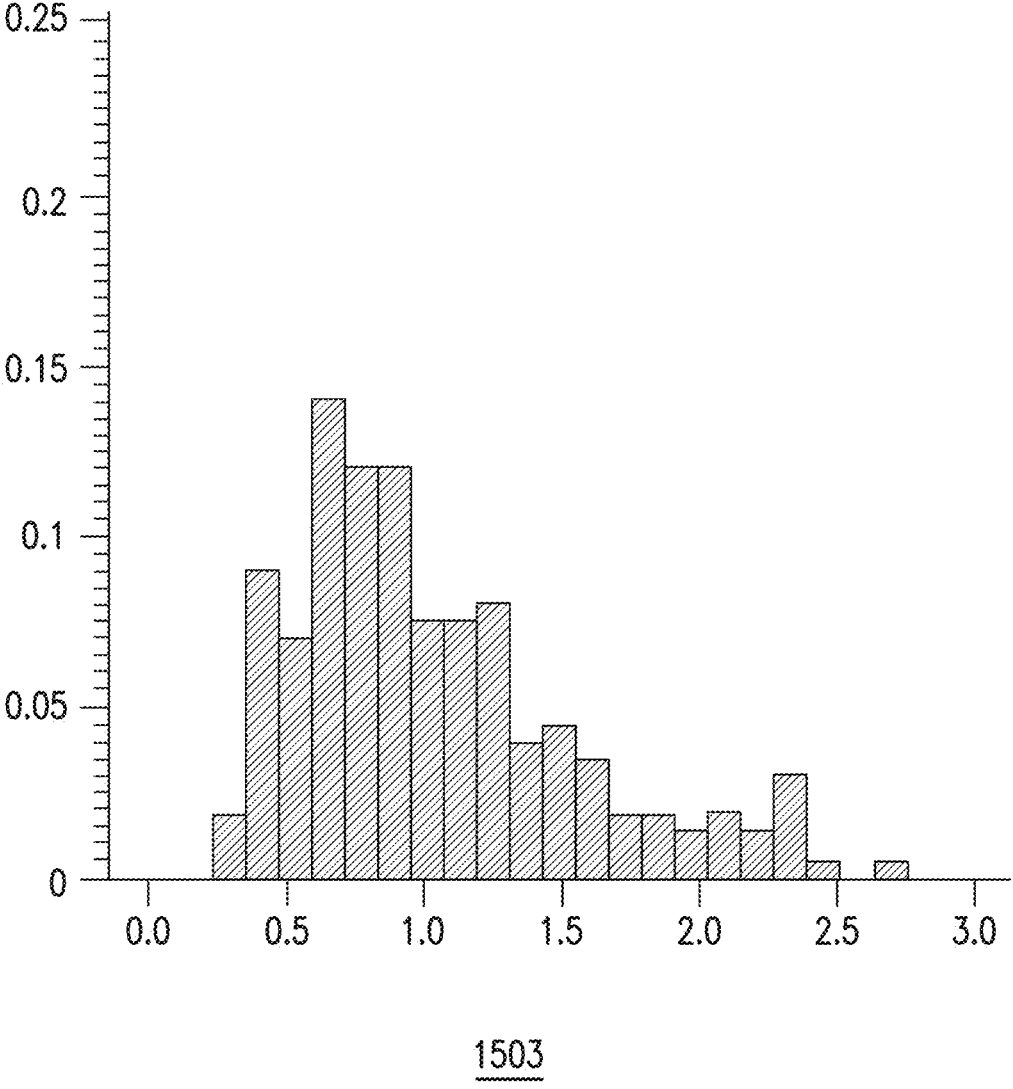
Figure 15C:
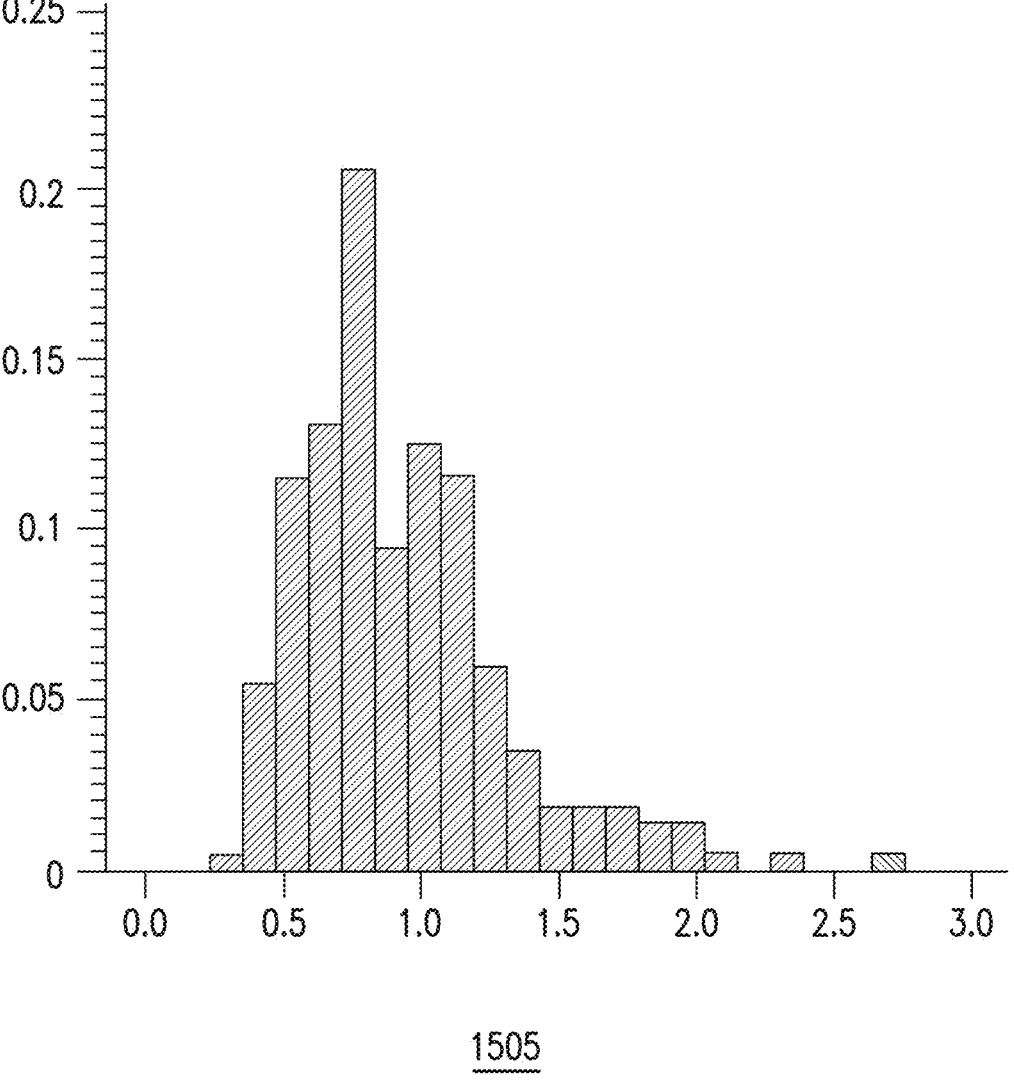

Reference will now be made to a demonstration of generalization to other crops. The presented algorithms of various embodiments have been extensively validated in sorghum across several plots consisting of different varieties of sorghum, at different times over a period of days and in different weather conditions (under bright sun and cloud cover). The results in all cases of Sorghum remain consistent. To further demonstrate robustness and generality, the algorithms have also been applied to other crops with cylindrical stems: corn and hemp, with no algorithmic modifications and a few changes in the parameters for edge detection. The results on corn and hemp data obtained at fields in parts of Illinois and Colorado are shown in FIGS. 15A-15C (corn) and FIG. 16A-16C (hemp). Various details of these FIGS. 15A-15C and 16A-16C are discussed below. The width estimates are within the expected ranges, however, a rigorous establishment of the ground truth on these crops was not performed due to lack of manual resources. Regardless, the results demonstrate that the algorithms of the embodiments, based on principles of machine vision, generalize well across different crops with little or no change to the parameters.

Referring now in particular to FIG. 15A, this depicts a typical video frame with window 1502 (rectangular marker). This FIG. 15A shows $W_{Si}$(the $1^{st}$, $3^{rd}$, $5^{th}$, $7^{th}$, $9^{th}$, and $11^{th}$ numbers from the top down) and $W_{Li}$ (the $2^{nd}$, $4^{th}$, $6^{th}$, $8^{th}$, $10^{th}$, and $12^{th}$ numbers from the top down) noted inside window 1502. This FIG. 15A also shows that $W_S$ (second number from the bottom on the left) and $W_L$ (number at the bottom on the left) are placed at the bottom left corner. This FIG. 15A also shows V as the instantaneous robot velocity. This FIG. 15A also shows D as the robot to plant distance measured by LIDAR. FIG. 15A shows distribution of width from SfM across all video frames (x-axis: width in inches; y-axis: normalized frequency). FIG. 15C shows distribution of width from LIDAR across all frames in the video (x-axis: width in inches; y-axis: normalized frequency).

Figure 16A:
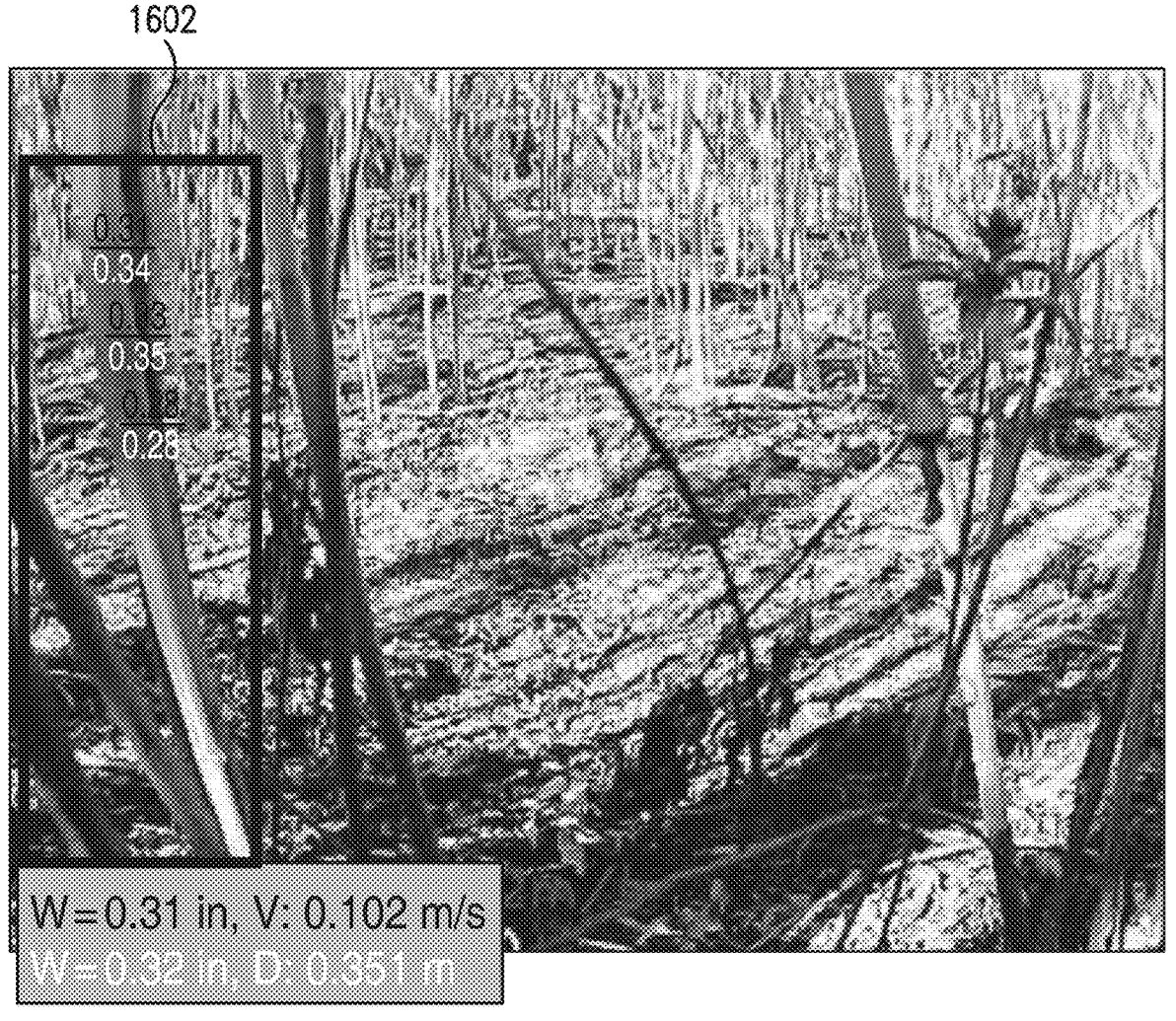
FIGS. 16A-16C depict, according to an embodiment, width estimation (in inches) for hemp.
Figure 16B:
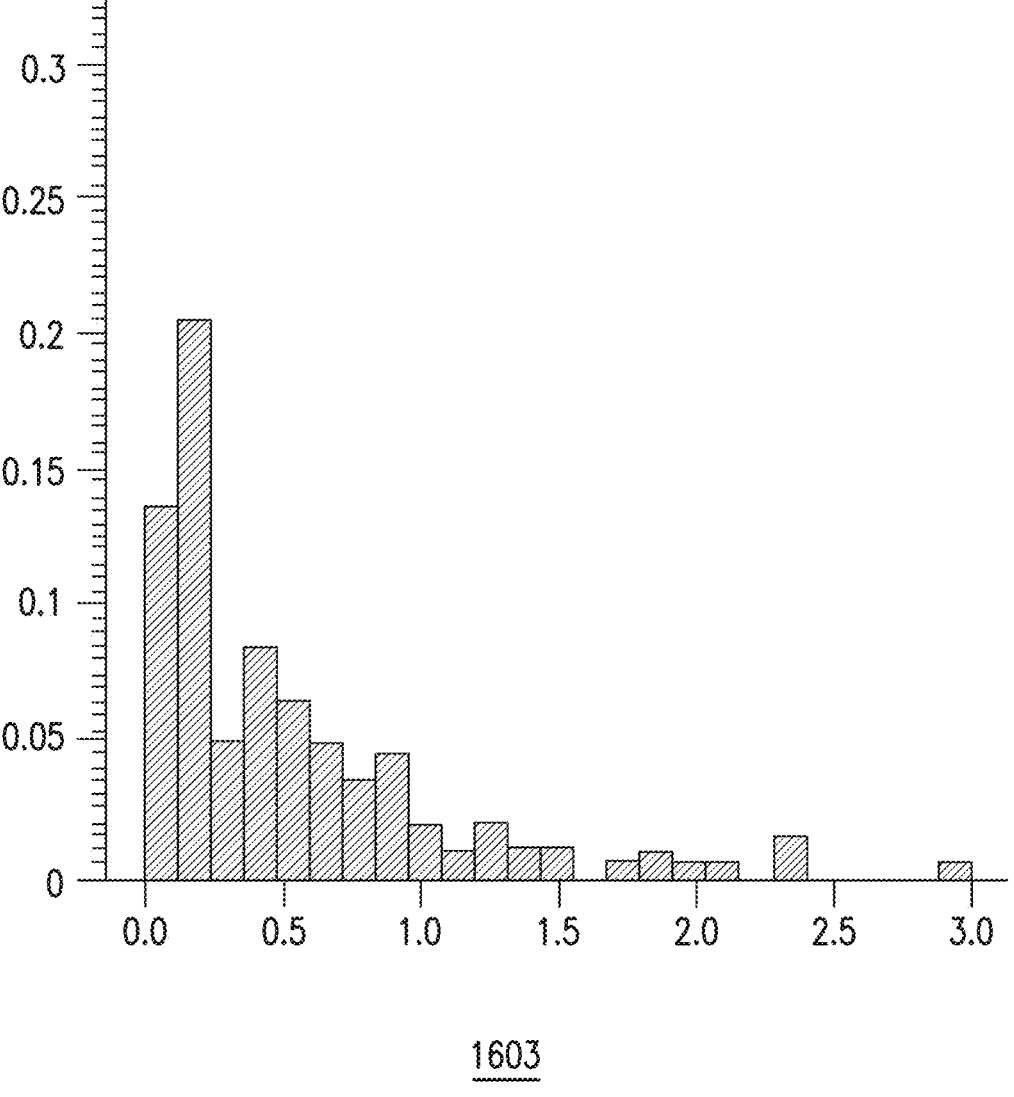
Figure 16C:
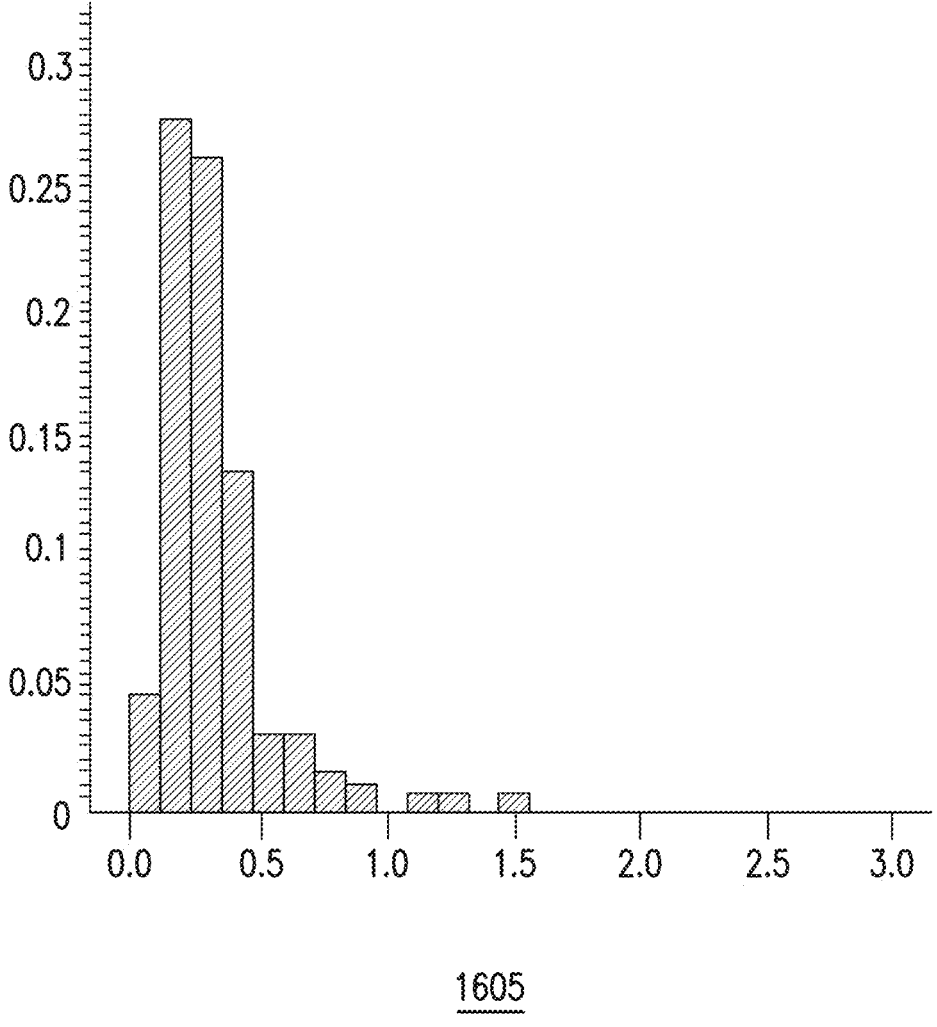

Referring now to FIG. 16A, this depicts a typical video frame with window 1602 (rectangular marker) This FIG. 16A shows WSi (the $1^{st}$, $3^{rd}$, $5^{th}$, $7^{th}$, $9^{th}$, and $11^{th}$ numbers from the top down) and $W_{Li}$ (the $2^{nd}$, $4^{th}$, $6^{th}$, $8^{th}$, $10^{th}$, and $12^{th}$ numbers from the top down) noted inside window 1602. This FIG. 16A also shows that $W_S$ (second number from the bottom on the left) and $W_L$ (number at the bottom on the left) are placed at the bottom left corner. This FIG. 16A also shows V as the instantaneous robot velocity. This FIG. 16A also shows D as the robot to plant distance measured by LIDAR. FIG. 16B shows distribution of width from SfM across all frames in the video (x-axis: width in inches; y-axis: normalized frequency). FIG. 16C shows distribution of width from LIDAR across all frames in the video (x-axis: width in inches; y-axis: normalized frequency).

As described herein, certain results are over 90% accurate. Furthermore, certain experiments were designed and evaluated on ground robots. Such ground robots typically need to deal with harsher conditions than faced by a UAS (however, ground robots can be more desirable for high throughput phenotyping (as opposed to a UAS), since such ground robots typically have a far closer and more detailed under-canopy view of plants) [25A].

Figure 17A:
FIGS. 17A-17C depict images 1701, 1703 and 1705 showing various problematic scenarios.
Figure 17B:
Figure 17C:

Reference will now be made to a few challenging situations that could benefit from the use of certain enhancements as described herein. FIG. 17A shows a situation where even manual classification of the image for stem or leaf is difficult. The picture shows a leaf, having color, size, eccentricity, orientation and shape just like the stem. Hence the algorithm falsely detects this as a stem. FIG. 17B shows a stem almost completely occluded by a leaf in front; there is no way to detect the stem in this case with the sensors that have been used in the described embodiments. FIG. 17B shows bright sunlight entering through dense sorghum canopy, causing stems and leaves to be only partially illuminated. In this case, only the partial contour is taken into account, leading to faulty width estimation. Training a machine learning algorithm could be one way to deal with such situations, but that could require thousands of labeled frames of videos taken under extreme field conditions. Another drawback of using deep learning is that the algorithms become crop specific, thereby losing generality, unlike the approaches described herein. Regardless, within reasonable weather and crop cover, the results from the embodiments of the robot-based methods should yield far more accurate and rich data than manual measurements alone.

As described herein are algorithms for estimation of crop stem width on small mobile robots. Stem width is an important phenotype needed by breeders and plant-biologists to measure plant growth, however, its manual measurement is typically cumbersome, in-accurate, and inefficient. Various algorithms presented herein use a common image processing core that is designed to extract the foreground in the presence of significant leaf and stem clutter, view of other rows, and varying lighting, from a side-facing USB camera on a small mobile robot. Using the extracted foreground, one algorithmic approach described herein uses estimates of robot velocity from wheel encoders and structure from motion to estimate depth, while another approach described herein employs use of the LIDAR 2-D point cloud to estimate the depth. These algorithms have been validated against available hand-measurements on biomass sorghum (*Sorghum bicolor*) in real experimental fields. Experiments indicate that both methods are also applicable to other crops with cylindrical stems without significant modifications. As described herein, the width estimation match on sorghum is 92.5% (using vision) and 98.2% (using vision and LIDAR) when compared against manual measurements by trained agronomists. Thus, the results described herein clearly establish the feasibility of using small robots for stem-width estimation in realistic field settings. Furthermore, the techniques presented herein can be utilized for automating other phenotypic measurements.

As described herein, are algorithms that are applicable to real field conditions under high clutter.

As described herein are algorithms that operate without use of a Hough transform.

As described herein, various embodiments utilize a structure from motion algorithm that does not need a depth sensor.

As described herein, various embodiments provide a general and computationally light algorithm for autonomous width estimation of crops with cylindrical stems under highly uncertain field conditions.

As described herein, various results have been validated with rigorous ground truth measurements for sorghum.

As described herein, various embodiments provide enhancements in the field of robotics for phenotyping applications.

As described herein, various embodiments provide algorithms that can work directly with robot-obtained data in field conditions.

As described herein, various embodiments provide algorithms for filtering useful content from noisy robot-obtained field images.

As described herein, various embodiments can facilitate generation of datasets that could feed future machine learning pipelines.

In other embodiments, various algorithmic approaches described herein can be used to develop a dataset specifically for field conditions (e.g., with masked labels for stems and leaves). This would enable the use of machine learning in the context of phenotype estimation tasks directed to, for example, leaf area, leaf angle, leaf count and further improved stem width.

Referring now to FIG. 18, various steps of a method 1801 according to an embodiment are shown. As seen in this FIG. 18, step 1803 comprises obtaining video data from a single monocular camera, wherein the video data comprises a plurality of frames, wherein the single monocular camera is attached to a ground mobile robot that is travelling along a lane defined by a row of crops, wherein the row of crops comprises a first plant stem, and wherein the plurality of frames include a depiction of the first plant stem. Next, step 1805 comprises obtaining robot velocity data from one or more encoders, wherein the one or more encoders are attached to the ground mobile robot that is travelling along the lane. Next, step 1807 comprises performing foreground extraction on each of the plurality of frames of the video data, wherein the foreground extraction results in a plurality of foreground images. Next, step 1809 comprises determining, based upon the plurality of foreground images and based upon the robot velocity data, an estimated width of the first plant stem.

Referring now to FIG. 19, various steps of a method 1901 according to an embodiment are shown. As seen in this FIG. 19, step 1903 comprises obtaining video data from a camera, wherein the video data comprises a plurality of frames, wherein the camera is attached to a ground mobile robot that is travelling along a lane defined by a row of crops, wherein the row of crops comprises a first plant stem, and wherein the plurality of frames include a depiction of the first plant stem. Next, step 1905 comprises performing foreground extraction on each of the plurality of frames of the video data, wherein the foreground extraction results in a plurality of foreground images. Next, step 1907 comprises obtaining sensor data from a light detection and ranging (LiDAR) sensor, wherein the LiDAR sensor is attached to the ground mobile robot that is travelling along the lane defined by the row of crops, and wherein the sensor data includes at least a portion of the row of crops. Next, step 1909 comprises determining, based upon the plurality of foreground images and based upon the sensor data, an estimated width of the first plant stem.

Referring now to FIG. 20, various steps of a method 2001 according to an embodiment are shown. As seen in this FIG. 20, step 2003 comprises obtaining video data from a single monocular camera, wherein the video data comprises a plurality of frames, and wherein the plurality of frames includes a depiction of a first plant stem in a row of crops. Next, step 2005 comprises obtaining vehicle velocity data from at least one of a plurality of wheels of a mobile vehicle. Next, step 2007 comprises performing foreground extraction on each of the plurality of frames of the video data, wherein the foreground extraction results in a plurality of foreground images. Next, step 2009 comprises determining, based upon the plurality of foreground images and based upon the vehicle velocity data, an estimated width of the first plant stem.

In another embodiment, a device is provided comprising: a processing system including a processor; and a memory that stores executable instructions that, when executed by the processing system, perform operations, the operations comprising: obtaining video data from a single monocular camera, wherein the video data comprises a plurality of frames, wherein the single monocular camera is attached to a ground mobile robot that is travelling along a lane defined by a row of crops, wherein the row of crops comprises a first plant stem, and wherein the plurality of frames include a depiction of the first plant stem; obtaining robot velocity data from one or more encoders, wherein the one or more encoders are attached to the ground mobile robot that is travelling along the lane; performing foreground extraction on each of the plurality of frames of the video data, wherein the foreground extraction results in a plurality of foreground images; and determining, based upon the plurality of foreground images and based upon the robot velocity data, an estimated width of the first plant stem.

In one example, the foreground extraction comprises processing, for each of the plurality of frames of the video data, only a fixed sized window that is smaller than each of the plurality of frames.

In another example, the fixed sized window associated with each of the plurality of frames is located off-center in each of the plurality of frames.

In another example, the foreground extraction comprises, for each of the plurality of frames of the video data: a first function to perform edge detection; a second function to perform morphing; and a third function to perform connected component labeling.

In another example, the determining the estimated width of the first plant stem comprises: determining, based upon the plurality of frames, an estimated camera motion using a structure from motion process; determining a ratio R, wherein $R=V_R/V_x$, wherein $V_R$ is an instantaneous robot velocity obtained via the robot velocity data and $V_x$ is an average horizontal foreground pixel velocity obtained via the structure from motion process; determining a first width, in pixels, at a first location of the first plant stem as depicted in a first one of the plurality of frames of the video data; and multiplying R times the first width, resulting in a first value.

In another example, the first value is the estimated width of the first plant stem.

In another example, the first width is determined as a horizontal width.

In another example, the determining the estimated width of the first plant stem further comprises: determining a second width, in pixels, at a second location of the first plant stem as depicted in the first one of the plurality of frames of the video data; multiplying R times the second width, resulting in a second value; and averaging the first value and the second value, resulting in the estimated width of the first plant stem.

In another example, the ground mobile robot comprises at least one wheel, and the one or more encoders determines the robot velocity data via detection of a rotation of the at least one wheel.

In another example, the operations further comprise: obtaining additional video data from the single monocular camera, wherein the additional video data comprises an additional plurality of frames, wherein the row of crops comprises a second plant stem, and wherein the additional plurality of frames include another depiction of the second plant stem; obtaining additional robot velocity data from the one or more encoders; performing additional foreground extraction on each of the additional plurality of frames of the additional video data, wherein the additional foreground extraction results in an additional plurality of foreground images; and determining, based upon the additional plurality of foreground images and based upon the additional robot velocity data, an additional estimated width of the second plant stem.

In another embodiment, a non-transitory computer-readable storage medium is provided comprising executable instructions that, when executed by a processing system including a processor, perform operations, the operations comprising: obtaining video data from a camera, wherein the video data comprises a plurality of frames, wherein the camera is attached to a ground mobile robot that is travelling along a lane defined by a row of crops, wherein the row of crops comprises a first plant stem, and wherein the plurality of frames include a depiction of the first plant stem; performing foreground extraction on each of the plurality of frames of the video data, wherein the foreground extraction results in a plurality of foreground images; obtaining sensor data from a light detection and ranging (LiDAR) sensor, wherein the LiDAR sensor is attached to the ground mobile robot that is travelling along the lane defined by the row of crops, and wherein the sensor data includes at least a portion of the row of crops; and determining, based upon the plurality of foreground images and based upon the sensor data, an estimated width of the first plant stem.

In one example, the foreground extraction comprises, for each of the plurality of frames of the video data: a first function to perform edge detection; a second function to perform morphing; and a third function to perform connected component labeling.

In another example, the determining the estimated width of the first plant stem comprises: determining, based upon the sensor data, an estimated distance D from the camera to the first plant stem; determining a first width, in pixels, at a first location of the first plant stem as depicted in a first one of the plurality of frames of the video data; and multiplying the first width times D divided by a focal length of a lens of the camera, resulting in a first value.

In another example, the first value is the estimated width of the first plant stem.

In another example, the camera is a single monocular camera.

In another example, the operations further comprise: obtaining additional video data from the camera, wherein the additional video data comprises an additional plurality of frames, wherein the row of crops comprises a second plant stem, and wherein the additional plurality of frames include another depiction of the second plant stem; performing additional foreground extraction on each of the additional plurality of frames of the additional video data, wherein the additional foreground extraction results in an additional plurality of foreground images; obtaining additional sensor data from the LiDAR sensor, wherein the additional data includes at least an additional portion of the row of crops; and determining, based upon the additional plurality of foreground images and based upon the additional sensor data, an additional estimated width of the second plant stem.

In another example, the LiDAR sensor comprises a 2-D LiDAR sensor.

In another embodiment, a mobile vehicle is provided comprising: a body; a single monocular camera attached to the body; a plurality of wheels attached to the body; a processing system including a processor; and a memory that stores executable instructions that, when executed by the processing system, perform operations, the operations comprising: obtaining video data from the single monocular camera, wherein the video data comprises a plurality of frames, and wherein the plurality of frames includes a depiction of a first plant stem in a row of crops; obtaining vehicle velocity data from at least one of the wheels; performing foreground extraction on each of the plurality of frames of the video data, wherein the foreground extraction results in a plurality of foreground images; and determining, based upon the plurality of foreground images and based upon the vehicle velocity data, an estimated width of the first plant stem.

In another example, the mobile vehicle is an autonomous ground mobile robot and the operations are performed without use of global positioning system (GPS) data In another example, the mobile vehicle further comprises at least one encoder, wherein the at least one encoder obtains the vehicle velocity data, and wherein the single monocular camera is located in the body, on the body or any combination thereof.

From the descriptions herein, it would be evident to an artisan with ordinary skill in the art that the various embodiments can be modified, reduced, or enhanced without departing from the scope and spirit of the claims described below. For example, the mobile vehicle can comprise an airborne vehicle (e.g., drone, airplane, helicopter, or the like). Such an airborne vehicle can travel, for example, below the crop canopy. Other suitable modifications can be applied to the subject disclosure. Accordingly, the reader is directed to the claims for a fuller understanding of the breadth and scope of the subject disclosure.

Figure 21:
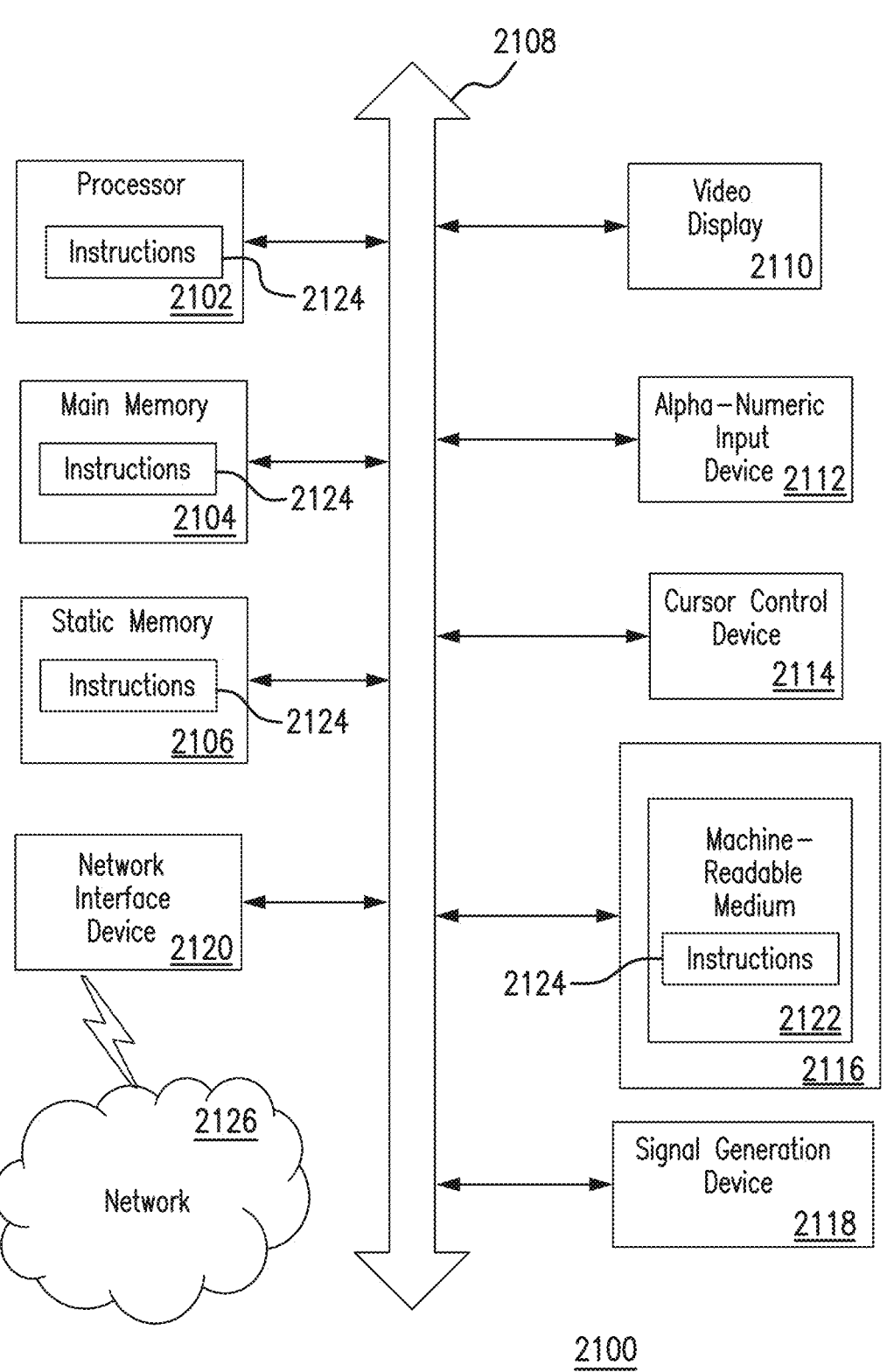
FIG. 21 depicts an illustrative diagrammatic representation 2100 of a machine in the form of a computer system within which a set of instructions, when executed, may cause the machine to perform any one or more of the methodologies disclosed herein.
Figure 22A:
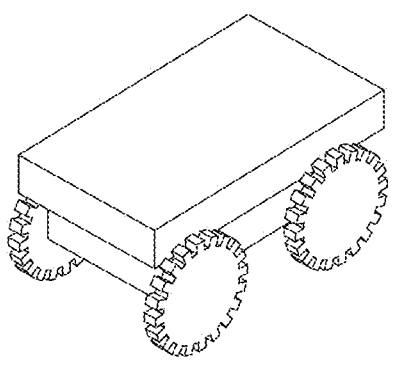
FIGS. 22A-22D depict various illustrations of a ground robot according to an embodiment. An RGB camera mounted on a side of the robot records video as the robot traverses between two corn rows. The camera (in this embodiment) has a field of view of 60° and points downward at 35°.
Figure 22B:
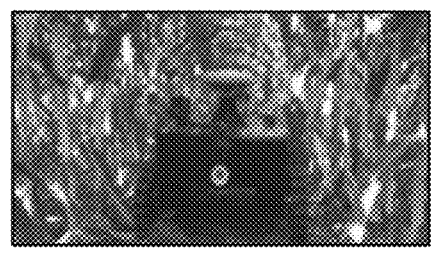
Figure 22C:
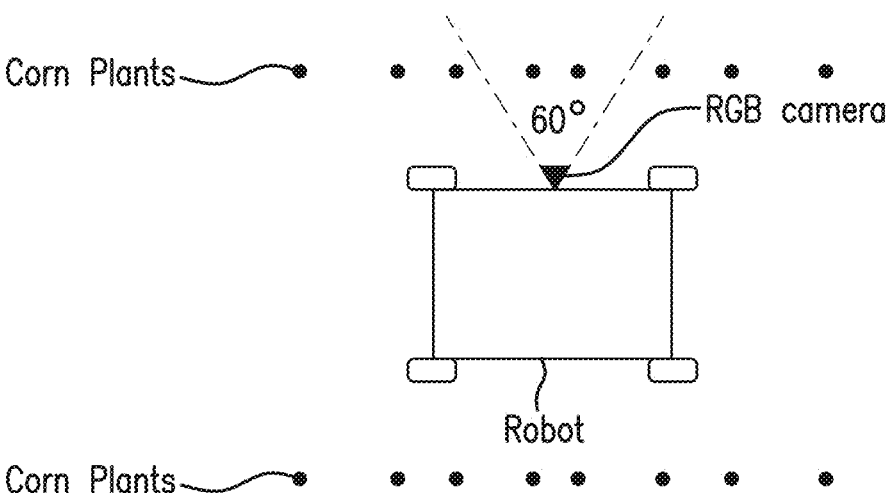
Figure 22D:
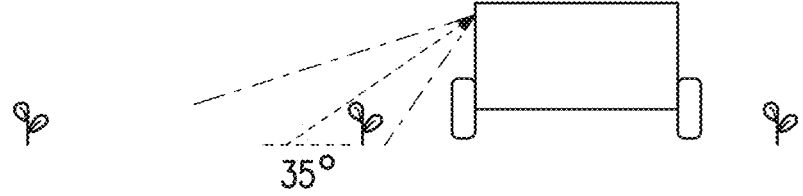
Figures 23A, 23B:
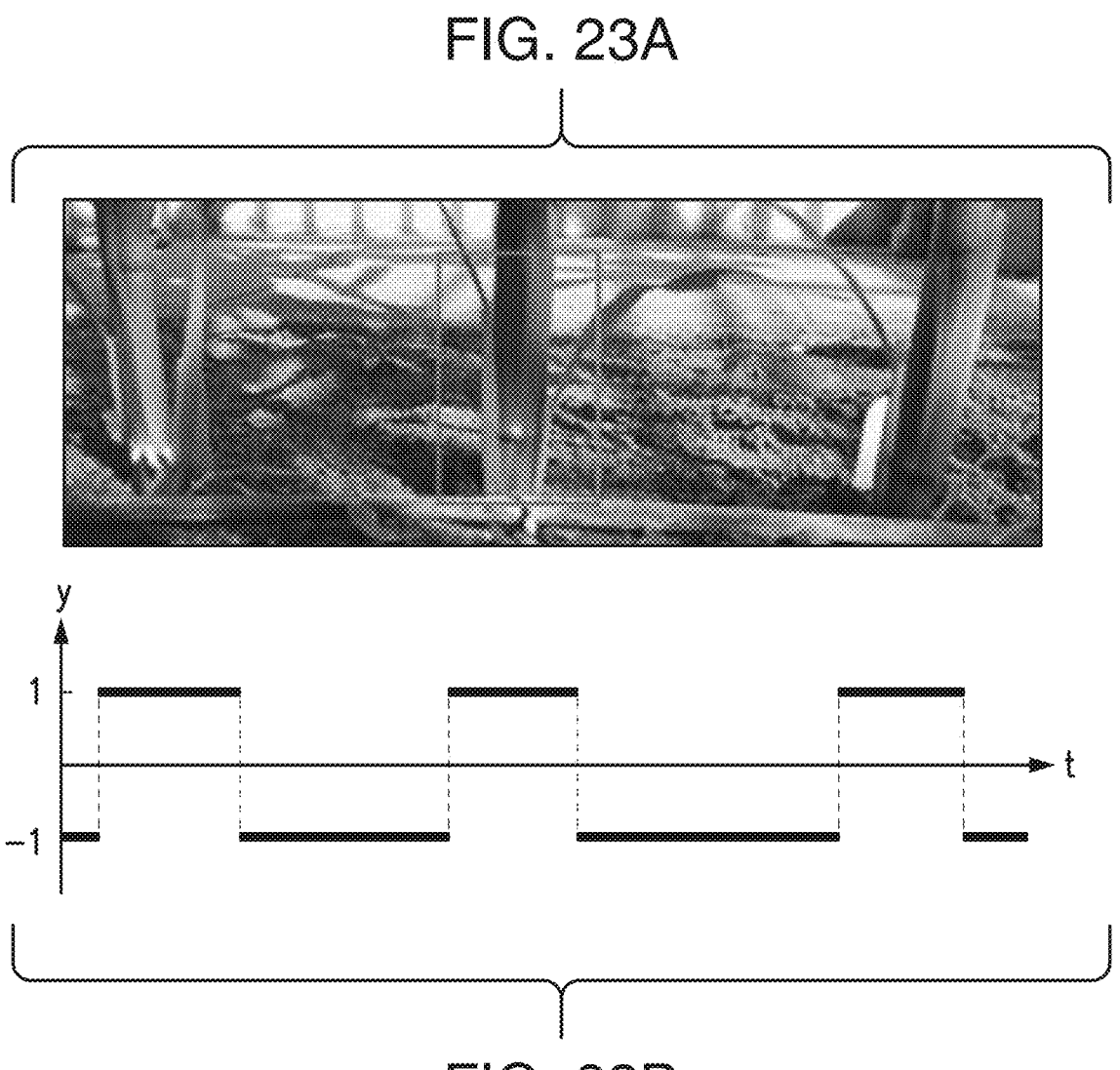
FIGS. 23A and 23B depict a schematic illustration of a corn recognition signal (see FIG. 23B) for a particular environment (see FIG. 23A). The ROI (Region of Interest) moves with the camera (see the ROI shown as the vertical rectangle in the middle section of FIG. 23A). As the ROI scans across the row of corn plants, the model returns a positive signal when corn is present in the ROI and a negative signal when corn is absent from the ROI.
Figure 24:
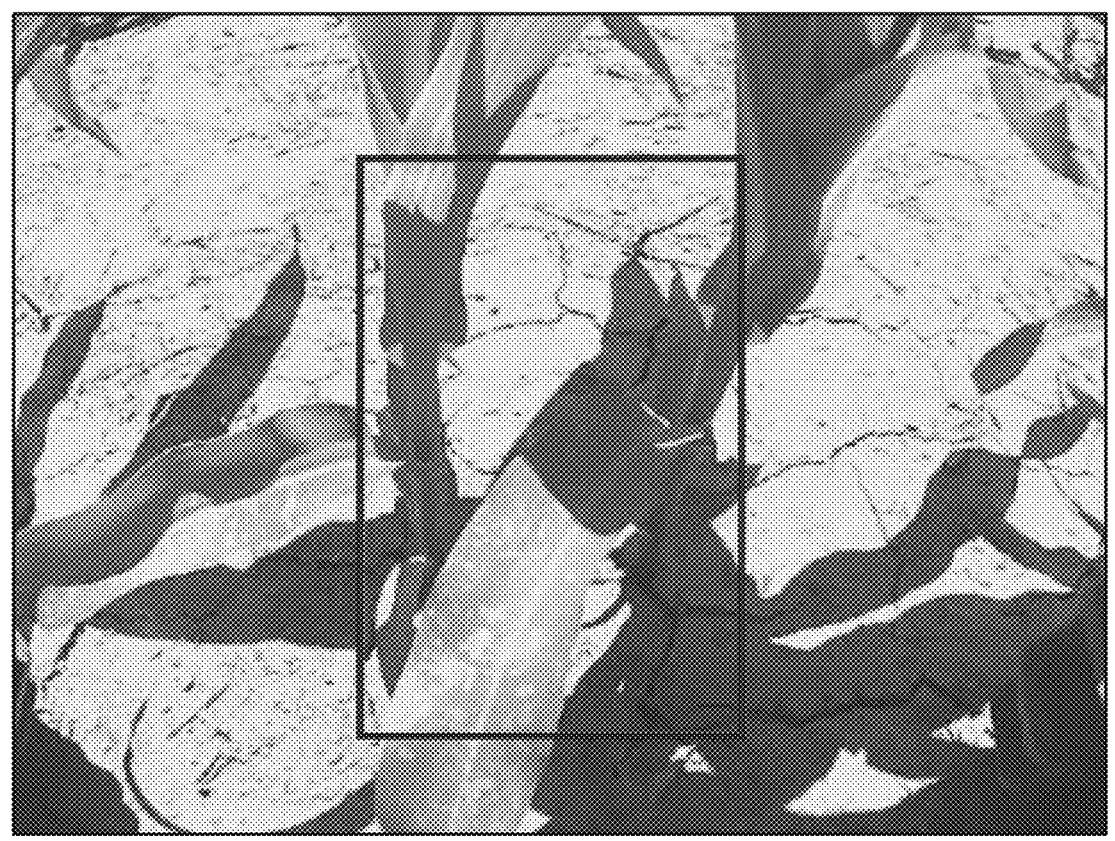
FIG. 24 depicts corn plants whose spacing is smaller than ROI width.

FIG. 21 depicts an exemplary diagrammatic representation of a machine in the form of a computer system 2100 within which a set of instructions, when executed, may cause the machine to perform any one or more of the methods discussed herein. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 2100 may include a processor 2102 (e.g., a central processing unit (CPU), a graphics processing unit (GPU, or both), a main memory 2104 and a static memory 2106, which communicate with each other via a bus 2108. The computer system 2100 may further include a video display unit 2110 (e.g., a liquid crystal display (LCD), a flat panel, or a solid state display. The computer system 2100 may include an input device 2112 (e.g., a keyboard), a cursor control device 2114 (e.g., a mouse), a disk drive unit 2116, a signal generation device 2118 (e.g., a speaker or remote control) and a network interface device 2120.

The disk drive unit 2116 may include a tangible computer-readable storage medium 2122 on which is stored one or more sets of instructions (e.g., software 2124) embodying any one or more of the methods or functions described herein, including those methods illustrated above. The instructions 2124 may also reside, completely or at least partially, within the main memory 2104, the static memory 2106, and/or within the processor 2102 during execution thereof by the computer system 2100. The main memory 2104 and the processor 2102 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 2122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 2200.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the description herein. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the various embodiments, and other embodiments not specifically described herein, will be apparent to those of skill in the art upon reviewing the above description.

REFERENCES 1A-34A

[1A] Shubhra Aich and Ian Stavness. Leaf counting with deep convolutional and deconvolutional networks. *CoRR*, abs/1708.07570, 2017. URL http://arxiv.org/abs/1708.07570.

[2A] Jose Luis Araus and Jill E Cairns. Field high-throughput phenotyping: the new crop breeding frontier. *Trends in plant science*, 19(1):52-61, 2014.

[3A] Tavor Baharav, Mohini Bariya, and Avideh Zakhor. In situ height and width estimation of sorghum plants from 2.5d infrared images.

[4A] Gary Bradski and Adrian Kaehler. *Learning OpenCV: Computer Vision in C++ with the OpenCV Library*. O'Reilly Media, Inc., 2nd edition, 2013. ISBN 1449314651, 9781449314651.

[5A] J. Canny. A computational approach to edge detection. *IEEE Transactions on Pattern Analysis and Machine Intelligence*, PAMI-8(6):679-698, November 1986. ISSN 0162-8828. doi: 10.1109/TPAMI.1986.4767851.

[6A] Ayan Chaudhury, Christopher Ward, Ali Talasaz, Alexander G. Ivanov, Mark Brophy, Bernard Grodzinski, Norman P. A. Huner, Rajni V. Patel, and John L. Barron. Machine vision system for 3d plant phenotyping. *CoRR*, abs/1705.00540, 2017. URL http://arxiv.org/abs/1705.00540.

[7A] Yuhao Chen, Javier Ribera, Christopher Boomsma, and Edward Delp. Locating crop plant centers from uavbased rgb imagery. In *The IEEE International Conference on Computer Vision* (ICCV), October 2017.

[8A] Sruti Das Choudhury, Saptarsi Goswami, Srinidhi Bashyam, A. Samal, and Tala N. Awada. Automated stem angle determination for temporal plant phenotyping analysis.

[9A] Andrei Dobrescu, Mario Valerio Giuffrida, and Sotirios A. Tsaftaris. Leveraging multiple datasets for deep leaf counting. *CoRR*, abs/1709.01472, 2017. URL http://arxiv.org/abs/1709.01472.

[10A] Lingfeng Duan, Wanneng Yang, Chenglong Huang, and Qian Liu. A novel machine-vision-based facility for the automatic evaluation of yield-related traits in rice. *Plant Methods*, 7(1):44, December 2011. ISSN 1746-4811. doi: 10.1186/1746-4811-7-44. URL https://doi.org/10.1186/1746-4811-7-44.

[11A] Gunnar Farnebäck. Two-frame motion estimation based on polynomial expansion. In *Proceedings of the 13th Scandinavian Conference on Image Analysis*, SCIA'03, pages 363-370, Berlin, Heidelberg, 2003.

*Springer-Verlag. ISBN* 3-540-40601-8. URL http://dl.acm.org/citation.cfm?id=1763974.1764031.

[12A] Christophe Fiorio and Jens Gustedt. Two linear time union-find strategies for image processing. *Theoretical Computer Science*, 154(2):165-181, 1996. ISSN 0304-3975. doi: https://doi.org/10.1016/0304-3975(94) 00262-2. URL http://www.sciencedirect.com/science/article/pii/0304397594002622.

[13A] Robert T Furbank and Mark Tester. Phenomics-technologies to relieve the phenotyping bottleneck. *Trends in plant science*, 16(12):635-644, 2011.

[14A] Mario Valerio Giuffrida, Hanno Scharr, and Sotirios A. Tsaftaris. ARIGAN: synthetic *arabidopsis* plants using generative adversarial network. *CoRR*, abs/1709.00938, 2017. URL http://arxiv.org/abs/1709.00938.

[15A] Mahmood R. Golzarian, Ross A. Frick, Karthika Rajendran, Bettina Berger, Stuart Roy, Mark Tester, and Desmond S. Lun. Accurate inference of shoot biomass from high-throughput images of cereal plants. *Plant Methods*, 7(1):2, February 2011. ISSN 1746-4811. doi: 10.1186/1746-4811-7-2. URL https://doi.org/10.1186/1746-4811-7-2.

[16A] V. Hoyos-Villegas, J. H. Houx, S. K. Singh, and F. B. Fritschi. Ground-based digital imaging as a tool to assess soybean growth and yield. *Crop Science*, 54:1756-1768, 2014. doi: 10.2135/cropsci2013.08.0540.

[17A] Mayuko Ikeda, Yoshitsugu Hirose, Tomonori Takashi, Yosuke Shibata, Takuya Yamamura, Toshiro Komura, Kazuyuki Doi, Motoyuki Ashikari, Makoto Matsuoka, and Hidemi Kitano. Analysis of rice panicle traits and detection of qtls using an image analyzing method. *Breeding Science*, 60(1):55-64, 2010. doi: 10.1270/jsbbs.60.55.

[18A] Jihui Jin and Avideh Zakhor. Point cloud based approach to stem width extraction of sorghum. 2017.

[19A] Lei Li, Qin Zhang, and Danfeng Huang. A review of imaging techniques for plant phenotyping. *Sensors*, 14 (11):20078-20111, 2014. ISSN 1424-8220. doi: 10.3390/s141120078. URL http://www.mdpi.com/1424-8220/14/11/20078.

[20A] Bruce D. Lucas and Takeo Kanade. An iterative image registration technique with an application to stereo vision. In *Proceedings of the 7th International Joint Conference on Artificial Intelligence—Volume* 2, IJCAI' 81, pages 674-679, San Francisco, CA, USA, 1981. Morgan Kaufmann Publishers Inc. URL http://dl.acm. org/citation-.cfm?id=1623264.1623280.

[21A] M. Minervini, A. Fischbach, H. Scharr, and S. A. Tsaftaris. Plant phenotyping datasets, 2015. URL http://www.plant-phenotyping.org/datasets.

[22A] M. Minervini, H. Scharr, and S. A. Tsaftaris. Image analysis: The new bottleneck in plant phenotyping [applications corner]. *IEEE Signal Processing Magazine*, 32(4): 126-131, July 2015. ISSN 1053-5888. doi: 10.1109/MSP.2015.2405111.

[23A] Massimo Minervini, Mohammed Abdelsamea, and Sotirios A. Tsaftaris. Image-based plant phenotyping with incremental learning and active contours. 23:35-48, 09 2014.

[24A] Massimo Minervini, Andreas Fischbach, Hanno Scharr, and Sotirios A. Tsaftaris. Finely-grained annotated datasets for image-based plant phenotyping. *Pattern Recognition Letters*, 81:80-89, 2016. ISSN 0167-8655. doi: https://doi.org/10.1016/j.patrec.2015.10.013. URL http://www.sciencedirect.com/science/article/pii/S0167865515003645.

[25A] T. Mueller-Sim, M. Jenkins, J. Abel, and G. Kantor. The robotanist: A ground-based agricultural robot for high throughput crop phenotyping. In 2017 *IEEE International Conference on Robotics and Automation (ICRA)*, pages 3634-3639, May 2017. doi: 10.1109/ICRA.2017.7989418.

[26A] Onur O" zyesil, Vladislav Voroninski, Ronen Basri, and Amit Singer. A survey on structure from motion. *CoRR*, abs/1701.08493, 2017. URL http://arxiv.org/abs/1701.08493.

[27A] Michael P Pound, Jonathan A Atkinson, Darren M Wells, Tony P Pridmore, and Andrew P French. Deep learning for multi-task plant phenotyping. *bioRxiv*, 2017. doi:10.1101/204552. URL https://www.biorxiv.org/content/early/2017/10/17/204552.

[28A] David Rousseau and Henricus J. Van de Zedde. Counting leaves without "finger-counting" by supervised multiscale frequency analysis of depth images from top view, 01 2015.

[29A] Hanno Scharr, Tony P. Pridmore, and Sotirios A. Tsaftaris. Editorial: Computer vision problems in plant phenotyping, cvppp 2017—introduction to the cvppp 2017 workshop papers. In *The IEEE International Conference on Computer Vision* (ICCV), October 2017.

[30A] Kyle Simek and Kobus Barnard. Gaussian process shape models for bayesian segmentation of plant leaves. In H. Scharr S. A. Tsaftaris and T. Pridmore, editors, *Proceedings of the Computer Vision Problems in Plant Phenotyping (CVPPP)*, pages 4.1-4.11. BMVA Press, September 2015. ISBN 1-901725-55-3. doi: 10.5244/C.29.CVPPP.4. URL https://dx.doi.org/10.5244/C.29.CVPPP.4.

[31A] Jack Sklansky. Finding the convex hull of a simple polygon. *Pattern Recogn. Lett.*, 1(2):79-83, December 1982. ISSN 0167-8655. doi: 10.1016/0167-8655(82)90016-2. URL http://dx.doi.org/10.1016/0167-8655(82)90016-2.

[32A] Siddharth Srivastava, Swati Bhugra, Brejesh Lall, and Santanu Chaudhury. Drought stress classification using 3d plant models. *CoRR*, abs/1709.09496, 2017. URL http://arxiv.org/abs/1709.09496.

[33A] Jordan Ubbens, Mikolaj Cieslak, Przemyslaw Prusinkiewicz, and Ian Stavness. The use of plant models in deep learning: an application to leaf counting in rosette plants. *Plant Methods*, 14(1):6, 2018. ISSN 1746-4811. doi: 10.1186/s13007-018-0273-z. URL https://doi.org/10.1186/s13007-018-0273-z.

[34A] Kesheng Wu, Ekow Otoo, and Kenji Suzuki. Optimizing two-pass connected-component labeling algorithms. *Pattern Anal. Appl.*, 12(2):117-135, February 2009. ISSN 1433-7541. doi: 10.1007/s10044-008-0109-y. URL http://dx.doi.org/10.1007/s10044-008-0109-y.

Reference will now be made to robot-based phenotyping using deep learning according to one or more embodiments. As described herein is an algorithm that can estimate in real-time plant stand count from image sequences obtained from a side-facing camera on an ultra-compact ground robot. This algorithm is demonstrated on the challenging problem of counting corn (*Zea mays* or Maize) plants in field-conditions. In other embodiments, the algorithm can be utilized to count other plants including, but not limited to, Sorghum, Wheat, Soybean, or vegetables. The algorithm leverages the cutting-edge convolutional neural network architecture that runs efficiently on mobile platforms. In addition, the algorithm is data-efficient, that is, it does not need a large amount of corn-stand data to be utilizable in practice. This is achieved through a novel technique in transfer learning. A support vector machine (SVM) classifier is trained to classify the features extracted from a convolutional neural network with pre-trained weights. The result is a robust stand-counting algorithm (according to an embodiment) where the only sensor needed is a low-cost (<$30) RGB camera. Extensive field trials show that the detection is robust against noises such as corn leaves, weeds, varying lighting conditions, and residues from the previous year. The disclosed system of an embodiment achieves high accuracy and reliability throughout the growing season. In essence, the disclosed system of an embodiment enables real-time robotic phenotyping in breeding plots and production fields. Robotic phenotyping is a welcome contribution, since it can help to overcome the phenotyping bottleneck [23B], [24B] that has slowed progress in breeding better crops.

Reference will now be made to certain Data Acquisition according to one or more embodiments. The platform used in this study is a four-wheel unmanned vehicle. The robot is (in this example) 12 in tall×20 in long×14 in wide, with a 6 in ground clearance, and weighs 14.5 lbs. However, the system may use a robot having any dimensions which allow the robot to traverse between crop rows. Such a compact and lightweight design allows the robot to easily traverse between crop rows of typical row spacing for corn. The robot is powered (in this example) by four Lithium Ion batteries that offer up to 4 h duration. The robot may alternatively use power sources including but not limited to battery types other than lithium ion and solar power. Images are recoded (in this example) with an RGB digital camera (ELP USBFHD01M, USA) mounted on the side of the robot chassis, but other cameras may be used, whether in visual or other spectra. The field of view of the camera (in this example) is 60°. In other embodiments the field of view of the camera may be between 100 and 360°. The number of corn plants captured in the image depends on the distance between the camera and plant row, as well as the spacing between adjacent plants. In a 30-in row, for instance, two to three corn plants normally appear in the image. The camera points down at an angle (in this example) of 350 to avoid observing corn rows far away. In other embodiments the camera points down at an angle between 0° and 85°. FIGS. 23A-23D show illustrations of the data acquisition system set-up of this embodiment. The resolution of the camera is 640×480, and it records at 30 frames per second. In other embodiments, the resolution of the camera is at least 240P, and it records at least 5 frames per second. The camera has a USB2 interface (although other interfaces will also work) that connects to a Jetson TX2 (NVIDIA, USA) or other computer(s), an embedded module for fast and efficient deep neural network inference. In another embodiment any module capable of efficient deep neural network inference may be used. The module (in this example) houses 8 GB memory that is shared between a CPU and GPU, and is able to process image frames captured by the camera in real-time. In other embodiments, the module houses between 1 GB and 1024 GB of memory.

Reference will now be made to certain Methods according to one or more embodiments. Images captured in outdoor environment are subject to a wide range of variations such as sunlight, occlusion, and camera view angle, etc. Additionally, corn plants go through significant changes during the growing season. Such variations make it difficult for classification using conventional approaches. Therefore, in the current disclosure a deep learning model is trained by combining a convolutional neural network and a support vector machine to classify the presence or absence of corn.

Figure 25:
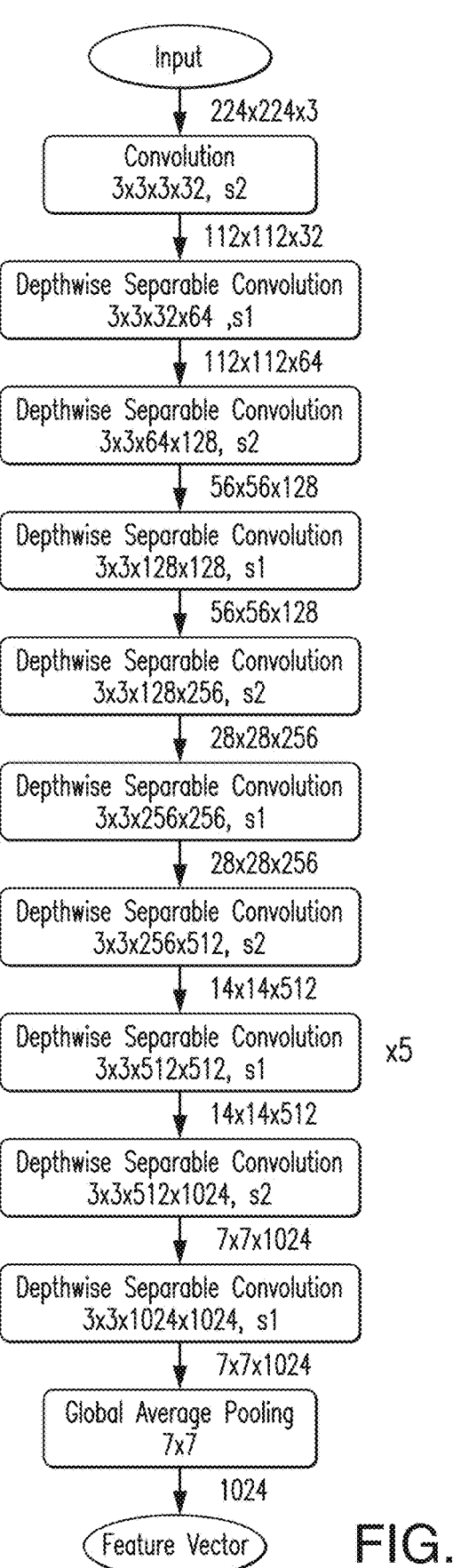
FIG. 25 depicts an Architecture of the MobileNet. Each convolution layer is followed by batch normalization and ReLU activation. [33B]

Deep learning can identify corn plants in an image. However, this is not enough to count plants from a moving robot since it is difficult to distinguish different corn plants to avoid double-counting. One way to address this is to draw a fixed Region of Interest (ROI) in the image whose width is on average smaller than the gap between neighboring corn plants. The deep learning algorithm is applied only to the pixels within the ROI to detect whether or not a plant is present. This leads to a binary signal that takes (for example) the value 1 for all frames in which a corn stalk is detected in the ROI, and a value −1 otherwise (including weeds, leaves, or other green matter). For convenience, the ROI is placed (in one embodiment) in the center of the image, but this is not necessary. It is also possible to move the ROI around the image to scan multiple corn plants. However, even with a fixed ROI, it is possible that multiple corn plants can appear in the ROI (see FIG. 25 showing the two plants within the ROI (wherein the ROI is indicated in the FIG. as the vertical rectangle)), especially since plant spacing can vary significantly between varieties, fields, and equipment utilized for planting. To address this issue, motion estimation techniques are utilized (in an embodiment) to determine the number of plants that have passed through the ROI until the ROI stops detecting corn plants. Details of this algorithm are given in Algorithm 1B.

---

Algorithm 1B: Counting Algorithm

| | |
|---|---|
| Input: | $I_1, \ldots, I_n$ := image frames |
| Parameter: | k := average window size; |
| | w := ROI width in pixels; |
| | d := image translation in pixels |
| Output: | C := Corn stand count |
| Initialize: | C = 0; |
| | d = 0 | foreach $I_t$ do
  |   Extract features by ConvNet → $f_i \in \mathbf{R}^{1024}$;
  |   Classify by SVM → $y_i \in \{-1, 1\}$;

|   Average with neighboring images $\hat{y}_i \leftarrow \dfrac{\sum_{i-k}^{i+k} y_i}{2k+1}$;

|   if $\hat{y}_i > 0$ then
  |   |   Estimate translation from $I_{t-1}$ to $I_t$ → $d_t$
  |   |   (Algorithm 2);
  |   |   $d \leftarrow d + d_t$;
  |   end
  |   else
  |   |   if $\hat{y}_{i-1} > 0$ then

|   |   |   multiplicity $M \leftarrow \dfrac{d}{w}$;

|   |   |   $C \leftarrow C + M$;
  |   |   |   $d \leftarrow 0$;
  |   |   end
  |   end
end

---

Reference will now be made to a Convolutional Neural Network according to one or more embodiments. Considering the fact that the algorithm of this embodiment is to be implemented on mobile platforms, it is important to maintain a good balance between performance and efficiency. Considerations need to be given to power consumption and memory footprint, which may limit the size of the architecture and its number of arithmetic operations. While the majority of networks aim at higher accuracy by increasing depth and width [22B], [31B], [32B], MobileNets [33B] are a family of networks specially developed to match the requirements of mobile and embedded applications. Due to the use of depth-wise separable convolution that uses between 8 to 9 times less computation than standard convolution, the model runs significantly faster than its more complicated counterparts with only slight accuracy compromise. For instance, MobileNet achieves 89.5% top-5 accuracy on ImageNet with 569 million floating point operations [33B], while ResNet-152 uses 11.3 billion flops to get 93.2% [19B]. The Mobilenet architecture contains a standard convolution layer followed by 13 depthwise separable convolution layers. The model takes 224×224 RGB images as input and outputs 1024-dimensional feature vectors. The fully connected and softmax layer in the original model are replaced by SVM for classification. Details of the architecture (which can be utilized by various embodiments) are shown in FIG. 25. It is noted that even for such a compact architecture, it still takes an enormous amount of data to train the model as it contains 4.2 million parameters. However, there does not exist such a dataset specifically for agriculture. To alleviate the steep requirement on training data, the present disclosure utilizes (in various embodiments) the principles of transfer learning. The model is fine-tuned based on the pre-trained weights on the ILSVRC dataset [34B].

Reference will now be made to a Support Vector Machine according to one or more embodiments. A Support Vector Machine (SVM) is a widely used model for classification [35B]-[40B]. It follows a linear model that constructs a hyperplane as shown in Equation (1B). The optimal hyperplane maximizes the margin, which is defined to be the smallest distance between the decision boundary and any of the samples. Given a set of data, $$\{(x_i, t_i)\}_{i=1}^{N},$$

where $x_i \in R^n$ and $t_i \in \{-1, 1\}$, the distance of a point $x_i$ to the decision boundary is given by Equation (2B). Thus the maximum margin solution can be found by solving Equation (3B). If w and b are further scaled such that the closest point from either class to the hyperplane is ±1, the optimization is then equivalent to a quadratic programming problem (Equation (4B)).

As the target function is quadratic subject to a linear constraint, a unique global minimum is guaranteed to exist. In practice, however, cases arise where class-conditional distributions may overlap, and exact separation of the training data may lead to poor generalization. For that reason, soft margin SVM was later introduced [41B]. Instead of strictly classifying every data point correctly, each data point is assigned a slack variable $\xi_i=0$ when it lies on or inside the correct decision boundary, and $\xi_i=|t_i-y_i|$ otherwise. The sum of all $\xi$ is then weighted by a parameter C that controls the trade-off between the slack variable penalty and the margin. The optimization problem now becomes the form given in Equation (5B). Note that the convexity gives SVM desirable advantage over other methods such as a feedforward neural network that suffers from the existence of multiple local minima [42B], [43B]. In addition, despite being a linear classifier, kernel functions that transform input data to higher dimensional feature space enable SVM to also classify nonlinearly separable features. Because of the advantages, various embodiments utilize a soft margin SVM to classify the features extracted from the MobileNet.

$$y(x) = w \cdot x + b \tag{1B}$$

-continued $$\frac{t_i y_i}{\|w\|} = \frac{t_i(w \cdot x_i + b)}{\|w\|} \tag{2B}$$

$$\operatorname*{argmax}_{w,b}\left[\frac{1}{\|w\|}\min_N(t_N y_N)\right] \tag{3B}$$

$$\operatorname*{argmin}_{w,b}\|w\| \tag{4B}$$

subject to $t_i(w \cdot x_i + b) \geq 1, i = 1, \dots, N$ $$\operatorname*{argmin}_{w,b,\xi}\left[\|w\| + C\sum_1^N \xi_i\right] \tag{5B}$$

subject to $t_i(w \cdot x_i + b) \geq 1 - \xi_i,$ $\xi_i \geq 0, i = 1, \dots, N$ Reference will now be made to Training according to one or more embodiments. Images are captured (in these embodiments) by the side facing camera on the robot throughout the growing season. The camera points slightly downward so that only the closest row is visible. Patches are cropped from the images and labeled according to the presence or absence of corn as positive and negative samples, respectively. The number of training and testing samples (of a particular example) are listed in Table IB. Data augmentation was also employed to further increase the training data. Images (in this example) are rotated (±10°), zoomed (88% to 112%), vertically shifted (±15%), and horizontally flipped. Each image is augmented (in this example) by 16-fold via randomly drawing transformations from the list.

The weights for the MobileNet are kept constant during fine-tuning. The hyper-parameters for SVM are determined by grid search and cross validation implemented in a Python package: scikit-learn [44B]. Linear kernel and radial basis function (RBF) kernel are investigated. Table JIB lists the values of hyper-parameters that are considered in this example. All combinations are exhausted to identify the optimal parameters.

TABLE I(B)

Number of training and testing samples at each growth stage

|  |  | V1 | VT | R2 |
|---|---|---|---|---|
| Training | positive | 348 | 328 | 519 |
|  | negative | 416 | 304 | 310 |
| Testing | positive | 89 | 83 | 130 |
|  | negative | 105 | 77 | 78 |

TABLE II(B)

SVM hyper-parameters tested in the grid search

|  | Linear | RBF |
|---|---|---|
| C | 1, 10, 100, 1000 | 1, 10, 100, 1000 |
| $\gamma$ | N/A | $10^{-2}, 10^{-3}, 10^{-4}, 10^{-5}$ |

Figures 26A, 26B:
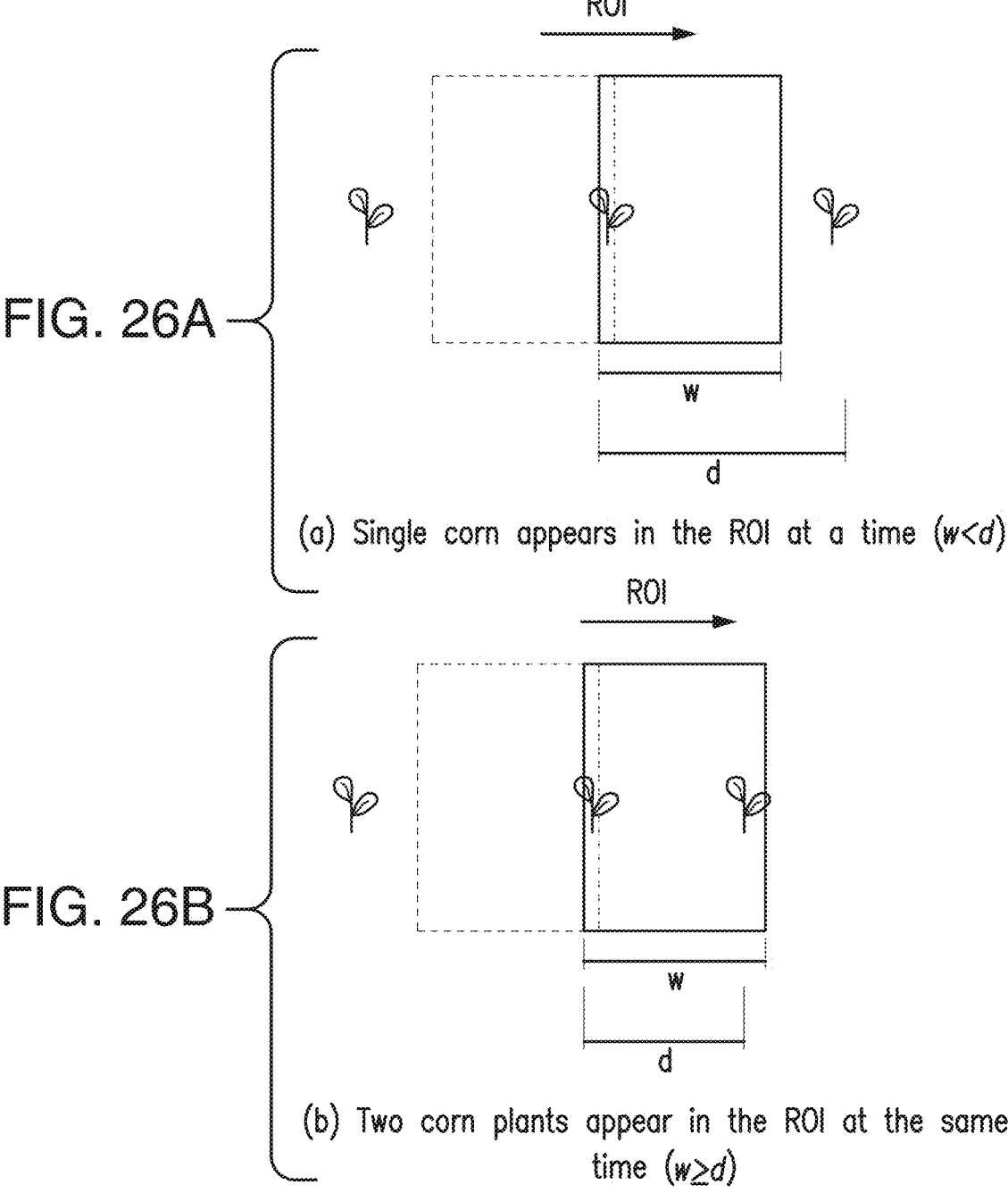
FIGS. 26A and 26B depict (according to various embodiments) examples of: (a) normal cases (see FIG. 26A) where a single corn appears in the ROI (here, the relative motion between the camera and the corn T≈ w; and (b) exceptions (see FIG. 26B) where neighboring corn plants are too close to be separated (in this case, T≈d+w).

Reference will now be made to a Motion Estimate according to one or more embodiments. Although (in these embodiments) the ROI width is chosen so that only one corn plant appears in it, exceptions to this assumption arise due to variations in plant spacing. If the gap between two neighboring plants is smaller than the ROI width, the detection signal of these two corn plants will merge into a single plateau (see FIGS. 26A and 26B). Therefore it will likely underestimate the population to take the number of plateaus as the count. These errors can build up, degrading the estimation performance. To determine the number of plants each signal plateau represents, the rigid transformation between two consecutive frames $I_1$ and $I_2$ is computed when a positive signal of the binary classification is present. A rigid transformation is a combination of rotation, translation, and reflection. Certain embodiments further assume no reflection, a rigid transformation in $R^2$ is given in Equation (6B). Two pairs of points are needed to solve for the transformation matrix M. In practice, the system of these embodiments extracts and matches about 100 SURF [45B] feature points in both images and solves for the least-square solution for M 2. Since the motion of the camera is predominantly in X-direction, the system of these embodiments sums up the values of $t_x$ from the first frame in the plateau till the last to be T. If the ROI finishes scanning through a corn before encountering the next one as in most cases, T is approximately equal to ROI width w. In the case that adjacent corn plants are close, $T=(n-1)d+w$, where n is the number of plants, d is the distance between neighboring plants (see FIGS. 26A and 26B). If d is not much smaller than w, then $$n \approx \frac{T}{w}.$$

In practical implementation, taking the ratio results in a floating point number that is rounded towards the nearest integer. In other words, the inequality (7B) must hold. For instance n=2, the algorithm can correctly count two nearby corn plants as long as their distance is not smaller than half of the ROI width. The lower bound on d increases with the number of adjacent corn plants n. However, in most cases n is less than 5.

$$\begin{bmatrix} x' \\ y' \\ 1 \end{bmatrix} = \begin{bmatrix} \cos\theta & -\sin\theta & t_x \\ \sin\theta & \cos\theta & t_y \\ 0 & 0 & 1 \end{bmatrix}\begin{bmatrix} x \\ y \\ 1 \end{bmatrix} \tag{6B}$$

$$n - 0.5 \leq \frac{T}{w} \leq n + 0.5 \tag{7B}$$

$$\frac{n-1.5}{n-1} \leq \frac{d}{w} \leq \frac{n-0.5}{n-1}$$

Algorithm 2B: Motion Estimate Algorithm

| Input | : $I_1, I_2$ := images; |
|---|---|
|  | N := maximum feature points to be extracted in each image |
| Output | : M $\in \mathbb{R}^2$ := rigid transformation between the images | foreach $I_i$ do
  | Extract N SURF feature points $\rightarrow \{(x,y)_{k,i}\}_{k=1}^N$
end
Find matching points between $\{ (x,y)_{k,1} \}_{k=1}^N$ and $\{ (x,y)_{k,2} \}_{k=1}^N$;
Solve Equation (6) for M Reference will now be made to SVM Training according to one or more embodiments. The best hyper-parameters for the SVM found in the grid search (of an example) are listed in Table III(B) with their performance metrics on the test data. Accuracy represents the probability of a sample being correctly labeled. Precision represents the probability of a predicted positive $(t_p+f_p)$ sample being a true positive $(t_p)$, whereas recall is the probability of a true positive sample $(t_p)$ being identified amongst all positive samples $(t_p+f_n)$, and F1-score is the harmonic mean of precision and recall. Their formulae are given in Equation (8B).

The hyper-parameters are almost the same for the three growth stages except that the C-value is different for V4, largely due to the difference in appearance of corn plants at V4 from VT and R2. The radial basis function kernel consistently works better than the linear kernel, and the optimal $\gamma$-value for the kernel is identical at three stages. The results indicate that the features from corn images at different stages are comparable and it is possible to classify all images using a single unified classifier.

The performance metrics are also consistently high for three growth stages. It is noted the training samples exclude leaves and only focus on stems and stalks. The metrics demonstrate that the deep learning model is capable of distinguishing subtle difference in images and thus reduces the inference of leaves and weeds. The mean accuracy for all stages is 92.97%. In addition, predictions are averaged by their k neighbors (k is an odd integer). Assuming a corn stalk is present in image frames $I_i, \ldots, I_{i+n}(n \geq k)$, for frames $$I_{i+\frac{k-1}{2}}, \ldots, I_{i+n-\frac{k-1}{2}},$$

the effective accuracy becomes $$\sum_{m=k/2+1}^{k} \binom{k}{m} P^m (1-P)^{k-m},$$

where P is the accuracy for single frame. On average a corn stalk remains in the ROI for about 10 frames, so a value of 5 is chosen for k. Then the accuracy of recognition is increased to as high as 99.69%.

TABLE III(B)

| Best hyper-parameters found in the grid search and their corresponding performance metrics on the test data | | | |
| --- | --- | --- | --- |
| | V4 | VT | R2 |
| kernel | rbf | rbf | rbf |
| C | 10 | 100 | 100 |
| $\gamma$ | 0.001 | 0.001 | 0.001 |
| accuracy | 91.759% | 94.38% | 92.79% |
| precision | 0.91 | 0.91 | 0.91 |
| recall | 0.95 | 0.94 | 0.95 |
| F1-score | 0.95 | 0.93 | 0.94 |

$$\begin{align}
\text{accuracy} &= \frac{t_p + t_n}{t_p + f_p + t_n + f_n} \tag{8B}\\
\text{precision} &= \frac{t_p}{t_p + f_p}\\
\text{recall} &= \frac{t_p}{t_p + f_n}\\
F_1 &= 2 \cdot \frac{\text{precision} \times \text{recall}}{\text{precision} + \text{recall}}
\end{align}$$

Figure 30:
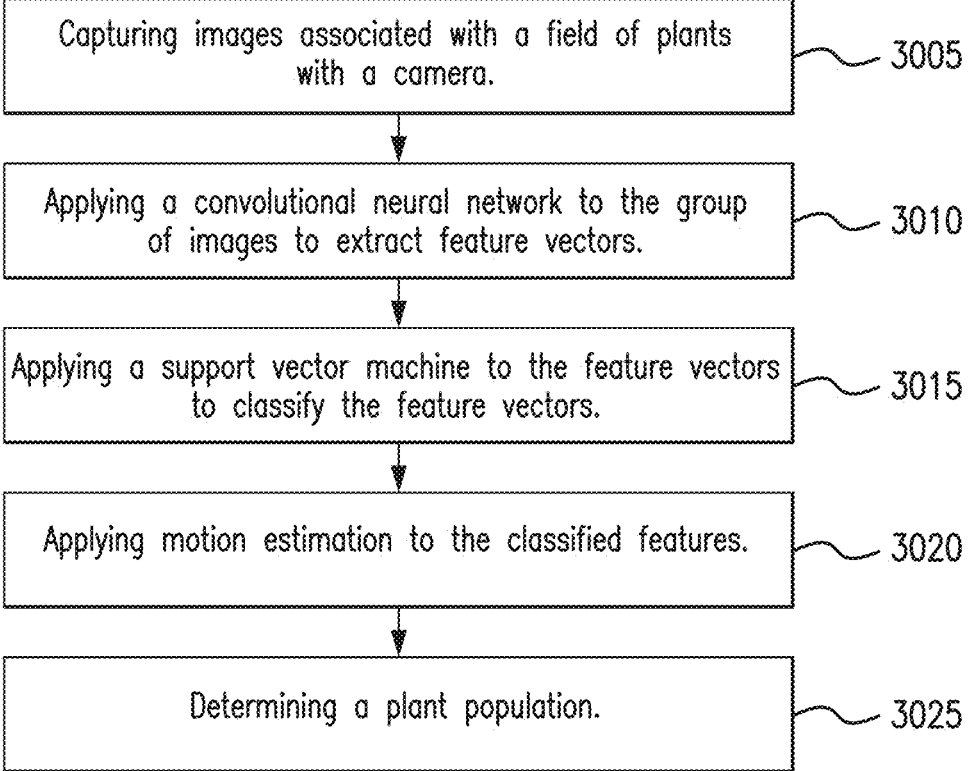
FIG. 30 depicts a flowchart of a method (according to an embodiment) for determining plant population.

Referring now to FIG. 30, this is a flowchart that represents an embodiment of a method of determining a plant population. First, step 3005 comprises capturing, by a camera coupled with a processing system that includes a processor, a group of images associated with a field of plants, wherein the group of images is captured while the camera is in motion in the field. Next, step 3010 comprises applying, by the processing system, a convolutional neural network to the group of images to extract feature vectors. Next, step 3015 comprises applying, by the processing system, a support vector machine to the feature vectors to classify the feature vectors resulting in classified features. Next, step 3020 comprises applying, by the processing system, motion estimation based on a rigid transformation to the classified features resulting in corrected count data. Finally, step 3025 comprises determining, by the processing system, a plant population for the field of plants based on the classified features and the corrected count data.

In one embodiment the support vector machine comprises a soft margin support vector machine that applies a slack variable to data points on or inside of a correct decision boundary.

In one embodiment the group of images are not an aerial view of the field of plants, and a view of the camera is at a downward angle.

In one embodiment the motion of the camera while the group of images is being captured is at a constant velocity.

In one embodiment the convolutional neural network is applied only to a fixed region of interest in each image of the group of images.

In one embodiment the convolutional neural network comprises a standard convolution layer followed by multiple depthwise separable convolution layers.

In one embodiment data augmentation is applied to training data for the convolutional neural network. The data augmentation in this embodiment is based on image rotation, image zooming, image vertical shifting, image horizontal flipping, or a combination thereof.

Figures 31, 32:
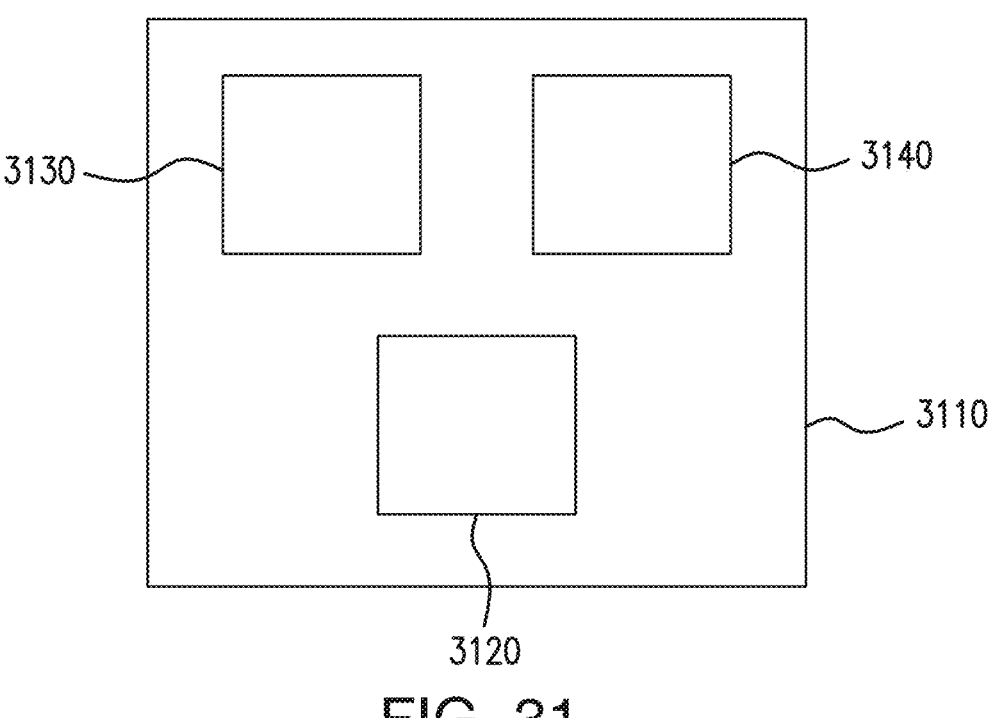
FIG. 31 depicts a block diagram of an embodiment of an apparatus for determining a plant population for a field of plants.
FIG. 32 depicts a block diagram of an embodiment of an apparatus for computing a plant population.

Referring now to FIG. 31, this shows a block diagram representing an embodiment of an apparatus for determining a plant population for a field of plants. The apparatus comprises an unmanned vehicle 3110, a battery 3120, a processing system 3130, and a camera 3140. The processing system 3130 includes a processor. The battery 3120, the processing system 3130, and the camera 3140 are supported by the unmanned vehicle 3110. The unmanned vehicle 3110, the processing system 3130, and the camera 3140 are electronically coupled to the battery 3120. The camera 3140 is in electronic communication with the processing system 3130.

In operation, the battery 3120 supplies electricity to the unmanned vehicle 3110, the processing system 3130 and the camera 3140. The camera 3140 captures a group of images associated with a field of plants while the unmanned vehicle 3110 travels along rows of the field. The group of plant images captured by the camera 3140 are electronically communicated to the processing system 3130. The processing system 3130 implements a convolutional neural network, a support vector machine, and motion estimation with respect to the group of images to determine a plant population for the field of plants.

In one embodiment the camera 3140 is pointed at a downward angle.

In one embodiment the support vector machine comprises a soft margin support vector machine that applies a slack variable to data points on or inside a correct decision boundary.

In one embodiment the unmanned vehicle 3110 travels along the rows of the field at a constant velocity.

In one embodiment the convolutional neural network is applied only to a fixed region of interest in each image of the group of images.

In one embodiment the convolutional neural network comprises a standard convolution layer followed by multiple depthwise separable convolution layers.

In one embodiment data augmentation is applied to training data for the convolutional neural network, and the data augmentation is based on image rotation, image zooming, image vertical shifting, image horizontal flipping, or a combination thereof.

In one embodiment the camera 3140 mounted on the unmanned vehicle 3110 is on a gimbal or servo that automatically adjusts the view of the camera based on features of the images collected by the camera 3140.

In one embodiment an air jet (that is, a mechanism for producing a flow of air) is supported by the unmanned vehicle 3110, and provided electricity by the battery 3120. The air jet clears obstructions such as leaves from the frame of the camera 3140 so unobstructed images of the plants can be captured by the camera 3140.

Referring now to FIG. 32, this shows a block diagram representing an embodiment of an apparatus for computing a plant population. The apparatus comprises a non-transitory machine-readable storage medium 3210, executable instructions 3215, a processing system 3220, and a processor 3225. The non-transitory machine-readable storage medium 3210 is in electronic communication with the processing system 3220. The executable instructions 3215 are electronically stored on the non-transitory machine-readable storage medium 3210. The processor 3225 is coupled to the processing system 3220.

In operation, the non-transitory machine-readable storage medium 3210 electronically communicates the executable instructions 3215 to the processing system 3220. The processing system 3220 uses the processor 3225 to execute the executable instruction 3215 and facilitate performance of operations. First, the processing system 3220 applies a convolutional neural network to a group of images to extract feature vectors. The group of images is associated with a field of plants and is captured while a camera is in motion in the field. Next, the processing system 3220 applies a support vector machine to the feature vectors to classify the feature vectors resulting in classified features. Next, the processing system 3220 supplies motion estimation based on a rigid transformation to the classified features resulting in corrected count data. Finally, the processing system 3220 determines a plant population for the field of plants based on the classified features and the corrected count data.

Reference will now be made to Modulating robot path and camera angle for optimal visual data collection. According to one embodiment, the objective in this task is to tightly close the loop between the robot path, the camera angles (controlled by servos), and the suitability of the raw visual information being collected for phenotyping.

Different phenotypes require different parts of the plant to be visible to enable machine vision algorithms to work properly. For example, plant-counting is simplified by capturing imagery of plant-soil interface with a downward perspective, while stem width-estimation requires an unobstructed view of the stem with a horizontal perspective. Pre-specified GPS-paths cannot guarantee the best quality data collection. For example, some farms use furrowed irrigation (i.e., U-shaped depressions, rather than flat ground, between plant rows), which leads to camera orientation oscillating unpredictably around the optimal during the run.

Figure 33:
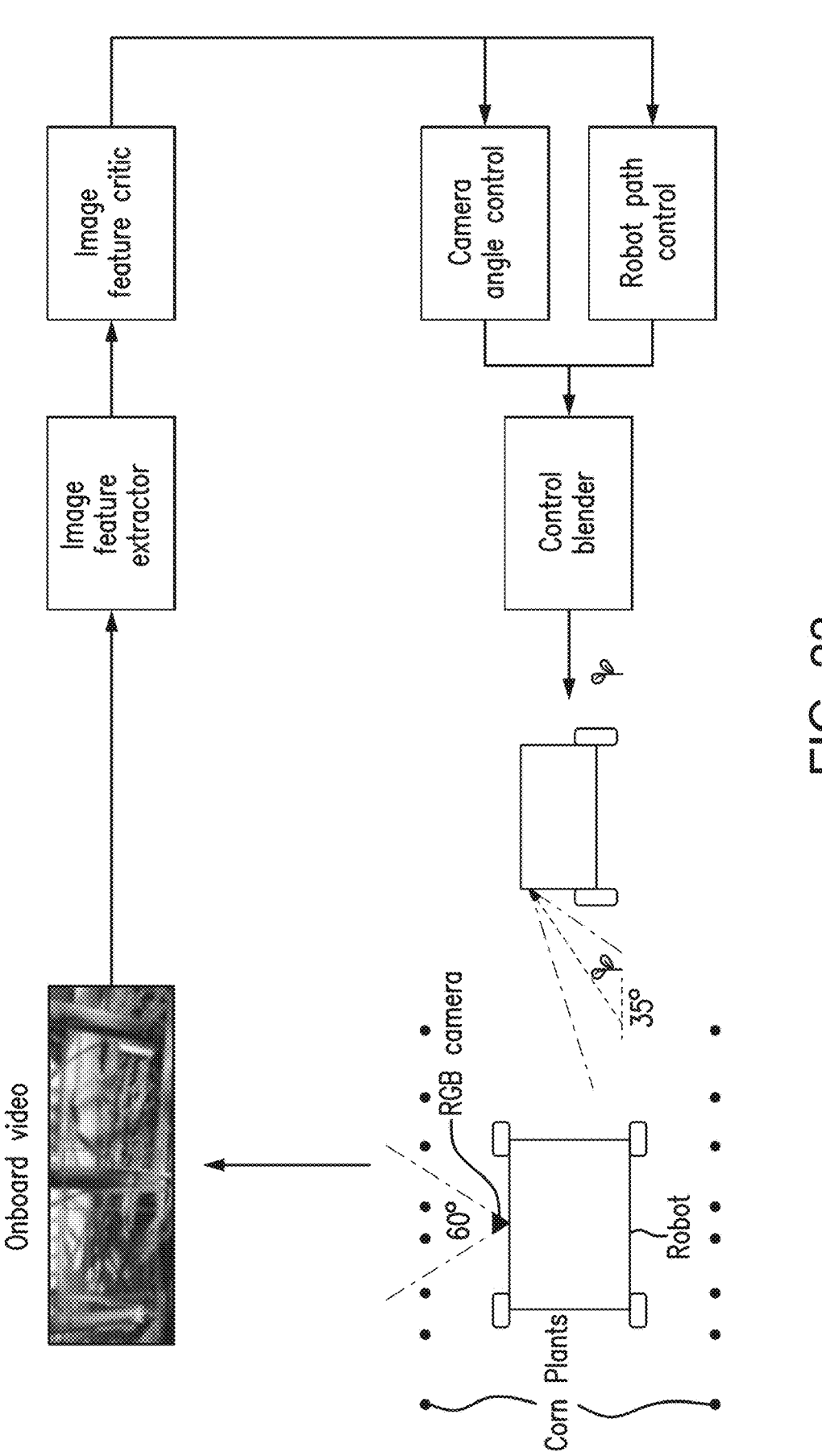
FIG. 33 depicts an overview of an adaptive camera angle and robot path control approach according to an embodiment.
Figure 34:
FIGS. 34 and 35 depict crop damage caused by agricultural equipment (FIG. 34 shows that tractor leaves permanent damage to stands.
Figure 35:
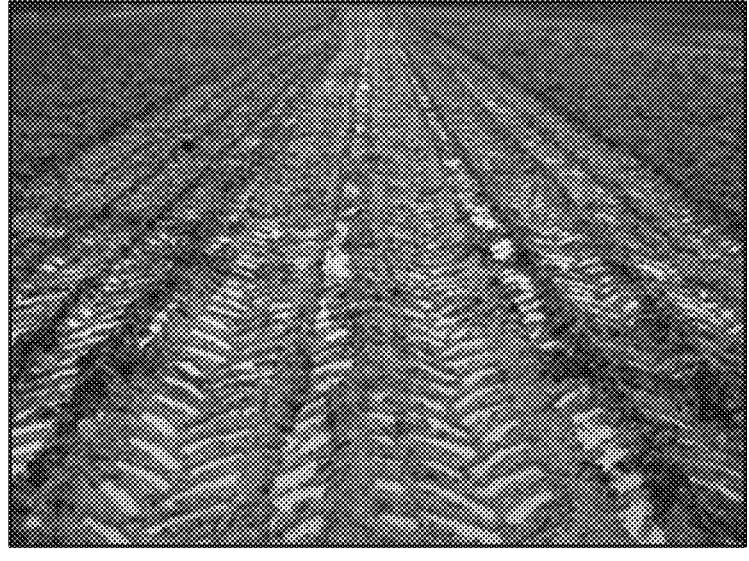

To address such challenges, an adaptive system capable of adjusting the robot path, the camera angle, and the robot speed is implemented (according to various embodiments) to ensure consistent, high-quality images. FIG. 33 depicts an overview of the adaptive camera angle and robot path control approach according to an embodiment. The main feedback signal is the signal from the "image feature critic", which takes as input the features extracted from an image feature extractor. A design of these sub-systems (according to various embodiments) is presented in detail below.

Reference will first be made to an Image Feature Extractor. The purpose of the image feature extractor is to identify features in the image that are required or desirable for quantifying the desired phenotype. The image feature extractor can be designed in two primary ways, first being a heuristic approach wherein certain low-level features and image-level specific features are sought for in the image, such as root-soil view, plant stalk through edge detectors, or corn-ear in the image; alternatively (or in combination), a Neural Network can be used to extract features from the images in a way similar to the Corn-Counting approach.

Reference will now be made to an Image Feature Critic. The purpose of the image feature critic algorithms and software (of various embodiments) is to provide a feedback signal to the control system that can be used for controlling the path of the robot and/or the angle of the camera. The challenge here is in determining in the most efficient manner whether or not the image has the desired features that are needed. The first step is to determine whether or not the image has a feature of interest. This can be accomplished by extracting the feature and comparing it in pixel space with a library of desirable features using various metrics such as sum of average difference, norms in feature spaces, information distances, and/or binary classifiers. The most general approach is the classifier-based approach, wherein the potential challenge is in determining whether or not the classifier in itself is sufficiently confident. To mitigate this, similar to the Corn-counting algorithm, an end-layer support vector machine (and/or Gaussian Process with non-Gaussian likelihood algorithms) can be relied upon [37B].

Reference will now be made to a Camera Angle-Robot Path Control and Control Blender. The purpose of these modules is to control the robot camera angle and/or robot path to ensure that the desired feature(s) are in appropriate view. Utilizing the feedback from the feature critic, two clear cases can be envisioned. The first is when the feature is visible, but an adjustment is needed in the angle and/or path to get it in the center of the image. This is accomplished with traditional feedback control mechanisms using image-feature-pixel-distance as a continuous feedback signal. The second case is that the image feature is not in view at all. This requires the robot to search for the feature by adjusting its path and/or camera angle. The camera angle sweep method is utilized (in this embodiment), since it is quicker and less risky. The camera angle will sweep through all possible angles to find the feature of interest. If this does not lead to the right feature, the robot can utilize its estimate of distance from the row and adjust the distance to values that have previously led to successful image features. If both mechanisms fail to bring the feature in the view, the remote operator can be alerted. Data is recorded, so that over time a learning system can be trained that will get better at ensuring the features stay in view. Future reinforcement learning algorithms will learn with examples the best camera angle and robot path in a field given field features and locations.

As described herein is an algorithm based on color imagery to estimate corn plant population. The latest deep learning architecture is used together with classic SVM with radial basis function kernel. The algorithm recognized corn stalks robustly in the presence of interference from leaves and weeds, yet only requires relatively small amount of data for training. Upon recognition, motion estimate techniques were used to compute the relative motion between the camera and the corn stalks. Finally, corn population was derived from the relative motion. The disclosed method according to an embodiment was tested at three different growth stages (V4, VT, R2), and achieved the mean error of 0.34%±6.27%, −5.14%±5.95%, and 0.00%±3.71%, respectively. A major error source was dangling leaves covering the camera lens which caused the algorithm of this embodiment to be more prone to underestimate the population. Adding an air jet to the unmanned vehicle to mechanically move leaves from the field of view of the camera reduces this error.

Reference will now be made to certain Examples. Referring now to a Field Experiment, data were collected at the University of Illinois at Urbana-Champaign Energy Farm, Urbana, Illinois, June through October. Rows of various lengths at the growth stages of V4, V6, VT, R2, and R6 were randomly selected. The robot was driven at a constant velocity by remote control for an arbitrary number of plots. For data collections prior to October, a small portion of the images were annotated for training the recognition model. Two additional datasets were collected in October to test the generalization ability of the model on unseen data from different field conditions. Table IV(B) summarizes the conditions of the plots and the experiments.

TABLE IV(B)

| Dates and conditions of the data collection | | | | |
|---|---|---|---|---|
| Date | Location | Training | Growth stage | Plots |
| Jun. 6$^{th}$, 2017 | Assumption, IL | Yes | V4 | 16 |
| Jul. 6$^{th}$, 2017 | Champaign, IL | Yes | VT | 10 |
| Aug. 2$^{nd}$, 2017 | Champaign, IL | Yes | R2 | 28 |
| Sep. 21$^{st}$, 2017 | Ivesdale, IL | Yes | R6 | 10 |
| Oct. 25$^{th}$, 2017 | Lebanon, ID | No | V6 | 15 |
| Oct. 26$^{th}$, 2017 | Martinsville, IL | No | R6 | 8 |

Figure 27:
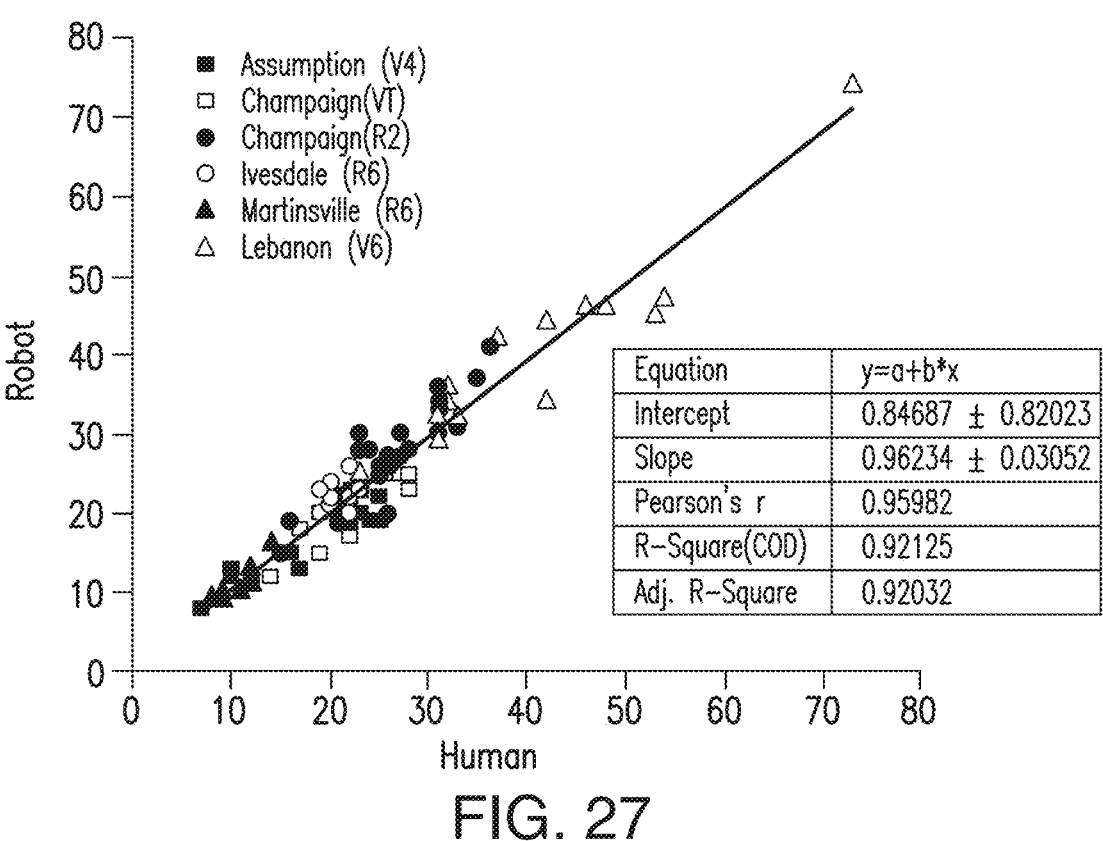
FIG. 27 depicts a graph related to certain Validation (in-field corn counting).
Figure 28:
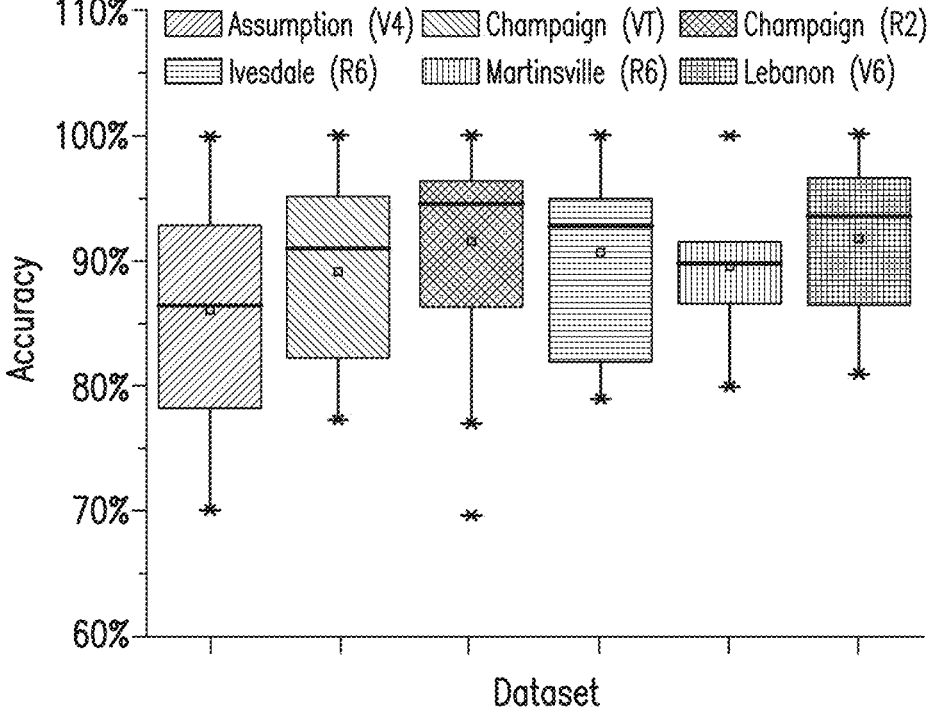
FIG. 28 depicts a graph related to certain Validation (in-field corn counting).

Referring now to certain Validation (in-filed corn counting), FIG. 27 shows the corn plant population per pot by robot vs human for each dataset. The robot predictions agree well with the ground truth. The least-square fitted line through all data has a correlation coefficient R=0.96. The box-and-whisker plot of accuracy for each dataset is shown in FIG. 28. The algorithm achieves consistently high accuracy for all locations and growth stages. The mean accuracy across all datasets is 89.74%. It is noted that data from Martinsville and Lebanon were processed without using the new data to train SVM. The results demonstrate that the recognition model generalizes well to unseen data and handles real-world variations effectively.

Figure 29A:
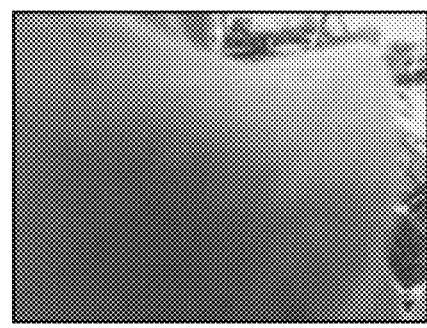
FIGS. 29A and 29B depict examples of nearly entire obscuration by leaves. The images are not recoverable by the deep learning algorithm, which leads to underestimation of the population.
Figure 29B:
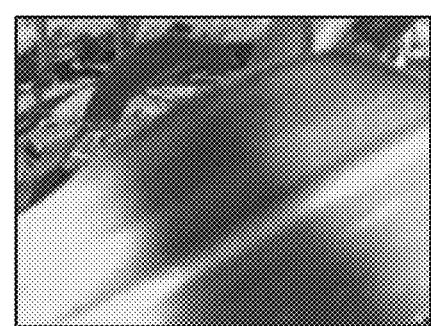

Major error sources include heavy occlusion, non-uniform illumination, and corn plants in immediate proximity. FIGS. 29A and 29B show two examples of dangling leaves between the rows almost completely covering the camera lens. Although the deep learning algorithm can correctly recognize stalks from leaves, it does not possess the power of making reliable predictions when the camera lens suffers from heavy occlusion. In one embodiment, a mechanical mechanism such as an air jet [46B] is used to keep leaves away from the vicinity of the visual sensor.

As described herein, aspects of the subject disclosure may include, for example, a method for determining a plant population of a field. The method of this embodiment comprises capturing, by a camera coupled with a processing system, a group of images associated with a field of plants, wherein the group of images is captured while the camera is in motion in the field. Next, the processing system applies a convolutional neural network to the group of images to extract feature vectors. Next, the processing system applies a support vector machine to the feature vectors to classify the feature vectors resulting in classified features. Next, the processing system applies motion estimation based on a rigid transformation to the classified features resulting in corrected count data. Finally, the processing system determines a plant population for the field of plants based on the classified features and the corrected count data.

In one embodiment, a method is provided comprising: capturing, by a camera coupled with a processing system that includes a processor, a group of images associated with a field of plants, wherein the group of images is captured while the camera is in motion in the field; applying, by the processing system, a convolutional neural network to the group of images to extract feature vectors; applying, by the processing system, a support vector machine to the feature vectors to classify the feature vectors resulting in classified features; applying, by the processing system, motion estimation based on a rigid transformation to the classified features resulting in corrected count data; and determining, by the processing system, a plant population for the field of plants based on the classified features and the corrected count data.

In one example, the support vector machine comprises a soft margin support vector machine that applies a slack variable to data points on or inside of a correct decision boundary.

In another example, the group of images are not an aerial view of the field of plants, and a view of the camera is at a downward angle.

In another example, the motion of the camera while the group of images is being captured is at a constant velocity.

In another example, the images from the camera are processed to adjust the angle of the camera to improve counting accuracy.

In another example, the images from the camera are processed to adjust the path of the motion of the camera in the field to improve counting accuracy.

In another example, the convolutional neural network is applied only to a fixed region of interest in each image of the group of images.

In another example, the fixed region of interest is automatically computed from the images from the camera.

In another example, the convolutional neural network comprises a standard convolution layer followed by multiple depthwise separable convolution layers.

In another example, data augmentation is applied to training data for the convolutional neural network, and the data augmentation is based on image rotation, image zooming, image vertical shifting, image horizontal flipping, or a combination thereof.

In another embodiment, an apparatus is provided comprising: an unmanned vehicle; a battery supported by the unmanned vehicle; a processing system including a processor and supported by the unmanned vehicle; and a camera supported by the unmanned vehicle, wherein the camera captures a group of images associated with a field of plants, wherein the group of images is captured while the unmanned vehicle travels along rows of the field, and wherein the processing system implements a convolutional neural network, a support vector machine, and motion estimation with respect to the group of images to determine a plant population for the field of plants.

In one example, a view of the camera is at a downward angle.

In another example, the support vector machine comprises a soft margin support vector machine that applies a slack variable to data points on or inside of a correct decision boundary.

In another example, the unmanned vehicle travels along the rows of the field at a constant velocity.

In another example, the camera mounted on the unmanned vehicle is on a gimbal that automatically adjusts the view of the camera based on the images from the camera.

In another example, the convolutional neural network is applied only to a fixed region of interest in each image of the group of images.

In another example, the convolutional neural network comprises a standard convolution layer followed by multiple depthwise separable convolution layers.

In another example, data augmentation is applied to training data for the convolutional neural network, and the data augmentation is based on image rotation, image zooming, image vertical shifting, image horizontal flipping, or a combination thereof.

In another example, an air jet is supported by the unmanned vehicle, wherein the air jet clears obstructions such as leaves from the frame of the camera.

In another embodiment, a non-transitory machine-readable storage medium is provided, comprising executable instructions that, when executed by a processing system including a processor, facilitate performance of operations, comprising: applying a convolutional neural network to a group of images to extract feature vectors, wherein the group of images is associated with a field of plants and is captured while a camera is in motion in the field; applying a support vector machine to the feature vectors to classify the feature vectors resulting in classified features; applying motion estimation based on a rigid transformation to the classified features resulting in corrected count data; and determining a plant population for the field of plants based on the classified features and the corrected count data.

In one example, the support vector machine comprises a soft margin support vector machine that applies a slack variable to data points on or inside of a correct decision boundary.

In another example, the group of images are not an aerial view of the field of plants, and a view of the camera is at a downward angle.

In another example, the convolutional neural network is applied only to a fixed region of interest in each image of the group of images.

In another example, the convolutional neural network comprises a standard convolution layer followed by multiple depthwise separable convolution layers.

In another example, data augmentation is applied to training data for the convolutional neural network, and the data augmentation is based on image rotation, image zooming, image vertical shifting, image horizontal flipping, or a combination thereof.

REFERENCES 1B-46B

[1B] R. HOLLIDAY et al., "Plant population and crop yield." *Nature*, vol. 186, no. 4718, pp. 22-4, 1960.

[2B] W. Duncan, "The relationship between corn population and yield," *Agronomy Journal*, vol. 50, no. 2, pp. 82-84, 1958.

[3B] R. Willey and S. Heath, "The quantitative relationships between plant population and crop yield," *Advances in Agronomy*, vol. 21, pp. 281-321, 1969.

[4B] J. Lutz, H. Camper, and G. Jones, "Row spacing and population effects on corn yields," *Agronomy journal*, vol. 63, no. 1, pp. 12-14, 1971.

[5B] A. Lang, J. Pendleton, and G. Dungan, "Influence of population and nitrogen levels on yield and protein and oil contents of nine corn hybrids," *Agronomy Journal*, vol. 48, no. 7, pp. 284-289, 1956.

[6B] P. Thomison, J. Johnson, and D. Eckert, "Nitrogen fertility interactions with plant population and hybrid plant type in corn," Soil Fertility Research, pp. 28-34, 1992.

[7B] W. Duncan, "A theory to explain the relationship between corn population and grain yield," *Crop Science*, vol. 24, no. 6, pp. 1141-1145, 1984.

[8B] R. Holt and D. Timmons, "Influence of precipitation, soil water, and plant population interactions on corn grain yields," *Agronomy Journal*, vol. 60, no. 4, pp. 379-381, 1968.

[9B] D. Karlen and C. Camp, "Row spacing, plant population, and water management effects on corn in the atlantic coastal plain," *Agronomy Journal*, vol. 77, no. 3, pp. 393-398, 1985.

[10B] D. J. Eckert and V. L. Martin, "Yield and nitrogen requirement of no-tillage corn as influenced by cultural practices," *Agronomy journal*, vol. 86, no. 6, pp. 1119-1123, 1994.

[11B] S. Birrell and K. A. Sudduth, Corn population sensor for precision farming. *ASAE*, 1995.

[12B] K. Thorp, B. Steward, A. Kaleita, and W. Batchelor, "Using aerial hyperspectral remote sensing imagery to estimate corn plant stand density," Trans. *ASABE*, vol. 51, no. 1, pp. 311-320, 2008, cited By 0.

[13B] Y. Shi, N. Wang, R. Taylor, W. Raun, and J. Hardin, "Automatic corn plant location and spacing measurement using laser line-scan technique," *Precis. Agric.*, vol. 14, no. 5, pp. 478-494, 2013, cited By 0.

[14B] Y. Shi, N. Wang, R. Taylor, and W. Raun, "Improvement of a ground-lidar-based corn plant population and spacing measurement system," *Comput. Electron. Agric.*, vol. 112, pp. 92-101, 2015, precision Agriculture. [Online]. Available: http://www.sciencedirect.com/science/article/pii/S0168169914003093

[15B] A. Nakarmi and L. Tang, "Automatic inter-plant spacing sensing at early growth stages using a 3d vision sensor," *Comput. Electron. Agric.*, vol. 82, pp. 23-31, 2012, cited By 25.

[16B] J. D. Luck, S. K. Pitla, and S. A. Shearer, "Sensor ranging technique for determining corn plant population," in 2008 Providence, Rhode Island, June 29-Jul. 2, 2008. *American Society of Agricultural and Biological Engineers, 2008*, p. 1.

[17B] J. A. Rascon Acuna, "Corn sensor development for by-plant management," Ph.D. dissertation, Oklahoma State University, 2012.

[18B] D. S. Shrestha and B. L. Steward, "Automatic corn plant population measurement using machine vision," *Transactions of the ASAE*, vol. 46, no. 2, p. 559, 2003.

[19B] K. He, X. Zhang, S. Ren, and J. Sun, "Deep residual learning for image recognition," in *Proceedings of the IEEE conference on computer vision and pattern recognition*, 2016, pp. 770-778.

[20B] A. Krizhevsky, I. Sutskever, and G. E. Hinton, "Imagenet classification with deep convolutional neural networks," in *Advances in neural information processing systems,* 2012, pp. 1097-1105.

[21B] C. Szegedy, W. Liu, Y. Jia, P. Sermanet, S. Reed, D. Anguelov, D. Erhan, V. Vanhoucke, and A. Rabinovich, "Going deeper with convolutions," in *Proceedings of the IEEE conference on computer vision and pattern recognition,* 2015, pp. 1-9.

[22B] K. Simonyan and A. Zisserman, "Very deep convolutional networks for large-scale image recognition," *arXiv preprint arXiv:*1409.1556, 2014.

[23B] J. L. Araus and J. E. Cairns, "Field high-throughput phenotyping: the new crop breeding frontier," *Trends in plant science,* vol. 19, no. 1, pp. 52-61, 2014.

[24B] R. T. Furbank and M. Tester, "Phenomics-technologies to relieve the phenotyping bottleneck," *Trends in plant science,* vol. 16, no. 12, pp. 635-644, 2011.

[25B] O. Russakovsky, J. Deng, H. Su, J. Krause, S. Satheesh, S. Ma, Z. Huang, A. Karpathy, A. Khosla, M. Bernstein, A. C. Berg, and L. Fei-Fei, "ImageNet Large Scale Visual Recognition Challenge," *International Journal of Computer Vision (IJCV),* vol. 115, no. 3, pp. 211-252, 2015.

[26B] R. Girshick, J. Donahue, T. Darrell, and J. Malik, "Region-based convolutional networks for accurate object detection and segmentation." *IEEE transactions on pattern analysis and machine intelligence,* vol. 38, no. 1, pp. 142-158, 2016.

[27B] R. Girshick, *"Fast r-cnn,"* in *Proceedings of the IEEE international conference on computer vision,* 2015, pp. 1440-1448.

[28B] S. Ren, K. He, R. Girshick, and J. Sun, "Faster r-cnn: Towards real-time object detection with region proposal networks," in *Advances in neural information processing systems,* 2015, pp. 91-99.

[29B] J. Long, E. Shelhamer, and T. Darrell, "Fully convolutional networks for semantic segmentation," in *Proceedings of the IEEE Conference on Computer Vision and Pattern Recognition,* 2015, pp. 3431-3440.

[30B] I. Goodfellow, J. Pouget-Abadie, M. Mirza, B. Xu, D. Warde-Farley, S. Ozair, A. Courville, and Y. Bengio, "Generative adversarial nets," in *Advances in neural information processing systems,* 2014, pp. 2672-2680.

[31B] C. Szegedy, S. Ioffe, V. Vanhoucke, and A. A. Alemi, "Inception-v 4, inception-resnet and the impact of residual connections on learning." in *AAAI,* 2017, pp. 4278-4284.

[32B] K. He, X. Zhang, S. Ren, and J. Sun, "Identity mappings in deep residual networks," in European Conference on Computer Vision. *Springer,* 2016, pp. 630-645.

[33B] A. G. Howard, M. Zhu, B. Chen, D. Kalenichenko, W. Wang, T. Weyand, M. Andreetto, and H. Adam, "Mobilenets: Efficient convolutional neural networks for mobile vision applications," *arXiv preprint arXiv:*1704.04861, 2017.

[34B] J. Pruegsanusak and A. Howard, https://github.com/tensorflow/models/blob/master/slim/nets/mobilenet v1.md, accessed: 2017-08-12.

[35B] N. Cristianini and J. Shawe-Taylor, *"An introduction to support vector machines,"* 2000.

[36B] B. Scholkopf, K.-K. Sung, C. J. Burges, F. Girosi, P. Niyogi, T. Poggio, and V. Vapnik, "Comparing support vector machines with Gaussian kernels to radial basis function classifiers," *IEEE transactions on Signal Processing,* vol. 45, no. 11, pp. 2758-2765, 1997.

[37B] A. J. Smola and B. Schölkopf, "On a kernel-based method for pattern recognition, regression, approximation, and operator inversion," *Algorithmica,* vol. 22, no. 1-2, pp. 211-231, 1998.

[38B] A. J. Smola, B. Scholkopf, and K.-R. Müller, "The connection between regularization operators and support vector kernels," *Neural networks,* vol. 11, no. 4, pp. 637-649, 1998.

[39B] B. Scholkopf, S. Mika, C. J. Burges, P. Knirsch, K.-R. Muller, G. Ratsch, and A. J. Smola, "Input space versus feature space in kernel-based methods," *IEEE transactions on neural networks,* vol. 10, no. 5, pp. 1000-1017, 1999.

[40B] B. Schölkopf, C. J. Burges, and A. J. Smola, Advances in kernel methods: support vector learning. *MIT press,* 1999.

[41B] C. Cortes and V. Vapnik, "Support-vector networks," *Machine learning,* vol. 20, no. 3, pp. 273-297, 1995.

[42B] J. A. Suykens, J. De Brabanter, L. Lukas, and J. Vandewalle, "Weighted least squares support vector machines: robustness and sparse approximation," *Neurocomputing,* vol. 48, no. 1, pp. 85-105, 2002.

[43B] C. M. Bishop, Neural networks for pattern recognition. *Oxford university press,* 1995.

[44B] F. Pedregosa, G. Varoquaux, A. Gramfort, V. Michel, B. Thirion, O. Grisel, M. Blondel, P. Prettenhofer, R. Weiss, V. Dubourg, J. Vanderplas, A. Passos, D. Cournapeau, M. Brucher, M. Perrot, and E. Duchesnay, "Scikit-learn: Machine learning in Python," *Journal of Machine Learning Research,* vol. 12, pp. 2825-2830, 2011.

[45B] H. Bay, T. Tuytelaars, and L. Van Gool, "Surf: Speeded up robust features," *Computer vision-ECCV 2006,* pp. 404-417, 2006.

[46B] B. Lobdell and J. Hummel, "Optical plant spacing and stalk diameter sensor with air-jet assist," in Proc. 3rd Intl. Conf. on *Geospatial Information in Agriculture and Forestry,* 2001.

Reference will now be made to an agricultural robot that (in various embodiments) enables field-based phenotyping which overcomes previous limitations such as high operational and maintenance costs, low coverage area, safety, disruptive internal combustion engines, excessive manual or off-board processing of sensor data, and/or the need for experienced operators. As an example, provided is an ultra-light, low-cost, autonomous, field-phenotyping robot that can navigate in a variety of field conditions to overcome the aforementioned limitations with existing field-based phenotyping systems.

In one or more embodiments, the variability in crop rows, topology, environmental conditions and/or size can be overcome by an agricultural robot that is capable of traversing a plurality of crops in different geographies without damaging the crop-plants for phenotyping, scouting, and/or during crop management operations. When plants are very small or when rows are unstructured or very tightly spaced, the agricultural robot can traverse the field without damaging the crop-plants, even if it has to drive over them, and have low cost of ownership. In one or more embodiments, an agricultural robot is manufactured and/or operates with a low cost for robotic scouting, phenotyping, and/or crop-management tasks, which can be significant given the cost pressure faced by farmers.

In one or more embodiments, an additive manufacturing process manufactured apparatus can traverse or operate in a plurality of crops, agricultural environments, and/or geographies without damaging the crops and at sufficiently low cost. In one or more embodiments, the apparatus can be cost effectively manufactured and operated, while also being capable of fully automated stand-counting and phenotyping.

In one or more embodiments, a plastic built or composite material manufactured apparatus can traverse or operate in a plurality of crops, agricultural environments, and/or geographies without damaging the crops and at sufficiently low cost. In one or more embodiments, the apparatus can be cost effectively manufactured and operated, while also being capable of fully automated stand-counting and phenotyping.

In one or more embodiments, a metal manufactured apparatus can traverse or operate in a plurality of crops, agricultural environments, and/or geographies without damaging the crops and at sufficiently low cost. In one or more embodiments, the apparatus can be cost effectively manufactured and operated, while also being capable of fully automated stand-counting and phenotyping.

In one or more embodiments, plastic, metal, composites, or other material is used in combination to build the robot.

In one or more embodiments, the robot may be constructed of compliant or soft materials.

In one or more embodiments, an apparatus is provided that will not damage crops even if it drives over them, and does not utilize contact sensors to determine row edges or paths.

In one or more embodiments, an autonomous ground robot is provided that is capable of tracking a pre-specified path with a high level of accuracy without human intervention. In one embodiment, an autonomous ground robot can also incorporate other higher-level behaviors, such as autonomously deciding when to recharge, and/or collaborating with other autonomous ground robots to complete a task.

GPS-guided tractors and harvesters that can follow prescribed paths are being commercially adopted by growers, however, automating large equipment only partially addresses robotics challenges in agriculture, especially since large equipment typically cannot be used when the crop canopy closes. In contrast, in one or more embodiments, small ground robots are mechanized rovers that can autonomously track pre-specified paths in harsh outdoor environments. Their small size enables them to maneuver through rows and avoid issues such as soil-compaction, through use of compact, lightweight, and energy efficient driving, sensing, and autonomy technologies.

In one or more embodiments, an agricultural robot is provided that performs agricultural scouting and/or phenotyping measurements and that does not permanently damage plants even if it drives over them. This is enabled through various features including one or more of: an ultra-light robotic platform (e.g., a robot weighing less than 20 lbs); ultra-compact construction (e.g. a robot that is compact in size); a robot that is low complexity, battery operated, with hours of endurance leading to low manufacturing and operational cost; a robot that does not damage plants even if it drives over them; a robot that includes compact sensing, computation, and onboard-analytics suite to perform agronomically relevant tasks and measurements onboard, including stand-counting, stalk angle determination, disease detection, and others on an ultra-light robotic platform; a robot that can utilize a web-based analytics suite to perform these measurements and/or enhance onboard measurement capability; an autonomous path following system that ensures highly precise position tracking, which ensures the robot stays on a prescribed path to minimize trampling over plants; an autonomous path following system that does not need high-precision RTK GPS signal; a human-interaction GUI (graphical user interface) implemented as an application on a smart-device that enables a single human operator to control or direct one or more autonomous agricultural robots; an ultra-compact robot that can turn around 180° in a crop row; and/or a turning mechanism not reliant upon a rack and pinion mechanism, which can instead utilize a skid to turn implemented by independent four-wheel electric motor drive.

One embodiment provides an apparatus having a frame, wheels rotatably connected with the frame, and a battery connected with the frame. The apparatus can have electric motors supported by the frame and connected to the battery, where each of the electric motors is connected with one of the wheels, wherein the electric motors allow the apparatus to rotate at least 180 degrees (e.g. to rotate 180 degrees within the space between adjacent rows of crops). The apparatus can have a processor supported by the frame, and velocity sensors supported by the frame and coupled with the processor, where each of the velocity sensors is connected with one of the wheels, and where the velocity sensors transmit velocity feedback signals associated with each of the wheels to the processor. The apparatus can have a global navigation satellite system (GNSS) supported by the frame and comprising a GNSS antenna and GNNS computer coupled with the processor, where the global navigation satellite system receives, processes and transmits positional information to the processor. The apparatus can have a gyroscope supported by the frame and coupled with the processor, where the gyroscope transmits measurement signals including yaw rate measurements to the processor. The apparatus can have a group of sensors supported by the frame, where the group of sensors provide contact-less measurements of surrounding crops and their characteristics for navigation purposes. The apparatus can have a group of sensors supported by the frame and coupled with the processor, where the group of sensors collect phenotypic data associated with crops. The processor determines control signals based on desired angular and linear velocities according to the velocity feedback signals, the positional information and the measurement signals by applying a real-time receding horizon estimation and control. The processor transmits the control signals for each of the electric motors thereby causing the apparatus to track a reference path.

Another embodiment provides an apparatus having a frame, wheels rotatably connected with the frame, and a battery connected with the frame. The apparatus can have electric motors supported by the frame and connected to the battery, where each of the electric motors is connected with one of the wheels, wherein the electric motors allow the apparatus to rotate at least 180 degrees (e.g. to rotate 180 degrees within the space between adjacent rows of crops). The apparatus can have a processor supported by the frame. The apparatus can have velocity sensors supported by the frame and coupled with the processor, where each of the velocity sensors is connected with one of the wheels, and where the velocity sensors transmit velocity feedback signals associated with each of the wheels to the processor. The apparatus can have a global navigation satellite system supported by the frame and comprising a GNSS antenna and GNNS computer coupled with the processor, where the global navigation satellite system receives, processes and transmits positional information to the processor. The apparatus can have a gyroscope supported by the frame and coupled with the processor, where the gyroscope transmits measurement signals including yaw rate measurements to the processor. The apparatus can have a group of sensors supported by the frame and coupled with the processor, where the group of sensors collect phenotypic data associated with crops. The processor determines control signals based on desired angular and linear velocities according to the velocity feedback signals, the positional information and the measurement signals. The processor transmits the control signals for each of the electric motors thereby causing the apparatus to track a reference path. The processor generates data collection signals to select or adjust one or more data collection algorithms, one or more of the group of sensors or a combination thereof thereby adjusting the collection of the phenotypic data associated with crops. The data collection signals can be generated by the processor according to an analysis of at least some of the phenotypic data, other information obtained by the processor, or a combination thereof. The data collection signals can be generated by the processor without receiving command signals from a user at a remote source.

Yet another embodiment provides a method including receiving, by a processing system of an agricultural robot having wheels, velocity feedback signals associated with each of the wheels, where the velocity feedback signals are received from velocity sensors of the agricultural robot, and where each of the velocity sensors is connected with one of the wheels. The method can include receiving, by the processing system, positional information from a global navigation satellite system (GNSS) of the agricultural robot. The method can include receiving, by the processing system, measurement signals from a gyroscope of the agricultural robot, where the measurement signals include yaw rate measurements. The method can include determining, by the processing system, controls signals based on desired angular and linear velocities according to the velocity feedback signals, the positional information and the measurement signals by applying a real-time receding horizon estimation and control. The method can include transmitting, by the processing system, the control signals to a controller coupled with electric motors thereby causing the agricultural robot to track a reference path, where each of the electric motors is connected with one of the wheels and enable the agricultural robot to rotate at least 180 degrees (e.g. to rotate 180 degrees within the space between adjacent rows of crops).

Figure 36:
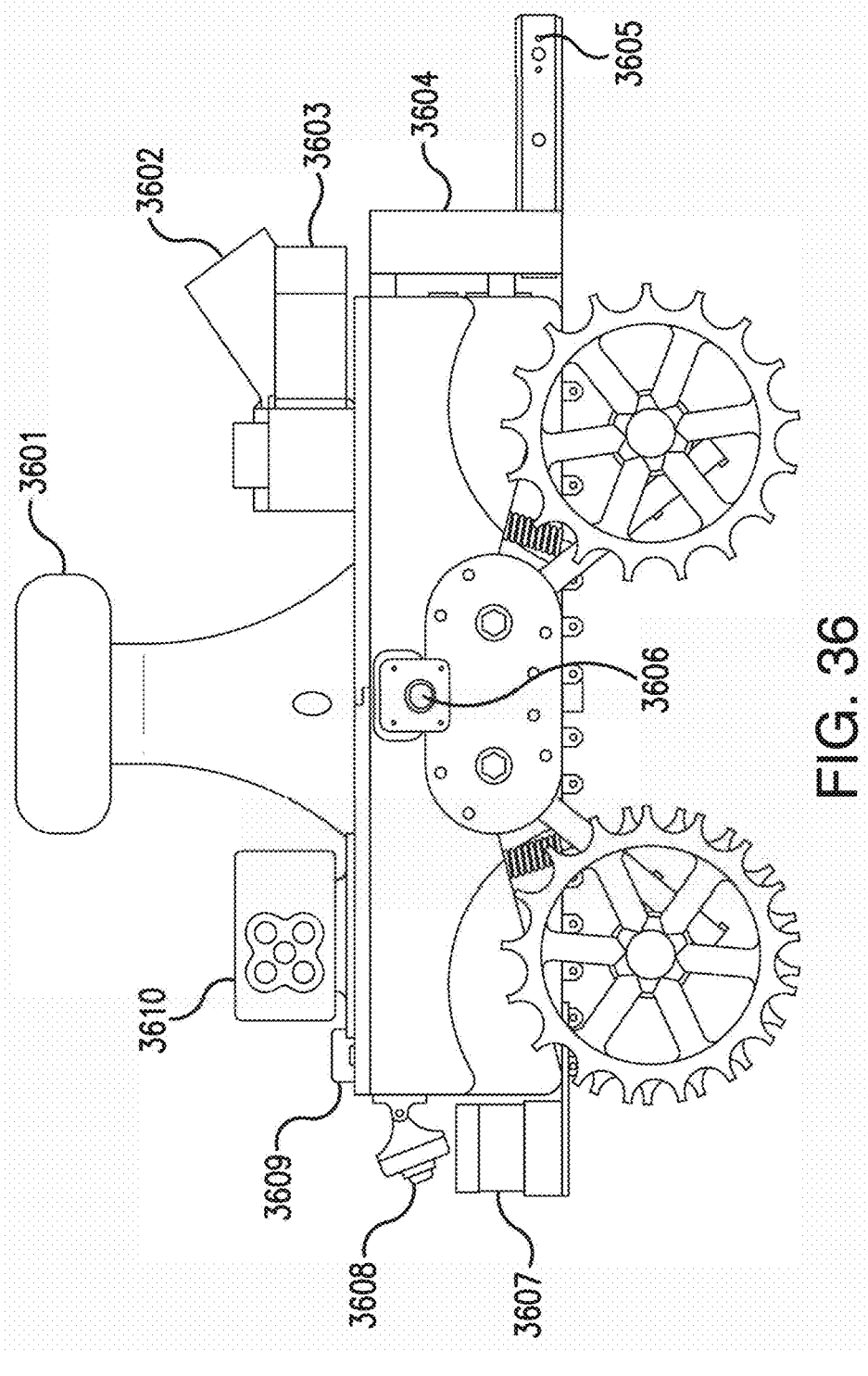
FIG. 36 depicts an illustrative embodiment of an apparatus that can operate as an agricultural robot for collecting data without damaging crops (this FIG. shows a drawing of the robot with a suite of sensors: 3601—GPS antenna; 3602—Bayspec hyperspectral sensor; 3603—Bayspec hyperspectral sensor (sidewards facing); 3604—Radiator for liquid cooling system; 3605—Mount for 3D Sensor Intel RealSense; 3606—Embedded visual sensor; 3607—LIDAR sensor; 3608—Embedded visual sensor; 3609—GPS mount for RedEdge multispectral sensor; 3610—RedEdge multispectral sensor).

Referring now to FIG. 36, an illustration of an embodiment of the robot with a suite of sensors attached is shown. This robot is ultralight (less than 15 lbs) and compact. The ultralight nature of the robot ensures that it does not drive plants into the ground due to weight, and minimizes the momentum of the robot as it drives. Agricultural robots out in the market are typically significantly heavier. The ultralight weight is based on the selection of material, the constitution of the material, and the structural design. Conventional wisdom for agricultural equipment is to manufacture them out of metal. However, metal is heavy and expensive. In contrast, this embodiment of the robot is built through additive manufacturing (such as 3D printing). Additive manufacturing creates complex designs by layering material, as opposed to traditional metal working, or traditional injection molding of plastics. Leveraging the capabilities of additive manufacturing, this embodiment minimizes the weight while maintaining sufficient structural rigidity. The robot includes parts in a shape to optimally distribute stress. The layering mechanism in the additive manufacturing is utilized to control the density, so that denser and stronger construction is utilized for high stress and high wear parts. Additive manufacturing techniques can be applied to different parts based on their expected wear and stress levels. In one embodiment, the robot can include selected low-weight metal components, which are selected to maximize the field-endurance of the robot.

In one embodiment, the ground clearance of the robot is sufficiently high to enable traversing complex terrain. The motors can be placed sufficiently close to the robot wheels, to minimize loss in transmission. In one embodiment, near-wheel mechanisms can be utilized that ensure little stress is put on the motors and the power is transmitted directly to the wheels with minimal (if any) gears and transmission system to minimize losses.

Figure 37:
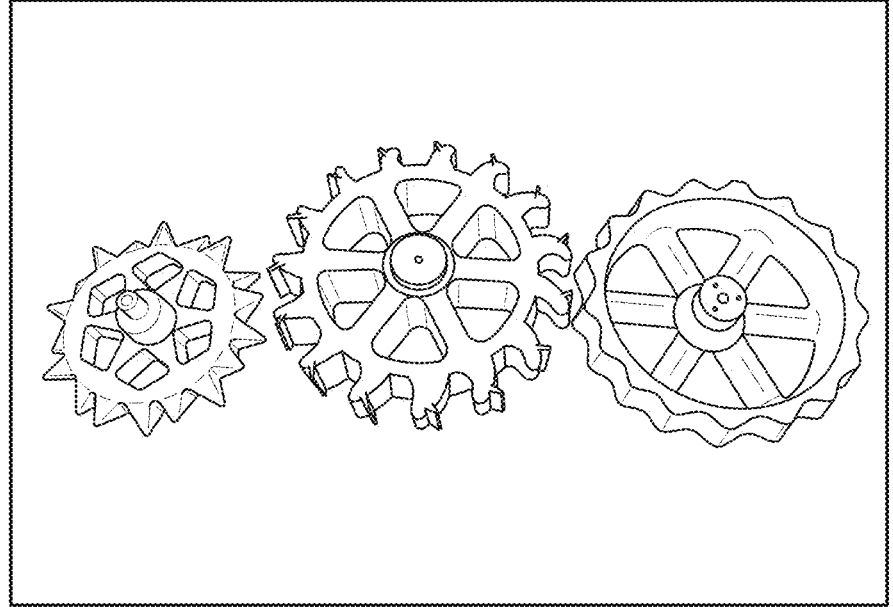
FIG. 37 depicts illustrative embodiments of wheels that are not utilized on the robot of FIG. 36 (examples of failed or undesirable wheel designs—from left, too low ground clearance and too much pressure, middle resulted in shoveling of soil and damage to plants, right too much slippage causing damage).

In one embodiment, wheels are utilized that strike a performance compromise between traction, pressure on soil, propensity to displace soil, sufficient ground clearance, manufacturing ease, and mechanical strength. FIG. 37 shows some of the wheels that were determined to be undesirable in operation. The left most wheel failed because of low ground clearance and too much pressure on the soil. The middle wheel failed due to too much soil disturbance and damage to plants due to sharp edges (leading to excessive pressure). The right wheel failed because of too much slippage due to lack of traction causing damage. Other considerations include using the correct manufacturing infill patterns to create sufficient softness in the wheels even when they are additive manufactured.

Figure 38:
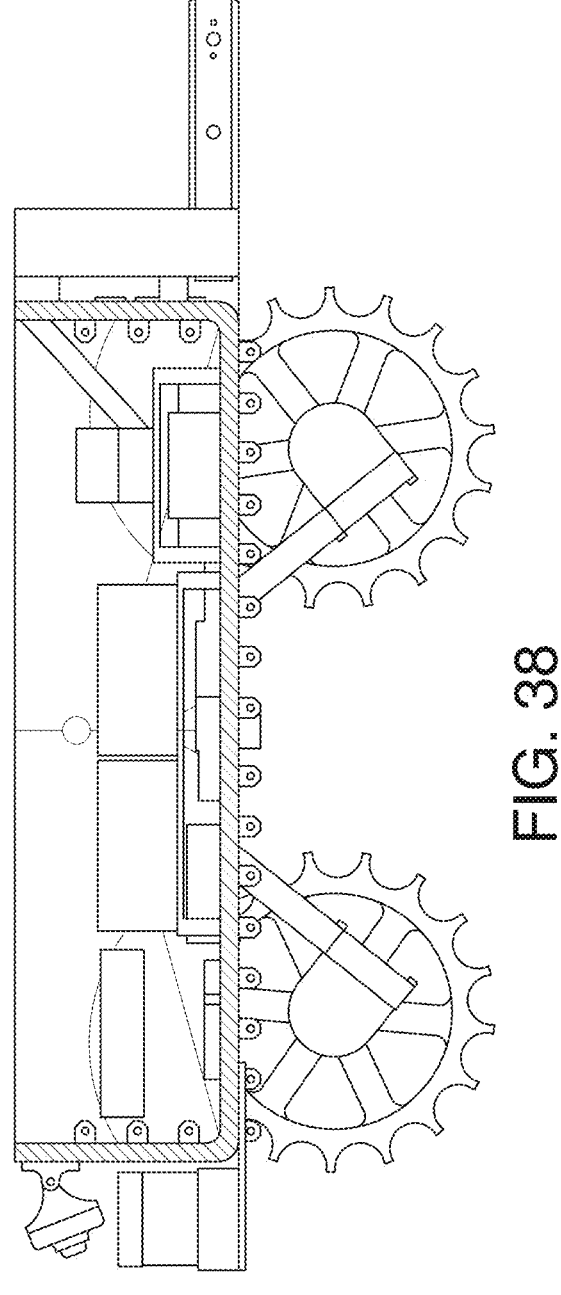
FIG. 38 depicts a schematic diagram of a cross-section of the agricultural robot of FIG. 36 (this FIG. shows an internal electronics diagram showcasing how the design hosts a suite of electronics in a very compact space).

FIG. 38 shows an internal electronics layout according to an embodiment (this FIG. depicts how a complex suite of electronics can be integrated into a very small robot).

The robot electronics suite maximizes or increases robot endurance between charges, optimizes or increases space utilization, minimizes or reduces interference between devices, and ensures or promotes that the high performance electronics remain sufficiently cool.

In one embodiment, one global navigation satellite system (GNSS) antenna is mounted straight up the center of the robot, and the dual-frequency GPS-capable real-time kinematic differential GNNS module (Piksi Multi, Swift Navigation, USA) is used to acquire centimeter-level accurate positional information at a rate of 5 Hz. Another antenna and module is used as a portable base station and transmits differential corrections. A 3-axis gyroscope (STMicroelectronics L3G4200D) is used to obtain yaw rate measurements with an accuracy of 1 degree per second at a rate of 5 Hz. In one embodiment, the system can be modular with any RTK GPS enabled antenna.

In one example, there can be four brushed 12V DC motors with a 131.25:1 metal gearbox, which are capable of driving an attached wheel at 80 revolutions per minute. These motors provide the required torque and RPM without draining too much battery, so that the robot has at least 8 hours of endurance in field conditions.

In one example, a two-channel Hall-effect encoder (e.g., Pololu Corporation, USA) for each DC motor can be attached to measure velocities of the wheels. A Sabertooth motor controller (e.g., Dimension engineering, USA) can be used which is a two channel motor driver that uses digital control signals to drive two motors per channel (left and right channel) and has a nominal supply current of 12 A per channel. A Kangaroo ×2 motion controller (e.g., Dimension engineering, USA) can be utilized which is a two channel self-tuning PID controller that uses feedback from the encoders to maintain desired linear and angular robot velocity commands.

Figure 39:
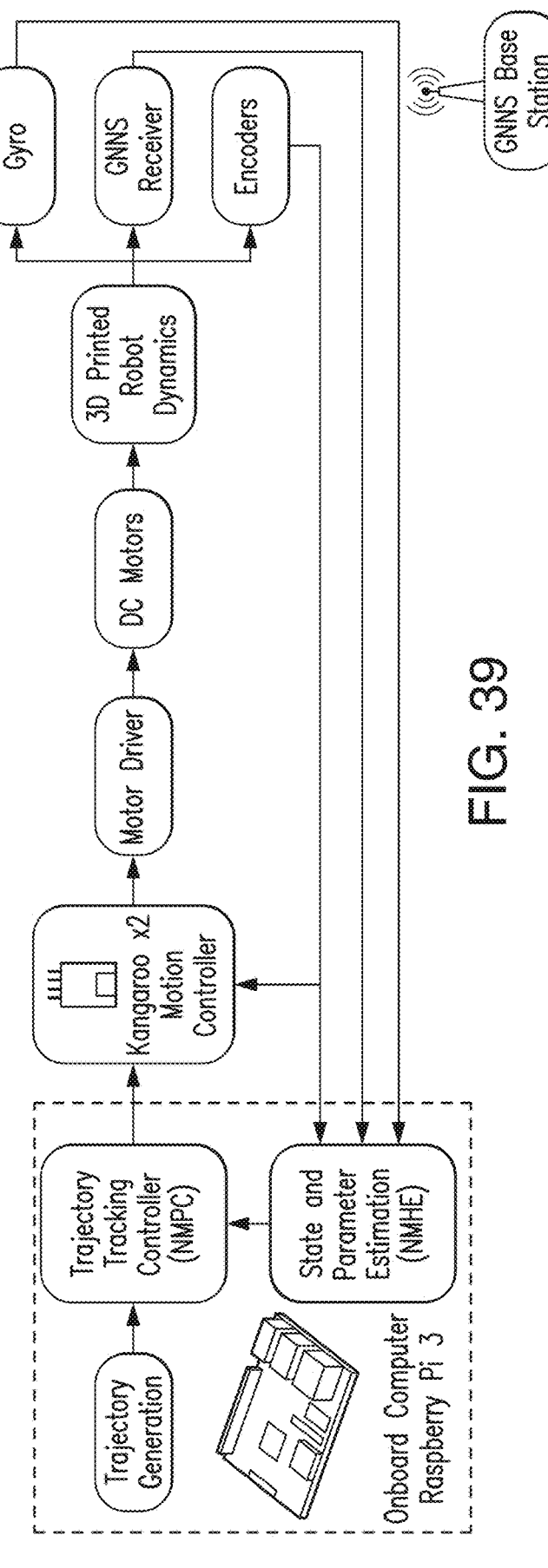
FIG. 39 depicts a schematic diagram of various components of the agricultural robot of FIG. 36 including processors, sensors, motors and a base station.

In one embodiment referring additionally to FIG. 39, a 1.2 GHz, 64 bit, quad-core Raspberry Pi 3 Model B CPU acquires measurements from all available sensors, and sends desired command signals (e.g., desired linear and angular velocities) to the Kangaroo ×2 motion controller in the form of two Pulse-width modulation signals. The robot estimates its global position by feeding any available measurements from all its on-board sensors (GPS, gyroscope, and encoders) to an online state estimator. In one embodiment, every time estimated states are updated, they can be fed to a path following controller which uses these estimated states to calculate the desired linear and angular velocities, in the body-frame, needed by the robot in order to follow the reference path given by a trajectory generator. These calculated command velocities can then be sent to the Kangaroo Motion Controller (KMC) as reference command signals, in the form of PulseWidth-Moduated (PWM) signals. The KMC functions as the robot's low-level controller by using feedback from encoders, attached to the motors, to determine the required control signals for tracking the given reference command signals, ensuring the robot's desired velocities are maintained. The KMC outputs the modified command signals to the Sabertooth Motor Controller (SMC) which correlates the given control signals to the necessary output voltages needed by the motors. In one embodiment, a cooling system can provide liquid cooling to the NVIDIA Tegra GP-GPU. This cooling system can have an external mounted radiator that is mounted in a way to avoid obstructing the wheels during motion.

Figure 40:
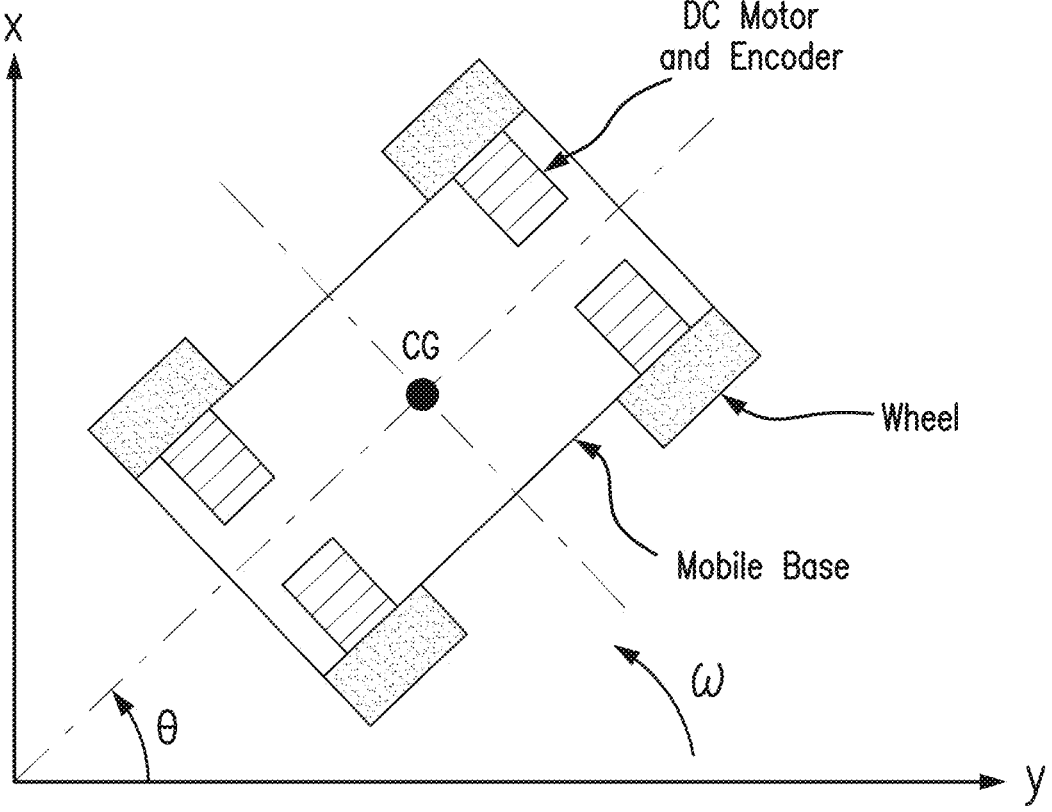
FIG. 40 depicts a top view schematic of the agricultural robot of FIG. 36 illustrating a center of gravity.
Figures 41A, 41B, 41C, 41D, 41E:
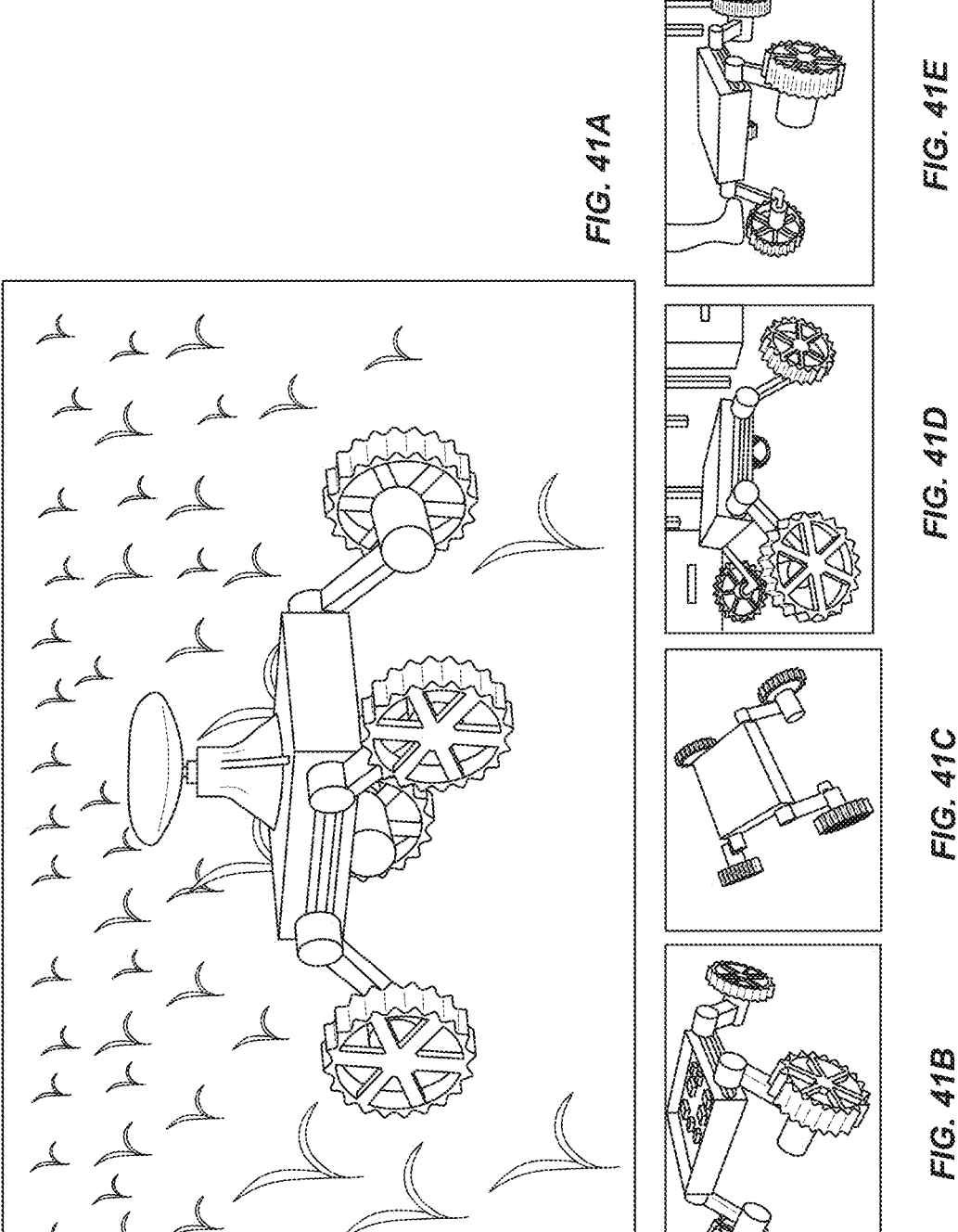
FIGS. 41A-41E depict various views of an illustrative embodiment of an apparatus that can operate as an agricultural robot for collecting data without damaging crops.
Figure 42A:
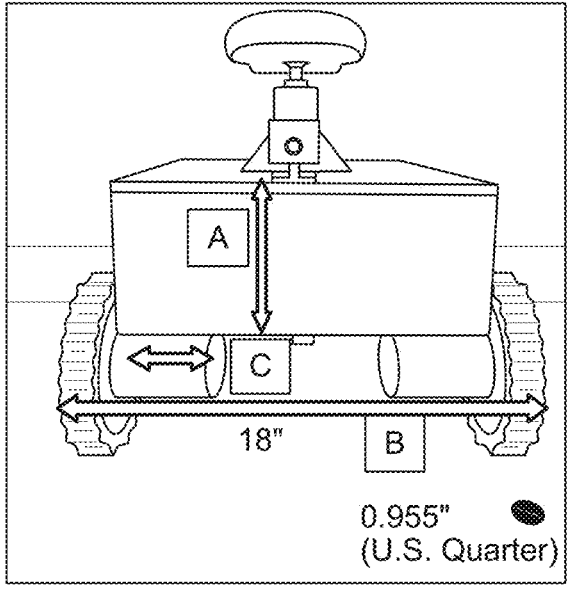
FIGS. 42A-42D depict various views of an illustrative embodiment of dimension for an apparatus that can operate as an agricultural robot for collecting data without damaging crops (as seen in these FIGS., in one example: a body height of the robot can be 5.5 inches (see dimension "A"); an overall width of the robot can be 18 inches (see dimension "B"); a motor/axel width can be 3.25 inches (see dimension "C"); a height of the robot (from the ground to the top of the body) can be 11.25 inches (see dimension "D"); a wheel diameter can be 7.5 inches (see dimension "E"); an overall height of the robot (including GPS mast and antenna) can be 18.25 inches (see dimension "F"); a height of the GPS mast and antenna can be 7 inches (see dimension "G"); and a ground clearance can be 6 inches (see dimension "H").
Figure 42B:
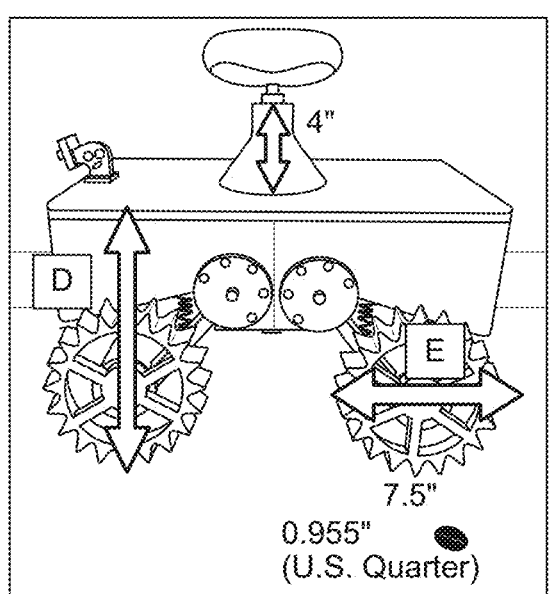
Figure 42C:
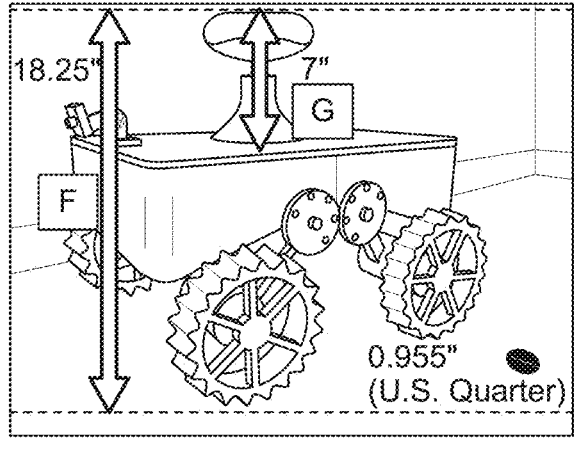
Figure 42D:
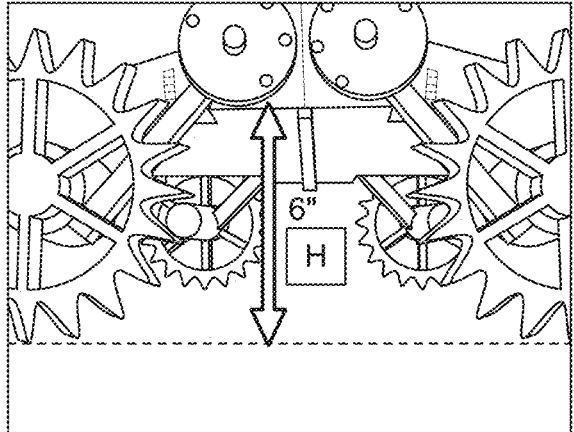

Referring additionally to FIG. 40, a top view schematic of the robot of this embodiment is illustrated showing the center of gravity (CG) and the DC motors/encoders (only one of which is labeled) that enables a desired level of control for traversing crop rows. In one embodiment, the wheels can be critical in ensuring the robot can navigate over crops without damaging them, and can navigate over wet and muddy terrains. As an example, the wheels can have spade-like extensions, structures or arrangements that are designed to provide good traction on loose soils, while minimizing contact area. These spade-like extensions can extend from the wheel and circumscribe the wheel to make contact with the soil. As opposed to tracked robots, this wheel has significant advantages: (1) it does not lead to a large area that is put under pressure and force as the robot moves, rather limits it only to a small contact area; (2) it is much simpler to manufacture and operate in the field; and (3) it is modular, in the sense that each wheel can be replaced if it breaks, instead of having to replace the whole track.

In one embodiment, the driving mechanism can include motors mounted near each wheel to enable four wheel independent drive without the need to distribute power from a central power unit. This is very different than typical existing equipment and vehicles, which often utilize a single power plant and then transmit the power to different wheels. The four wheel drive mechanism can enable the robot to turn by varying the speeds of independent wheels. This is a much simpler mechanism since it does not require complex rack-and-pinion or other similar mechanisms for driving.

Another feature of the wheel and mount is the embedding (in one example) of suspension without having to increase the size of the robot. The suspensions can be embedded between the wheel mount and the chassis. This has the benefit that the chassis can be broadened, while also enabling a simple mechanism to handle bumpy agricultural fields.

Reference will now be made to certain Experiments that were conducted to ensure that the robot of an embodiment does not damage plants:

I. Driving over individual plants: An embodiment of the robot disclosed herein was driven over individual plants, such as common weeds, soybean at different growth stages, corn plants at different growth stages, pulses and bushes.

The damage to plants was measured by visible damage, the ability of the plant to spring up after robot driving over, and whether the plant thrived in days after the driving event. The results were compared with driving over the plants with existing robots/vehicles, including a larger robot, small tractors, and over 600 LB vehicles. All experiments demonstrated that the embodiment of the robot disclosed herein does not damage plants whereas the other vehicles/robots do.

II. Soil compaction tests: An embodiment of the robot disclosed herein was driven over different soil types and conditions, including clay based soils in southeast Asia that were saturated with water, and silt loam soils in Illinois at different moisture contents ranging from dry to over-saturation with water (next day after a heavy rain event). In all conditions, the robot of the embodiment left tread marks that were less than 0.3 inches deep, in dryer conditions, the tread marks were hardly visible in dry hard soils. Soil compaction was tested by checking the density of the driven over soil using a probe. The soils driven over by the embodiment of the robot disclosed herein were actually found to be looser due to the way the wheels were designed. These results were compared against other robots, small tractors, large equipment, and vehicles. These other robots/vehicles resulted in soil compaction and much deeper tread-marks than the embodiment of the robot disclosed herein since none of these other robots/vehicles are designed to drive over plants without damaging them (unlike the embodiment of the robot disclosed herein).

FIGS. 41A-41E depict an embodiment of a robotic platform built mostly out of 3D printed parts (instead of mostly out of metal parts), which is battery operated (Lithium-Polymer batteries), and features a tightly integrated suite of sensors, computing devices, memory, and software for control and onboard analytics for scouting. The total cost of this robot is an order of magnitude smaller than typical existing agricultural robots, including commercially available options and many academic prototypes. Furthermore, the robot is also much more compact than many existing robots. The robot of this embodiment is capable of turning around 180° in a crop row.

Figure 43:
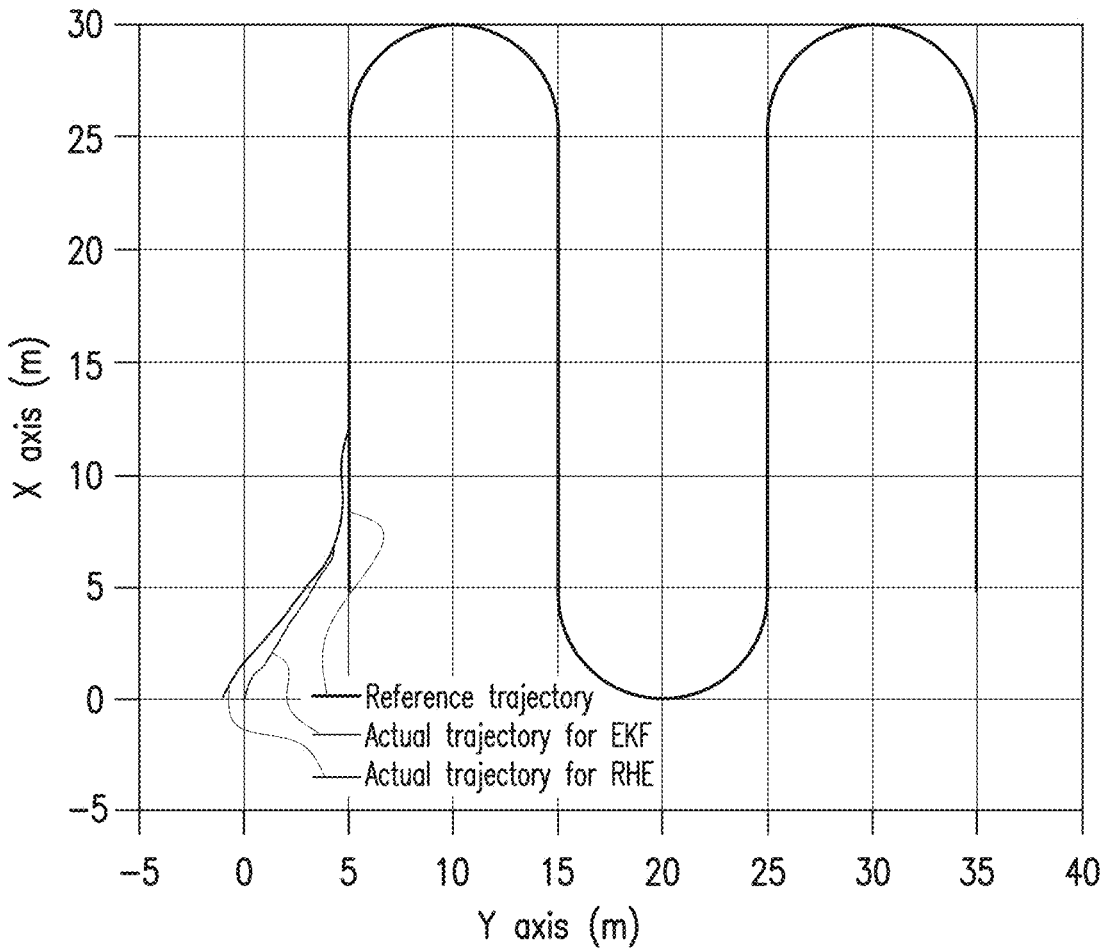
FIG. 43 depicts tracking performance for an apparatus (according to an embodiment) that can operate as an agricultural robot for collecting data without damaging crops.

FIGS. 42A-42D depict dimensions for an embodiment of the robot. The robot has a mechanism to include suspension to the wheels of the robot. This robot is equipped with two sideward facing visual spectrum cameras, one forward facing camera, and an Intel RealSense 3D sensor. The robot can also include LED lighting to aid operation in shaded areas. A Paralyne coating can be provided for water resistance, wherein a benefit of this approach is that it does not significantly add to the weight or form-factor of the robot while providing water resistance. In this embodiment, the robot can provide autonomous path following with high accuracy. The robot is fully autonomous, capable of following predefined trajectories with a high level of accuracy. Accurate steering through crop rows avoids crop damage, and is one of the most important features for an agricultural robot. In practice, varying soil conditions can result in off-track navigation due to unknown soil traction coefficients. To address this problem, the robot of this embodiment implements RHEC-based navigation applied to a fully autonomous mobile platform that has been rigorously evaluated in realistic field conditions to yield far less than 5 inches of path tracking error. The guidance and control system fuses the measurements from an inertial sensor (gyroscope) with RTK-GPS and uses nonlinear model predictive control to execute the path tracking control. All four wheels are independently controlled. A real-time receding horizon estimation and control (RHEC) framework is developed and implemented on an embedded computer. In this example, RHE (receding horizon estimation) is used to estimate constrained states and parameters, and RHC (receding horizon control) is based on an adaptive system model which contains time-varying parameters. The capabilities of the real-time RHEC framework are verified experimentally and the results show an accurate tracking performance on a bumpy and wet soil field as illustrated in FIG. 43. The mean values of the Euclidean error and required computation time of the RHEC framework are respectively equal to 1.66 inches and 0.88 milliseconds.

In one or more embodiments, an agricultural robot is provided with shape, form, weight and material such that it does not damage plants even if it drives over them or brushes against them during operation throughout the season, from plant emergence to post harvest. A locomotion mechanism for the robot enables it to traverse agricultural fields without damaging plants. An autonomous navigation system comprising sensors, computers, and actuators enables the robot to plan and drive on a path in the agricultural field that does not damage crop-plants, and plan and conduct crop management actions in a manner that does not damage crop-plants.

In one embodiment, the robot can be provided with an embedded sensor system, algorithms, and software for onboard agronomic functions without requiring cloud connectivity or connectivity to other computers/robots. The robot can perform various data collection functions including stand counts, stalk angle estimation, ear height and plant height estimation, disease identification (e.g., rust, mosaic, fungal), insect damage identification (e.g., leaf damage, stalk damage, insect nest identification), insect detection, plant and soil sampling and/or retrieving samples that can be returned to a ground station. In one embodiment, the robot can include a communication and coordination system that enables a remote user to control one or more autonomous robots in a manner such that crop-plants are not damaged. The communication and coordination system can enable a team of robots to communicate and collaborate to obtain agronomic measurements without damaging crop-plants, by determining least damaging paths and allocating portions of the field to specific robots to reduce areas traveled and increase speed of obtaining agronomic information.

In one embodiment, the communication and coordination system enables a team of robots to communicate and collaborate to conduct field management, including but not limited to one or more of weeding, culling, sampling, spraying, pruning, harvesting without damaging crop-plants, by determining least damaging paths and allocating portions of the field to specific robots to reduce areas traveled and increase speed of conducting management tasks.

In one embodiment, a field deployed automatic recharging system is provided that enables the robot to recharge its batteries via including but not limited to one or more of a connected recharge, inductive recharge, battery swap, or wireless charging. In one or more embodiments, a field deployable robot is capable of assisting other robots through activities such as repairing, rescuing, or recharging other robots in a manner that does not damage crop-plants.

Accurate steering through crop rows that avoids crop damage can be an important task for agricultural robots utilized in various field operations. In one or more embodiments, varying soil conditions which typically result in off-track navigation due to unknown traction coefficients and which typically can cause crop damage, can be accounted for by various embodiments. For example, a real-time receding horizon estimation and control (RHEC) framework can be applied to a fully autonomous field robot to increase its steering accuracy.

Lower cost and faster microprocessors, as well as advances in solution methods for nonlinear optimization problems, enable nonlinear receding horizon control (RHC) and receding horizon estimation (RHE) methods to be utilized for field robots that require high frequency (milliseconds) updates. In one embodiment, a real-time RHEC framework is developed and applied to a fully autonomous mobile robotic platform for in-field phenotyping applications, such as in Sorghum fields (although the embodiments can be utilized in various fields having various crops). RHE can be used to estimate constrained states and parameters, and is formulated below:

$$\min_{\xi(t),u(t)} \frac{1}{2} \left\{ \left\| \begin{matrix} \hat{\xi} - \hat{\xi}(t_i) \\ \hat{p} - p \end{matrix} \right\|_{H_N}^2 + \sum_{i=k-N+1}^{k} \|z_m(t_i) - z(t_i)\|_{H_i}^2 \right\} \tag{1C}$$

$$\text{s.t.} \begin{cases} \dot{\xi}(t) = f(\xi(t), u(t), p) \\ z(t) = h(\xi(t), u(t), p) \\ \xi_{min} \le \xi(t) \le \xi_{max} \\ p_{min} \le p(t) \le p_{max} \end{cases}$$

where $\xi$, $u$, $p$ and $z$ are respectively the state, input parameters and output vectors. RHC is designed based on the adaptive system model with time-varying parameters and formulated below:

$$\min_{\xi(t),u(t)} \frac{1}{2} \left\{ \left( \sum_{i=k+1}^{k+N-1} \|\xi_r(t_i) - \xi(t_i)\|_{Q_k}^2 + \|u_r(t_i) - u(t_i)\|_R^2 \right) + \tag{2C}$$

$$\|\xi_r(t_{k+N}) - \xi(t_{k+N})\|_{Q_N}^2 \right\}$$

$$\text{s.t.} \begin{cases} \xi(t_k) = \hat{\xi}(t_k) \\ \dot{\xi}(t) = f(\xi(t), u(t), p) \\ \xi_{min} \le \xi(t) \le \xi_{max} \\ u_{min} \le u(t) \le u_{max} \end{cases}$$

In one embodiment, a 3D printed field robot, such as shown in FIGS. 43A-43D, can be formulated with the following equations:

$$\dot{x} = \mu v \cos \theta \tag{3C}$$

$$\dot{y} = \mu v \sin \theta \tag{4C}$$

$$\dot{\theta} = \kappa \omega \tag{5C}$$

where x and y denote the position of the field robot, $\theta$ denotes the yaw angle, v denotes the speed, $\omega$ denotes the yaw rate, and $\mu$ and $\kappa$ denote the traction parameters.

Figure 44A:
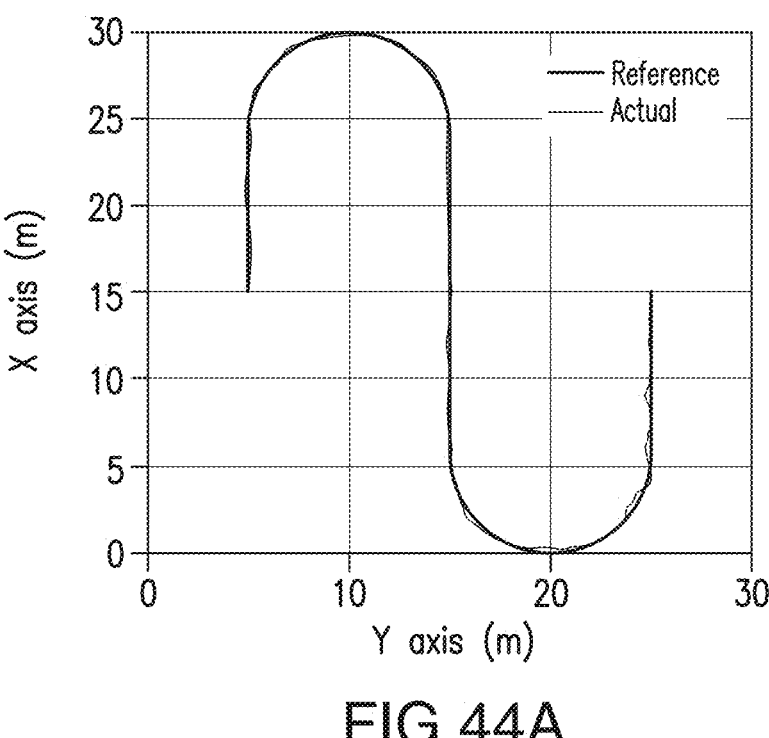
FIGS. 44A and 44B depict tracking performance for an apparatus (according to an embodiment) that can operate as an agricultural robot for collecting data without damaging crops.
Figure 44B:
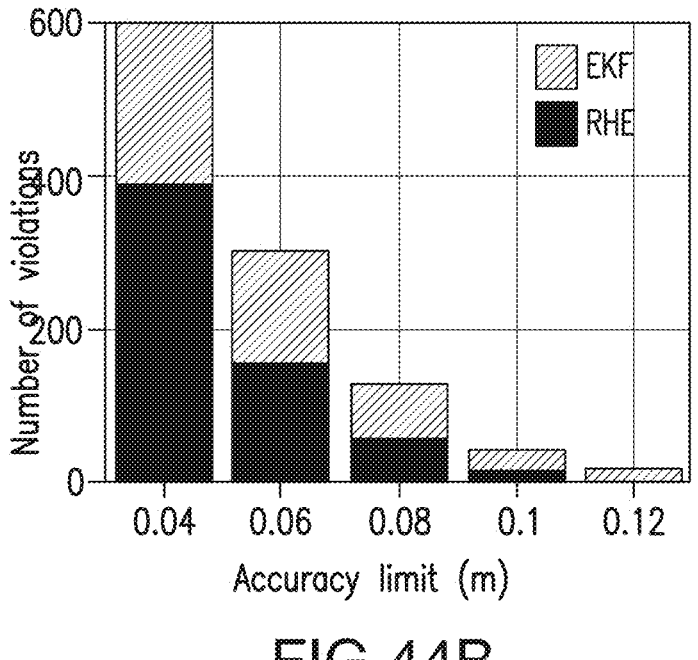

The results show an accurate tracking performance on a bumpy and wet soil field (see FIGS. 44A and 44B). The mean values of the Euclidian error for the RHCs based on the RHE and the EKF are 0.0423 m and 0.0514 m, respectively. The RHEC framework benefits from traction parameter estimates and results in less error compared to the RHC based on the EKF. The available space on either side of the robot (of this embodiment) is limited to only 0.12 m; therefore, the error must be smaller than this limit to avoid crop damage and keep the robot centered in the row. The results of multiple experiments indicated that the RHEC framework does not violate this error constraint, while the RHC based on the EKF violates it 17 times during the path tracking of straight lines. This demonstrates the capability of the RHEC framework. Moreover, the required computation time of the RHEC framework are respectively equal to 0.88 ms.

In another embodiment, nonlinear system and measurement models can be represented by the following equations:

$$\dot{\xi}(t)=f(\xi(t),u(t),p(t)) \tag{6C}$$

$$z(t)=h(\xi(t),u(t),p(t)) \tag{7C}$$

where $\xi \in \mathbb{R}^{n_\xi}$ is the state vector, $u \in \mathbb{R}^{n_u}$ is the control input, $p \in \mathbb{R}^{n_p}$ is the system parameter vector, $z \in \mathbb{R}^{n_z}$ measured output, $f(.,.,.):\mathbb{R}^{n_\xi+n_u+n_p} \rightarrow \mathbb{R}^{n_\xi}$ is the continuously differentiable state update function and $f(0,0,p)=0 \forall t$, and $h:\mathbb{R}^{n_\xi+n_u+n_p} \rightarrow \mathbb{R}^{n_z}$ is the measurement function. The derivative of $\xi$ with respect to t is denoted by $\dot{\xi} \in \mathbb{R}^{n_\xi}$.

A schematic diagram of a 3D printed field robot of an embodiment is illustrated in FIG. 40. An adaptive nonlinear kinematic model is derived for the 3D printed field robot as an extension of the traditional kinematic model as follows:

$$\begin{bmatrix} \dot{x} \\ \dot{y} \\ \dot{\theta} \end{bmatrix} = \begin{bmatrix} \mu v \cos\theta \\ \mu v \sin\theta \\ \kappa \omega \end{bmatrix} \tag{8C}$$

where x and y denote the position of the field robot, $\ominus$ denotes the yaw angle, $\omega$ denotes the speed, $v$ denotes the yaw rate, and $\mu$ and $\kappa$ denote the traction parameters. The difference between the traditional and developed model above is two slowly changing traction parameters. These parameters provide for minimizing deviations between the real-time system and 3D printed field robot with an online parameter estimator. It is noted that they must be (in this embodiment) between zero and one.

The state, parameters, input and output vectors are respectively denoted as follows:

$$\xi=[xy\theta]^T \tag{9C}$$

$$p=[v\mu k]^T \tag{10C}$$

$$u=\omega \tag{11C}$$

$$z=[xyv\omega]^T \tag{12C}$$

Although model-based controllers need full state and parameter information to generate a control signal, the number of sensors is less than the number of immeasurable states and parameters in practice. Therefore, state estimators are required to estimate immeasurable states and parameters. Extended Kalman filter is the most well-known method for nonlinear systems. However, it is not capable of dealing with constrained nonlinear systems. The traction parameters estimates can play a vital role for the 3D printed robot, and there exist constraints on these parameters, which makes Extended Kalman filter inconvenient for this system. The RHE approach has a capability of dealing with constraints on state and parameter and formulated for the 3D printed robot (of this embodiment) as follows:

$$\min_{\xi(t),p,u(t)} \frac{1}{2} \left\{ \left\| \begin{array}{c} \hat{\xi}(t_{k-N+1}) - \xi(t_{k-N+1}) \\ \hat{p} - p \end{array} \right\|_{H_N}^2 + \sum_{i=k-N+1}^{k} \|z_m(t_i) - z(t_i)\|_{H_k}^2 \right\} \tag{13C}$$

$$\text{s.t. } \dot{\xi}(t) = f(\xi(t), u(t), p)$$
$$z(t) = h(\xi(t), u(t), p)$$
$$0 \le \mu \text{ and } \kappa \le 1 \quad \forall t \in [t_{k-N}, t_k]$$

where the deviations of the states and parameters estimates before the estimation horizon are minimized by a symmetric positive semi-definite weighting matrix HN, and the deviations of the measured and system outputs in the estimation horizon are minimized by a symmetric positive semidefinite weighting matrix Hk. The estimation horizon is represented by N, and lower and upper bounds on the traction parameters k parameters are respectively defined as 0 and 1. The objective function in the RHE formulation consists of two parts: the arrival and quadratic costs. The arrival cost stands for the early measurements:

$$t=[t_{0,k-N+1}],$$

and the quadratic cost stands for the recent measurements:

$$t=[t_{t-N+1,k}].$$

The measurements have been perturbed by Gaussian noise with standard deviation of $\sigma x=\sigma y=0:03$ m, $\sigma w=0:0175$ rad/s, $\sigma v=0:05$ m/s based on experimental analysis. Therefore, the following weighting matrices $H_k$ and $H_N$ are used in nonlinear RHE:

$$H_k = \text{diag}\left(\sigma_x^2, \sigma_y^2, \sigma_v^2, \sigma_\omega^2\right)^{-1} \tag{14C}$$
$$= \text{diag}\left(0.03^2, 0.03^2, 0.5^2, 0.0175^2\right)^{-1}$$

$$H_N = \text{diag}\left(x^2, y^2, \theta^2, v^2, \mu^2, \kappa^2\right)^{-1} = \tag{15C}$$
$$\text{diag}\left(10.0^2, 10.0^2, 0.1^2, 1.0^2, 0.25^2, 0.25^2\right)^{-1}$$

The inputs to the RHE algorithm are the position values coming from the GNNS, the velocity values coming from the encoders mounted on the DC motors and the yaw rate values coming from the gyro. The outputs of RHE are the position in x- and y-coordinate system, the yaw angle, the velocity and the traction coefficients. The estimated values are then fed to the RHC.

The RHC approach is usable for a system with fast dynamics. The reason is that RHC has capability of dealing with hard constraints on state and input, and online optimization allows updating cost, model parameters, constraints. The following finite horizon optimal control formulation for the 3D printed robot (of this embodiment) is solved to obtain the current control action by using current state of the system as initial state:

$$\min_{\xi(t),u(t)} \frac{1}{2} \tag{16C}$$

$$\left\{ \left\{ \sum_{i=k+1}^{k+N-1} \|\xi_r(t_i) - \xi(t_i)\|_{Q_k}^2 + \|u_r(t_i) - u(t_i)\|_R^2 \right\} + \left\| \xi_r(t_{k+N}) - \xi(t_{k+N}) \right\|_{Q_N}^2 \right\}$$

$$\text{s.t.} \quad \xi(t_k) = \hat{\xi}(t_k)$$
$$\dot{\xi}(t) = f(\xi(t), u(t), p)$$
$$-0.1 \text{ rad/s} \le \omega(t) \le 0.1 \text{ rad/s} \quad t \in [t_{k+1}, t_{k+N-1}]$$

where $Qk \in \mathbb{R}^{n_\xi \times n_\xi}$, $R \in \mathbb{R}^{n_u \times n_u}$ and $QN \in \mathbb{R}^{n_\xi \times n_\xi}$ are symmetric and positive semi-definite matrices, $\xi_r$ and $u_r$ are the state and input references. $\xi$ and u are the states and inputs, $t_k$ is the current time, N is the prediction horizon, $\hat{\xi}(t_k)$ is the current estimates. The first term in the Cost function is the stage cost and it is the cost throughout the prediction horizon. The second term in the cost function is the terminal penalty and it is the cost at the end of the prediction horizon. The terminal penalty is stated for stability reasons [1].

The first element of the optimal controls sequence is applied to the system:

$$u(t_{k+1}, \hat{\xi}_{k+1}) = u^*(t_{k+1}) \tag{17C}$$

and then the procedure is repeated for future sampling times by shifting prediction horizon for the subsequent time instant. It is important to remark that the control input $u^*(t_{k+1})$ is precisely the same as it would be if all immeasurable states and parameters acquire values equal to their estimates based on the estimation up to current time $t_k$ due to the certainty equivalence principle.

The state reference for the 3D printed robot (of this embodiment) is changed online and defined as follows:

$$\xi_r = [x_r, y_r, \theta_r]T \text{ and } u_r = \omega_r \tag{18C}$$

where $x_r$ and $y_r$ are the position references, $\omega_r$ is the yaw rate reference calculated from the position references as follows:

$$\theta_r = a \tan 2(\dot{y}_r, \dot{x}_r) + \lambda\pi \tag{19C}$$

where $\lambda$ describes the desired direction of the 3D printed field robot ($\lambda=0$ for forward and $\lambda=1$ for backward). The yaw rate reference can be calculated from the reference trajectory as the yaw angle reference. However, steady state error may occur in the case of a mismatch between the system model and 3D printed robot. Therefore, the recent measured yaw rate is used as the input reference to penalize the input rate in the objective function discussed herein.

In one or more embodiments, an agricultural robot is provided that does not damage crop-plants even if it drives over them through use of a weight of the robot being significantly small, even though the robot can withstand harsh field conditions; the material that the robot is built from provides the right strength-to-weight ratio, and does not damage plants; the structure of the robot has appropriate ground clearance, lack of sharp edges, and appropriate wheel design to be able to drive over plants without damaging them; control and analytics algorithms take into account the physical constraints of the robot and its environment; and/or the manufacturability of the robot, the operating paradigm, and/or the use case reduces or minimizes cost of manufacturing, operation, and/or ownership.

From the descriptions herein, it would be evident to an artisan with ordinary skill in the art that the various embodiments can be modified, reduced, or enhanced without departing from the scope and spirit of the claims described below. For example, the sensing functions can be dynamically implemented or otherwise controlled. In one example, different groups of sensors can be actuated based on various factors, such as weather, crop type, location, size of crops, speed of robot, and so forth. In one embodiment, the dynamic control of the sensing functions can be autonomous without user actuation. In another embodiment, the dynamic control of the sensing functions can be based on user actuation or can be initiated after user authorization, such as a user responding to a message from the robot suggesting that a particular sensor or algorithm be actuated or executed.

In one embodiment, data collected by the robot can trigger collection of different data. For instance, a robot can detect a condition associated with crops and can actuate one or more sensors that attempt to detect causes for that condition (e.g., disease, insects, and so forth). In one embodiment, the triggering of a new data collection technique by the robot can be autonomous without user actuation; based on user actuation; or can be initiated after user authorization, such as a user responding to a message from the robot suggesting that a particular sensor or algorithm be actuated or executed.

In one embodiment, one robot can provide notice to other robot(s) and/or to a central processing system indicating particular data that should be retrieved. For example, a first robot can collect data indicating the existence of a particular condition based on a threshold comparison associated with the collected data. The first robot can then wirelessly transmit a message to one or more second robots (with or without notice or authorization from a user) to cause the second robots to commence collecting the same data associated with the condition.

In one embodiment, the robot can be part of a group of robots that are collecting data at a location. In another embodiment, the group of robots can be in a master/slave relationship so that one or more master robots can control one or more slave robots, such as control over types of data collection, navigation paths, operational parameters (e.g., speed), and so forth. In one embodiment, the group of robots can be similar robots with similar operational capabilities (such as the ability to collect the same types of data). In another embodiment, the group of robots can be different robots with one or more different operational capabilities (such as the ability to collect different types of data).

In one embodiment, the robot can implement different algorithms for the data collection based on determined factors, such as time, location, weather, robot speed, data received from other sources (e.g., other robots, intelligent agricultural equipment, and so forth).

In one embodiment, a group of robots can collaborate to provide an optimized and/or efficient data collection technique to a particular location. For example, the location can be divided into portions where each available robot performs all data collection for that portion. In this example, the portions may be of different sizes depending on different speeds of the robots. As another example, the data collection can be divided into tasks where each available robot performs some of the tasks for all or some of the location. In this example, the tasks may be shared between some robots and the robots may be selected based on the capabilities, such as speed, processing resources, sensing components, and so forth.

In one embodiment, historical information can be utilized by the robot to adjust its operations. For example, the robot may select a particular group of data to be collected based on historical information indicating that the crop has been previously susceptible to a particular insect or disease. The historical information can be obtained from various sources, including other robots at other locations. In one embodiment, the robot can travel at a velocity of 1 mph, 2-3 mph and/or 4-5 mph.

In one embodiment, the robot and/or team of robots and/or a web-based computer uses machine learning to: detect and identify agriculturally relevant phenomena using data from single or plurality of sensors, such as weeds, stressors, insects, diseases etc.; and/or to measure agronomic quantities, such as stem width, stand count, plant height, ear height etc.

As described herein, aspects of the subject disclosure may include, for example, an apparatus having a processing system that receives velocity feedback signals associated with each of the wheels of the apparatus, that receives positional information from a global navigation satellite system of the apparatus, that receives measurement signals from a gyroscope of the apparatus, that determines control signals based on desired angular and linear velocities according to the velocity feedback signals, the positional information and the measurement signals by applying a real-time receding horizon estimation and control, and that transmits the control signals to a controller coupled with electric motors thereby causing the apparatus operating as an agricultural robot to track a reference path, where each of the electric motors is connected with one of the wheels and enable the agricultural robot to rotate 180 degrees. Additional embodiments are disclosed.

In one embodiment, an apparatus is provided comprising: a frame; wheels rotatably connected with the frame; a battery connected with the frame; electric motors supported by the frame and connected to the battery, wherein each of the electric motors is connected with one of the wheels, wherein the electric motors allow the apparatus to rotate 180 degrees; a processor supported by the frame; velocity sensors supported by the frame and coupled with the processor, wherein each of the velocity sensors is connected with one of the wheels, wherein the velocity sensors transmit velocity feedback signals associated with each of the wheels to the processor; a global navigation satellite system (GNSS) supported by the frame and comprising a GNSS antenna and GNNS computer coupled with the processor, wherein the global navigation satellite system receives, processes and transmits positional information to the processor; a gyroscope supported by the frame and coupled with the processor, wherein the gyroscope transmits measurement signals including yaw rate measurements to the processor; and a group of sensors supported by the frame and coupled with the processor, wherein the group of sensors collect phenotypic data associated with crops, wherein the processor determines controls signals based on desired angular and linear velocities according to the velocity feedback signals, the positional information and the measurement signals by applying a real-time receding horizon estimation and control, and wherein the processor transmits the control signals for each of the electric motors thereby causing the apparatus to track a reference path.

In one example, the apparatus weighs less than 20 lbs.

In another example, each of the wheels includes spade structures that circumscribe the wheel and selectively contact soil.

In another example, the processor transmits the control signals without receiving command signals from a user at a remote source.

In another example, the battery is chargeable by a deployable charging device via inductive recharging, wireless recharging, a hardwire connection, or a combination thereof.

In another example, the processor selects an algorithm from among a group of algorithms associated with one of the group of sensors without receiving command signals from a user at a remote source.

In another example, the processor selects an algorithm from among a group of algorithms associated with one of the group of sensors according to an analysis of at least some of the phenotypic data and without receiving command signals from a user at a remote source.

In another example, the processor actuates one of the group of sensors without receiving command signals from a user at a remote source.

In another example, the processor actuates one of the group of sensors according to an analysis of at least some of the phenotypic data and without receiving command signals from a user at a remote source.

In another example, the processor transmits a command signal to another apparatus, wherein the command signal causes the other apparatus to select an algorithm from among a group of algorithms, actuate a sensor or a combination thereof, wherein the other apparatus is an autonomous agricultural robot that collects data associated with the crops.

In another example, the processor generates the command signal according to an analysis of at least some of the phenotypic data and without receiving other command signals from a user at a remote source.

In another example, the apparatus is part of a group of apparatuses that each operate as autonomous agricultural robots that collect the phenotypic data associated with the crops, wherein the group of apparatuses communicate with each other for assigning data collection paths, data collection tasks, or a combination thereof.

In another example, the group of apparatuses are in a master device/slave device relationship that enables one or more master devices of the group of apparatuses to control one or more slave devices of the group of apparatuses.

In another example, the processor receives a remote control signal from a remote source that causes the processor to adjust operation of the apparatus.

In another example, components of the apparatus including the frame are made from 3D printed material.

In another embodiment, an apparatus is provided comprising: a frame; wheels rotatably connected with the frame; a battery connected with the frame; electric motors supported by the frame and connected to the battery, wherein each of the electric motors is connected with one of the wheels, wherein the electric motors allow the apparatus to rotate 180 degrees; a processor supported by the frame; velocity sensors supported by the frame and coupled with the processor, wherein each of the velocity sensors is connected with one of the wheels, wherein the velocity sensors transmit velocity feedback signals associated with each of the wheels to the processor; a global navigation satellite system (GNSS) supported by the frame and comprising a GNSS antenna and GNNS computer coupled with the processor, wherein the global navigation satellite system receives, processes and transmits positional information to the processor; a gyroscope supported by the frame and coupled with the processor, wherein the gyroscope transmits measurement signals including yaw rate measurements to the processor; and a group of sensors supported by the frame and coupled with the processor, wherein the group of sensors collect phenotypic data associated with crops, wherein the processor determines controls signals based on desired angular and linear velocities according to the velocity feedback signals, the positional information and the measurement signals, wherein the processor transmits the control signals for each of the electric motors thereby causing the apparatus to track a reference path, wherein the processor generates data collection signals to select or adjust one or more data collection algorithms, one or more of the group of sensors or a combination thereof thereby adjusting the collection of the phenotypic data associated with crops, wherein the data collection signals are generated by the processor according to an analysis of at least some of the phenotypic data, other information obtained by the processor, or a combination thereof, and wherein the data collection signals are generated by the processor without receiving command signals from a user at a remote source.

In one example, the other information obtained by the processor comprises historical phenotypic data associated with a location of the crops, weather information, time information, or a combination thereof.

In another example, the apparatus weighs less than 20 lbs, and each of the wheels includes spade structures that circumscribe the wheel and selectively contact soil.

In another embodiment, a method is provided comprising: receiving, by a processing system of an agricultural robot having wheels, velocity feedback signals associated with each of the wheels, wherein the velocity feedback signals are received from velocity sensors of the agricultural robot, wherein each of the velocity sensors is connected with one of the wheels; receiving, by the processing system, positional information from a global navigation satellite system (GNSS) of the agricultural robot; receiving, by the processing system, measurement signals from a gyroscope of the agricultural robot, wherein the measurement signals include yaw rate measurements; determining, by the processing system, controls signals based on desired angular and linear velocities according to the velocity feedback signals, the positional information and the measurement signals by applying a real-time receding horizon estimation and control; and transmitting, by the processing system, the control signals to a controller coupled with electric motors thereby causing the agricultural robot to track a reference path, wherein each of the electric motors is connected with one of the wheels and enable the agricultural robot to rotate 180 degrees.

In one example, the method further comprises: receiving, by the processing system from a group of sensors of the agricultural robot, phenotypic data associated with crops; and generating, by the processing system, data collection signals to select or adjust one or more data collection algorithms, one or more of the group of sensors or a combination thereof thereby adjusting the collection of the phenotypic data associated with crops, wherein the data collection signals are generated by the processing system according to an analysis of at least some of the phenotypic data, other information obtained by the processing system, or a combination thereof, and wherein the data collection signals are generated by the processing system without receiving command signals from a user at a remote source.

Figure 45:
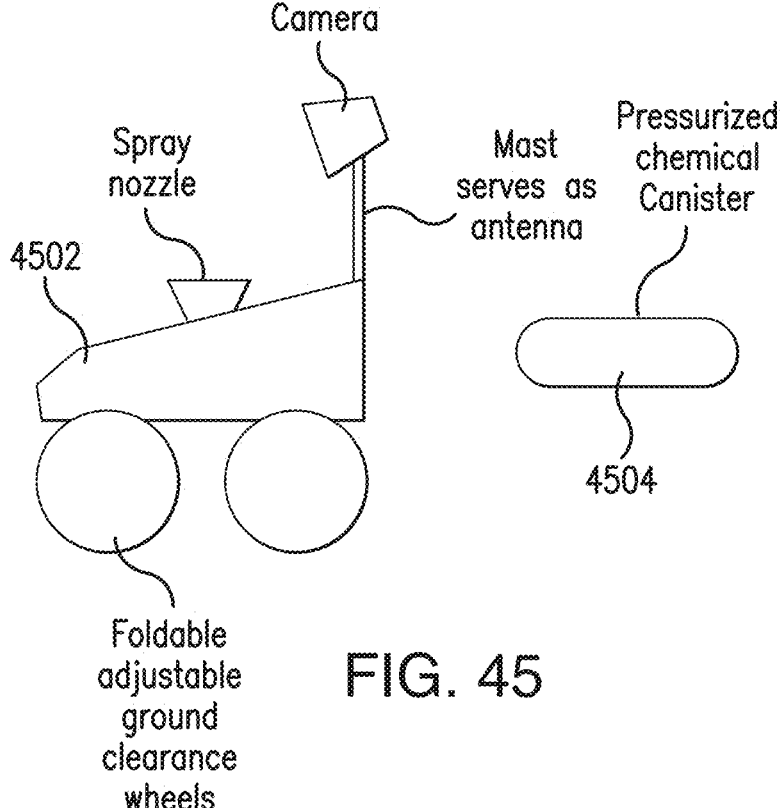
FIG. 45 depicts an illustrative embodiment of an apparatus that can operate as an agricultural robot for applying chemicals.

Referring now to FIG. 45, an embodiment of a robotic chemical treatment system is illustrated that is capable of spraying chemicals under the canopy in multiple crops. The system can include a small autonomous robot 4502 (e.g., under 50 lb and/or less than 20 inches) with multiple sensors and actuators. The system can include a replaceable canister 4504 containing liquid, that can be pressurized, and/or that can have multiple chambers containing different liquids. In one example, the canister can be configured for mounting on, to and/or in the robot 4502. In another example, the canister can be configured for towing behind the robot 4502 (e.g., on a trailer, not shown). The system can include mechanisms for accepting one or more canisters (e.g., two). The system can include mechanisms for spraying the liquid including one or more replaceable nozzle(s). The mechanism can include a pressurization system. The system can include an actuator system having one or more actuators for operating the mechanism for spraying (e.g., four), control the rate, duration, direction, and force of spray. The system can include a liquid pressurization system that can include motors, pumps, canisters of pressurized gases (e.g., CO2, N, or others). The system can include a remote operator interface connected via a network enabling a user to control the robot and spraying, including the ability to upload a prescription from another device on an interconnected network. The robot can have the capability to follow the prescribed path autonomously and spray according to prescription. The robot can have the capability to automatically decide when, what, and where to spray by analyzing agronomic quantities through on-board sensors while following scouting paths autonomously. The system can generate an optimal path based on field conditions and/or data from other connected devices (e.g., the apparatus of FIG. 36) to achieve prescription targets and/or mission objectives. The system can adapt the path and spraying prescription using data obtained by on-board sensors and/or other connected devices to satisfy higher-level mission objectives, such as find and spray appropriate chemicals on plants with specific disease. The system can perform one or more of the above-described features with or without user interaction with the system.

In another embodiment, a drone (e.g., robot) can pass through a field of crops a first time (as a first stage) to collect data. Then, the drone can pass through the field of crops a second time (as a second stage) to confirm the cause of an anomaly and/or to apply a treatment. In one example, the path taken by the drone during the first stage can be the same as the path taken by the drone during the second stage. In another example, the path taken by the drone during the second stage can be different from the path taken by the drone during the first stage. In another example, the drone can be equipped with a sprayer attachment (or other such device) and the confirmation can be based upon some level of machine learning that had been carried out in the past (e.g., prior to the second stage).

In another embodiment, a swarm (or group) of drones (e.g., robots) could work together. For instance, one or a few drones can first collect data on one (or more) first stage paths (as discussed above). The collected data can then be analyzed (the analysis can be performed on-board one or more of the drones and/or on a ground-based computational platform). Next, one or more different drones carrying the chemical(s) necessary to treat problem(s) in each of the identified area(s) can go to area(s) to treat one or more problems.

As described herein, in one embodiment the robot(s) applying treatment are the same one(s) that did the identification (e.g., the identification of an anomaly).

As described herein, in one embodiment the robot(s) applying treatment are different from the one(s) that did the identification (e.g., the identification of an anomaly).

In various embodiments, the term drone can refer to any small robot, whether aerial or ground based.

In one embodiment, a communication system can enable a device (e.g., a mobile robot) to wirelessly communicate (e.g., bi-directionally) with a remote computer from which the device can receive one or more instructions and/or send information, In one embodiment, a size and/or a location of a window associated with foreground extraction can be changed. In one example, the size and/or location can be changed by an onboard computer or processor (e.g., onboard a mobile robot). In another example, the size and/or location can be communicated to the device (e.g., mobile robot) by an external computer or processor.

In another embodiment, a support vector machine can comprise a soft margin support vector machine that applies a slack variable to data points on or inside of a correct decision boundary.

In another embodiment, estimation of width can comprise using foreground extraction and/or LIDAR depth estimate(s).

In another embodiment, a distance to a row can be estimated using a single ranging device or a plurality of ranging devices. The ranging device or devices can emit electromagnetic, laser, infra-red, and/or acoustic waves.

In another embodiment, a device (e.g., mobile robot) can have multiple cameras. In one example, the device (e.g., mobile robot) can use an onboard processing system to combine information from the multiple cameras to compute distance to row(s).

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the discussion herein are intended to be non-limiting, and thus additional numerical values, ranges, and percentages are within the scope of the disclosed embodiments.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the disclosure has been described in detail in connection with a limited number of embodiments, it should be readily understood that the invention is not limited to such disclosed embodiments. Rather, that disclosed can be modified to incorporate any number of variations, alterations, substitutions or equivalent arrangements not heretofore described, but which are commensurate with the spirit and scope of the invention. Additionally, while various embodiments of the invention have been described, it is to be understood that disclosed aspects may include only some of the described embodiments.

One or more of the embodiments can utilize one or more features (e.g., one or more of the systems, methods and/or algorithms) described in U.S. Provisional Patent Application No. 62/688,885, filed on Jun. 22, 2018 (including each Appendix attached thereto). The one or more features (e.g., one or more of the systems, methods and/or algorithms) described in U.S. Provisional Patent Application No. 62/688,885, filed on Jun. 22, 2018 (including each Appendix attached thereto) can be utilized in place of and/or in addition to one or more features described herein with respect to the various embodiments. The disclosure of U.S. Provisional Patent Application No. 62/688,885, filed on Jun. 22, 2018 (including each Appendix attached thereto) is incorporated by reference herein in its entirety.

One or more of the embodiments can utilize one or more features (e.g., one or more of the systems, methods and/or algorithms) described in U.S. Provisional Patent Application No. 62/596,506, filed on Dec. 8, 2017 (including each Appendix attached thereto). The one or more features (e.g., one or more of the systems, methods and/or algorithms) described in U.S. Provisional Patent Application No. 62/596,506, filed on Dec. 8, 2017 (including each Appendix attached thereto) can be utilized in place of and/or in addition to one or more features described herein with respect to the various embodiments. The disclosure of U.S. Provisional Patent Application No. 62/596,506, filed on Dec. 8, 2017 (including each Appendix attached thereto) is incorporated by reference herein in its entirety.

One or more of the embodiments can utilize one or more features (e.g., one or more of the systems, methods and/or algorithms) described in U.S. Provisional Patent Application No. 62/550,271, filed on Aug. 25, 2017 (including each Appendix attached thereto). The one or more features (e.g., one or more of the systems, methods and/or algorithms) described in U.S. Provisional Patent Application No. 62/550,271, filed on Aug. 25, 2017 (including each Appendix attached thereto) can be utilized in place of and/or in addition to one or more features described herein with respect to the various embodiments. The disclosure of U.S. Provisional Patent Application No. 62/550,271, filed on Aug. 25, 2017 (including each Appendix attached thereto) is incorporated by reference herein in its entirety.

What is claimed is:

1. A method comprising:

capturing, by a camera coupled with a processing system that includes a processor, a group of images associated with a field of plants, wherein the group of images is captured while the camera is in motion in the field;

applying, by the processing system, a convolutional neural network to the group of images to extract feature vectors;

applying, by the processing system, a support vector machine to the feature vectors to classify the feature vectors, wherein the applying the support vector machine results in classified features;

applying, by the processing system, motion estimation based on a rigid transformation to the classified features, wherein the applying the motion estimation results in corrected count data; and determining, by the processing system, a plant population for the field of plants based on the classified features and the corrected count data.

2. The method of claim 1, wherein the camera is a single monocular camera that is attached to a ground mobile robot, and wherein the method further comprises:

obtaining the group of images from the single monocular camera, wherein the group of images comprises a plurality of frames, wherein the ground mobile robot travels along a lane defined by a row of the plants, wherein the row of plants comprises a first plant stem, and wherein the plurality of frames include a depiction of the first plant stem;

obtaining robot velocity data from one or more encoders, wherein the one or more encoders is attached to the ground mobile robot;

performing foreground extraction on each of the plurality of frames, wherein the foreground extraction results in a plurality of foreground images; and determining, based upon the plurality of foreground images and based upon the robot velocity data, an estimated width of the first plant stem, wherein the determining the estimated width of the first plant stem comprises determining a ratio R, wherein $R = V_R / V_x$, wherein $V_R$ is an instantaneous robot velocity obtained via the robot velocity data and $V_x$ is an average horizontal foreground pixel velocity obtained via a structure from motion process that is based upon the plurality of frames.

3. The method of claim 1, wherein the camera is attached to a ground mobile robot, and wherein the ground mobile robot comprises:

a plurality of wheels;

one or more batteries;

a plurality of electric motors, wherein each of the plurality of electric motors is electrically connected to the one or more batteries, wherein each of the plurality of electric motors is connected with one of the plurality of wheels, wherein the plurality of electric motors allow the ground mobile robot to rotate at least 180 degrees;

a plurality of velocity sensors coupled with the processing system, wherein each of the plurality of velocity sensors is connected with one of the plurality of wheels, wherein each of the plurality of velocity sensors transmits a respective velocity feedback signal associated with a respective one of each of the plurality of wheels to the processing system;

a global navigation satellite system (GNSS) comprising a GNSS antenna and GNSS computer coupled with the processing system, wherein the GNSS receives input positional information, processes the input positional information, and transmits output positional information to the processing system; and a gyroscope coupled with the processing system, wherein the gyroscope transmits measurement signals including yaw rate measurements to the processing system;

wherein the processing system determines one or more control signals based on a desired angular velocity and a desired linear velocity, and wherein the one or more control signals are determined according to the velocity feedback signals, the positional information, and the measurement signals by applying a real-time receding horizon estimation and control; and wherein the processing system transmits the one or more control signals to one or more of the plurality of electric motors, thereby causing the ground mobile robot to track a reference path.

4. The method of claim 1, wherein the camera is a single monocular camera that is attached to a ground mobile robot.

5. The method of claim 4, wherein the method further comprises:

obtaining the group of images from the single monocular camera, wherein the group of images comprises a plurality of frames.

6. The method of claim 5, wherein the method further comprises:

obtaining robot velocity data from one or more encoders, wherein the one or more encoders is attached to the ground mobile robot.

7. The method of claim 6, wherein the method further comprises:

performing foreground extraction on each of the plurality of frames, wherein the foreground extraction results in a plurality of foreground images.

8. The method of claim 7, wherein the method further comprises:

determining, based upon the plurality of foreground images and based upon the robot velocity data, an estimated width of a first plant stem.

9. The method of claim 8, wherein the determining the estimated width of the first plant stem comprises determining a ratio R, wherein $R=V_R/V_x$, wherein $V_R$ is an instantaneous robot velocity obtained via the robot velocity data and $V_x$ is an average horizontal foreground pixel velocity obtained via a structure from motion process that is based upon the plurality of frames.

10. The method of claim 1, wherein the camera is attached to a ground mobile robot.

11. The method of claim 10, wherein the ground mobile robot comprises:

a plurality of electric motors, wherein each of the plurality of electric motors is connected with one of a plurality of wheels of the ground mobile robot;

12. The method of claim 11, wherein the ground mobile robot further comprises:

a plurality of velocity sensors coupled with the processing system, wherein each of the plurality of velocity sensors is connected with one of the plurality of wheels, and wherein each of the plurality of velocity sensors transmits a respective velocity feedback signal associated with a respective one of each of the plurality of wheels to the processing system.

13. The method of claim 12, wherein the ground mobile robot further comprises:

a global navigation satellite system (GNSS) comprising a GNSS antenna and GNSS computer coupled with the processing system, wherein the GNSS receives input positional information, processes the input positional information, and transmits output positional information to the processing system.

14. The method of claim 13, wherein the ground mobile robot further comprises:

a gyroscope coupled with the processing system, wherein the gyroscope transmits measurement signals including yaw rate measurements to the processing system.

15. The method of claim 14, wherein:

the processing system determines one or more control signals based on a desired angular velocity and a desired linear velocity; and the one or more control signals are determined according to the velocity feedback signals, the positional information, and the measurement signals by applying a real-time receding horizon estimation and control.

16. The method of claim 15, wherein:

the processing system transmits the one or more control signals to one or more of the plurality of electric motors, thereby causing the ground mobile robot to track a reference path.

17. A method comprising:

capturing, by a camera coupled with a processing system that includes a processor, a group of images associated with a field of plants, wherein the group of images is captured while the camera is in motion in the field;

applying, by the processing system, a convolutional neural network to the group of images to extract feature vectors;

applying, by the processing system, motion estimation based on a rigid transformation to classified features, wherein the classified features result from applying a support vector machine to the feature vectors to classify the feature vectors, and wherein the applying the motion estimation results in corrected count data; and determining, by the processing system, a plant population for the field of plants based on the classified features and the corrected count data.

18. The method of claim 17, wherein the camera is a single monocular camera that is attached to a ground mobile robot, and wherein the method further comprises:

obtaining the group of images from the single monocular camera, wherein the group of images comprises a plurality of frames, wherein the ground mobile robot travels along a lane defined by a row of the plants, wherein the row of plants comprises a first plant stem, and wherein the plurality of frames include a depiction of the first plant stem;

obtaining robot velocity data from one or more encoders, wherein the one or more encoders is attached to the ground mobile robot;

performing foreground extraction on each of the plurality of frames, wherein the foreground extraction results in a plurality of foreground images; and determining, based upon the plurality of foreground images and based upon the robot velocity data, an estimated width of the first plant stem, wherein the determining the estimated width of the first plant stem comprises determining a ratio R, wherein $R=V_R/V_x$, wherein $V_R$ is an instantaneous robot velocity obtained via the robot velocity data and $V_x$ is an average horizontal foreground pixel velocity obtained via a structure from motion process that is based upon the plurality of frames.

19. A method comprising:

capturing, by a camera coupled with a processing system that includes a processor, a group of images associated with a field of plants, wherein the group of images is captured while the camera is in motion in the field;

applying, by the processing system, a convolutional neural network to the group of images to extract feature vectors;

applying, by the processing system, a support vector machine to the feature vectors to classify the feature vectors, wherein the applying the support vector machine results in classified features; and determining, by the processing system, a plant population for the field of plants based on the classified features and corrected count data, wherein the corrected count data results from applying motion estimation based on a rigid transformation to the classified features.

20. The method of claim 19, wherein the camera is attached to a ground mobile robot, and wherein the ground mobile robot comprises:

a plurality of wheels;

one or more batteries;

a plurality of electric motors, wherein each of the plurality of electric motors is electrically connected to the one or more batteries, wherein each of the plurality of electric motors is connected with one of the plurality of wheels, wherein the plurality of electric motors allow the ground mobile robot to rotate at least 180 degrees;

a plurality of velocity sensors coupled with the processing system, wherein each of the plurality of velocity sensors is connected with one of the plurality of wheels, wherein each of the plurality of velocity sensors transmits a respective velocity feedback signal associated with a respective one of each of the plurality of wheels to the processing system;

a global navigation satellite system (GNSS) comprising a GNSS antenna and GNSS computer coupled with the processing system, wherein the GNSS receives input positional information, processes the input positional information, and transmits output positional information to the processing system; and a gyroscope coupled with the processing system, wherein the gyroscope transmits measurement signals including yaw rate measurements to the processing system;

wherein the processing system determines one or more control signals based on a desired angular velocity and a desired linear velocity, and wherein the one or more control signals are determined according to the velocity feedback signals, the positional information, and the measurement signals by applying a real-time receding horizon estimation and control; and wherein the processing system transmits the one or more control signals to one or more of the plurality of electric motors, thereby causing the ground mobile robot to track a reference path.

* * * * *